(12) United States Patent
Garcia et al.

(10) Patent No.: US 10,019,588 B2
(45) Date of Patent: Jul. 10, 2018

(54) SYSTEMS AND/OR METHODS FOR ENABLING COOPERATIVELY-COMPLETED RULES-BASED DATA ANALYTICS OF POTENTIALLY SENSITIVE DATA

(71) Applicant: FinLocker LLC, St. Louis, MO (US)

(72) Inventors: Bryan D. Garcia, St. Louis, MO (US); Peter P. Esparrago, St. Louis, MO (US)

(73) Assignee: FINLOCKER LLC, St. Louis, MO (US)

( * ) Notice: Subject to any disclaimer, the term of this patent is extended or adjusted under 35 U.S.C. 154(b) by 217 days.

(21) Appl. No.: 14/996,550

(22) Filed: Jan. 15, 2016

(65) Prior Publication Data

US 2017/0206365 A1    Jul. 20, 2017

(51) Int. Cl.
G06F 17/00      (2006.01)
H04L 29/06      (2006.01)
G06F 21/60      (2013.01)

(52) U.S. Cl.
CPC ................... G06F 21/604 (2013.01)

(58) Field of Classification Search
CPC .................................................. G06F 21/604
USPC ............................................................ 726/1
See application file for complete search history.

(56) References Cited

U.S. PATENT DOCUMENTS

| | | |
|---|---|---|
| 6,073,109 A | 6/2000 | Flores et al. |
| 6,412,070 B1 | 6/2002 | Van Dyke et al. |
| 6,458,081 B1 | 10/2002 | Matsui et al. |
| 6,898,636 B1 | 5/2005 | Adams et al. |
| 6,971,017 B2 | 11/2005 | Stringer |
| 7,363,326 B2 | 4/2008 | Margolus |
| 7,630,986 B1 | 12/2009 | Herz |
| 7,765,136 B2 | 7/2010 | Northington et al. |
| 7,853,493 B2 | 12/2010 | DeBie |
| 7,941,353 B2 | 5/2011 | King et al. |

(Continued)

OTHER PUBLICATIONS

Mint.com, How It Works, Accessed via The Wayback Machine on Jun. 9, 2016—webpages from The Wayback Machine are from the way the site looked in 2014, PDF included as NPL (28 total pages).

(Continued)

*Primary Examiner* — Dant B Shaifer Harriman
(74) *Attorney, Agent, or Firm* — Nixon & Vanderhye PC

(57) ABSTRACT

Certain example embodiments relate to systems and/or methods for providing enhanced control over potentially sensitive data sharable among and/or between different parties. For example, certain example embodiments provide views into computer-enabled workflows managed by external parties, including views into what sensitive data has been accessed, who has accessed it, etc., e.g., throughout the lifecycle of a product granted on the basis of an analysis of such data. A computer-enabled system for automatically assessing received sensitive data in accordance with one or more digitized rule sets also is provided in certain example embodiments, as are computer-mediated tools for helping to automatically, semi-automatically, and/or manually resolve issues detected in the assessments, e.g., via enhanced communication and collaboration, among and/or between parties to a transaction, as well as third-parties who indirectly are involved in the transaction. The data remains secure and traceable, e.g., in accordance with its provider's specifications.

83 Claims, 63 Drawing Sheets

(56) References Cited

U.S. PATENT DOCUMENTS

| | | | |
|---|---|---|---|
| 7,945,637 | B2 | 5/2011 | Van Vleet |
| 8,126,920 | B2 | 2/2012 | Hu |
| 8,332,322 | B2* | 12/2012 | Varga .................... G06Q 20/10 705/30 |
| 8,571,994 | B2 | 10/2013 | Robert |
| 8,606,708 | B1 | 12/2013 | Homier |
| 8,626,658 | B1* | 1/2014 | Kapulkin ............... G06Q 40/02 705/42 |
| 8,666,884 | B2 | 3/2014 | Curry et al. |
| 8,688,461 | B1 | 4/2014 | Richards |
| 8,762,243 | B2 | 6/2014 | Jenkins et al. |
| 8,855,377 | B1 | 10/2014 | Madhani |
| 8,893,303 | B2 | 11/2014 | de Jong |
| 8,935,804 | B1* | 1/2015 | Clark .................. G06F 21/6245 726/1 |
| 8,954,459 | B1 | 2/2015 | McMillan |
| 9,043,567 | B1 | 5/2015 | Modukuri et al. |
| 9,213,709 | B2 | 12/2015 | Patiejunas |
| 9,805,014 | B2 | 10/2017 | Ramakrishnan |
| 2002/0116308 | A1* | 8/2002 | Cunningham ......... G06Q 40/00 705/35 |
| 2003/0140044 | A1 | 7/2003 | Mok |
| 2003/0216991 | A1 | 11/2003 | Baker |
| 2003/0217034 | A1 | 11/2003 | Shutt |
| 2004/0093493 | A1 | 5/2004 | Bisbee et al. |
| 2004/0111302 | A1 | 6/2004 | Falk |
| 2006/0173933 | A1 | 8/2006 | Srinivasan |
| 2007/0022027 | A1 | 1/2007 | Gupta |
| 2007/0050285 | A1 | 3/2007 | Freeman |
| 2007/0192137 | A1 | 8/2007 | Ombrellaro |
| 2007/0244904 | A1 | 10/2007 | Durski |
| 2009/0319411 | A1* | 12/2009 | Debie .................... G06Q 40/00 705/35 |
| 2010/0185871 | A1* | 7/2010 | Scherrer ............. G06F 21/6218 713/186 |
| 2010/0223623 | A1 | 9/2010 | Strong |
| 2010/0299362 | A1 | 11/2010 | Osmond |
| 2011/0131448 | A1 | 6/2011 | Vasil et al. |
| 2011/0208631 | A1 | 8/2011 | Glick et al. |
| 2011/0270748 | A1 | 11/2011 | Graham, III et al. |
| 2012/0259635 | A1 | 10/2012 | Ekchian et al. |
| 2012/0291140 | A1 | 11/2012 | Robert |
| 2012/0310692 | A1 | 12/2012 | Maiya et al. |
| 2012/0331005 | A1 | 12/2012 | White |
| 2013/0246477 | A1 | 9/2013 | Faitelson |
| 2013/0290464 | A1 | 10/2013 | Barrall |
| 2013/0332694 | A1 | 12/2013 | Reissner |
| 2013/0346432 | A1 | 12/2013 | Rantanen |
| 2014/0046906 | A1 | 2/2014 | Patiejunas |
| 2014/0201063 | A1 | 7/2014 | Snell et al. |
| 2014/0337209 | A1 | 11/2014 | Maiya et al. |
| 2015/0012974 | A1 | 1/2015 | Unitt |
| 2015/0059003 | A1 | 2/2015 | Bouse |
| 2015/0212997 | A1 | 7/2015 | Kassim |
| 2015/0261971 | A1 | 9/2015 | McFerrin |
| 2015/0310188 | A1 | 10/2015 | Ford |
| 2016/0026821 | A1 | 1/2016 | Meredith |
| 2016/0034713 | A1 | 2/2016 | Ramirez |
| 2016/0078245 | A1 | 3/2016 | Amarendran |
| 2016/0140654 | A1 | 5/2016 | Bhat |

OTHER PUBLICATIONS

Rouse, Margaret, "Audit Log", Accessed via The Wayback Machine on Jun. 9, 2016—webpage from The Wayback Machine isfrom the way the site looked on Oct. 26, 2014, PDF included as NPL (2 total pages).
Form Free—Verify Income and Assets in Minutes, retrieved May 19, 2016, 8 pages. http://www.formfree.com/.
Form Free—How it Works, retrieved May 19, 2016, 3 pages. http://www.formfree.com/howitworks/.
DecisionLogic, retrieved May 19, 2016, 1 page. https://www.decisionlogic.com/Default.aspx.
DecisionLogic—Service Overview, retrieved May 19, 2016, 3 pages. https://www.decisionlogic.com/ServiceInfo.aspx.
MiiCard —My Internet Identity, retrieved May 19, 2016, 5 pages. http://www.miicard.com/.
Early Warning: Solutions—Identity Chek Service, retrieved May 19, 2016, 4 pages. http://www.earlywarning.com/solutions/authentication/identity-chek-service.html.
Early Warning: Solutions—Authentify, retrieved May 19, 2016, 6 pages. http://www.earlywarning.com/authentify.html.
Early Warning: Solutions—Behavioral Biometrics Solutions, retrieved May 19, 2016, 3 pages. http://www.earlywarning.com/solutions/authentication/biometric-solutions.html.
Early Warning: Solutions—Card Payment Solutions, retrieved May 19, 2016, 3 pages. http://www.earlywarning.com/solutions/payment/card-payment-solutions.html.
Early Warning: Solutions—Payment Chek Services, retrieved May 19, 2016, 4 pages. http://www.earlywarning.com/solutions/payment/payment-chek.html.
Early Warning: Solutions—Deposit Chek Service, retrieved May 19, 2016, 3 pages. http://www.earlywarning.com/solutions/payment/deposit-chek.html.
Ravi Loganathan, "Bringing Automation to Asset Location and Verification," Mortgageorb, Mar. 16, 2016, 5 pages. http://www.mortgageorb.com/bringing-automation-to-asset-location-and-verification.
"Assest Verification System Consulting," Public Consulting Group, retrieved May 19, 2016, 2 pages. http://www.publicconsultinggroup.com/health/healthcarereform/AssetVerificationSystem.html.
Tony Garritano, "Lender Turns to Vendor to do Asset Verification," Progress in Lending Association, Oct. 7, 2015, 5 pages. http://progressinlending.com/2015/10/07/lender-turns-to-vendors-to-do-asset-verification/.
PointServ—Streamlined Delivery of Certified Borrower Documents, retrieved May 19, 2016, 1 page. https://www.pointserv.com/Services.aspx.
Microbilt, retrieved May 20, 2016, 5 pages. http://www.microbilt.com/category/credit-decisioning.
BankVOD, retrieved May 20, 2016, 2 pages. https://www.bankvod.com/products_services.aspx.
Mint—How it Works, retrieved May 20, 2016, 4 pages. https://www.mint.com/how-mint-works.
Mint—Money Manager, Bill Pay, Credit Score, Budgeting and Investing, retrieved May 20, 2016, 8 pages. https://www.mint.com/.
FannieMae Selling Guide, Mar. 29, 2016, 1374 pages. https://www.fanniemae.com/content/guide/sel032916.pdf.
Sanjeev Malaney, "How Automation Can Help Control TRID Compliance Costs," National Mortgage News, Jun. 15, 2015, 2 pages. http://www.nationalmortgagenews.com/news/technology/how-automation-can-help-control-trid-compliance-costs-1053546-1.html.
Christopher Eagle, "The Use of Business Rules Engines in Advanced Mortgage Closing Systems," Scotsman Guide, Jun. 2003, http://www.scotsmanguide.com/Residential/Articles/2003/06/The-Use-of-Business-Rules-Engines-in-Advances-Mortgage-Closing-Systems/.
Tim Vantassel et al., "Why Should I Care About Rules Engine?" Mortgage Banking, Apr. 2006, 5 pages. http://www.ccpace.com/asset_filed/RulesEngines_VanTassel4-06.pdf.
Scott Reed, "A Call for Automation: The Key to Driving Quality and Efficiency in Lending," NMP, Apr. 12, 2013, 4 pages. http://nationalmortgageprofessional.com/news/25224/call-automation-key-driving-quality-and-efficiency-lending.
"Steve Wiser: For Lenders, Automation is a Path to Profitability," Mortgageorg, Jul. 31, 2014, 6 pages. http://www.mortgageorb.com/steve-wiser-for-lender-automation-is-a-path-to-profitability.
AccentureConsulting—The New Customer-Centric Mortgage Industry, retrieved May 20, 2016, 2 pages. https://www.accenture.com/us-en/insight-new-customer-centric-mortgage-industry-banking.
Xerox—How Regulation and Homebuyers are Transforming Mortgage Processes, retrieved May 20, 2016, 3 pages. http://news.xerox.com/news/Xerox-Path-to-Paperless-Survey-and-eMortgages.

(56) References Cited

OTHER PUBLICATIONS

Amir Khandani et al., Consumer Credit Risk Models via Machine-Learning Algorithms, May 9, 2010, 55 pages.

* cited by examiner

We certify the above explanations and attached documents are a true and accurate representation of the facts around each item.

_____
Sam Smith                    Date

_____
Janet Smith                  Date

Page 2 of 2

Fig. 54B

We certify the above explanations and attached documents are a true and accurate representation of the facts around each item.

Document eSigned by Sam Smith    3/25/2015
Sam Smith                        Date Document eSigned by Janet Smith  3/25/2015
Janet Smith                      Date

Fig. 55B

SYSTEMS AND/OR METHODS FOR ENABLING COOPERATIVELY-COMPLETED RULES-BASED DATA ANALYTICS OF POTENTIALLY SENSITIVE DATA

TECHNICAL FIELD

Certain example embodiments described herein relate to systems and/or methods for providing enhanced control over potentially sensitive data sharable among and/or between different parties. For example, certain example embodiments described herein provide views into computer-enabled workflows managed by external parties, including views into what sensitive data has been accessed, who has accessed it, etc. A computer-enabled system for automatically assessing received sensitive data in accordance with one or more digitized rule sets also is provided in certain example embodiments, as are computer-mediated tools for helping to automatically, semi-automatically, and/or manually resolve issues detected in the assessments, e.g., via enhanced communication and collaboration.

BACKGROUND AND SUMMARY

Every year, 5-7 million mortgages are originated in the United States. Obtaining a mortgage sounds simple enough when understood at an abstract level. The steps involved can be summarized as: (1) completing the mortgage application, (2) submitting the application for processing and underwriting, (3) receiving the loan decision, and hopefully (4) going to a closing procedure.

Unfortunately, however, those who have even a passing familiarity with mortgages know that this seemingly parsimonious formula betrays reality. The actual process is often cumbersome, inefficient, and complex. The potentially vast number of manual tasks involved is one major reason for these hurdles. Just a few examples of potentially cumbersome manual tasks include: (1) collecting information from disparate sources (e.g., in connection with tax forms, employer paystubs, tax transcripts, court documents such as divorce decrees, etc.), (2) employment status and income verification (e.g., in connection with online services such as the Work Number, manual calls, employer paystubs, etc.), (3) obtaining bank information (e.g., involving at least two months of bank statements), (4) obtaining asset information (individual holdings, brokerage accounts, etc.), and (5) obtaining liability information (credit cards, mortgages, etc.). In addition to the time and effort involved in the collection of all necessary components, there is also a concern about the validity of the information obtained. Manual collection of data by human hands is prone to accidental errors, inaccuracies, and omissions. The potential for intentional misconduct, such as fraud or negligence, is present as well. Current approaches used for transferring information from mortgage lender to applicant create the risk of these issues on all sides, i.e., both internal and external to the mortgage lender.

The amount and type of information involved can require a significant amount of coordination between the applicant and the lender. In this regard, one 2014 study found that total loan production expenses average $6,769 per loan, with $4,401 of that being in the form of personnel expenses. In addition to the large amount of money required by mortgagees, mortgagers only make on average $897 profit per loan —which translates into an average production profit of 42 basis points.

Curiously, the amount of coordination and communication that can be required between the applicant and the lender can be both frustratingly high and frustratingly low. An instance of the former case is when numerous "back-and-forth" communications between the applicant and the lender may be needed to resolve issues that arise during the underwriting process. For example, a lender might need to know where a large gift came from, why there is a gap in employment, etc. Such questions may require more verification than usual, with the applicant generally having some idea of what information is being requested and why it is being requested.

On the other hand, applicants oftentimes have no insight into what happens once a mortgage application is submitted. An applicant might not be made privy, for example, to the following: (1) that a processor and an underwriter are engaged in conversations about details of the applicant's financial profile, (2) questions raised while completing the review, (3) the processor/underwriter's reasons for why clarification of existing information is warranted, (4) the processor/underwriter's reasons for needing additional information from the applicant or (5) the processor/underwriter contacts the applicant with a urgent and/or last minute request for additional information that presents real challenges for the applicant to provide rapidly. Consequently, an applicant typically has little-to-no insight into, much less control over, the process once an initial application is submitted. More specifically, applicants are often occluded from knowledge of what is done with the (potentially very sensitive) data they provide or have granted the lender access to, how often the data is accessed, or what data was actually received or reviewed.

The issue with opaque procedures involved in handling an applicant's data is exacerbated after the mortgage is approved and executed. This is because after the mortgage execution, other parties may become involved, and they also may require access to the borrower's data. One instance of this further issue would occur if the mortgage is acquired in the secondary mortgage market from the originator or another secondary mortgage lender. There typically is a laundry list of verifications the new holder needs to perform to evaluate the mortgage, and many of these verification include reviewing the borrower's data. For example, some of the possible analytics performed on the mortgage include: (1) verifying that the borrower's information is accurate and was properly acquired, (2) assessing whether the borrower's financial situation was properly reviewed, (3) ensuring that any identified issues were appropriately resolved, (4) reviewing for correctness any calculations that were performed (such as debt to income ratio, cash flow analysis, etc.), (5) analyzing the underwriting process in general to check for any procedures not up to standard, (6) determining whether there have been any material changes in the borrower's financial situation since the origination that could affect loan repayment, and (7) additional information which may be needed by the acquiring parties specific and evolving underwriting standards. Consider also the case of ongoing monitoring, which arises in a number of instances. For example, in many cases, a borrower may not qualify for a loan under traditional underwriting scenarios, but a lender may be able to originate a loan and a third party may be willing to acquire the loan if the consumer consents to ongoing monitoring of their financial situation. This creates similar strains. Similarly, traditional credit scoring and evaluation methods do not always truly portray a borrower's ability to repay. For example, there are cases where a borrower who is knowledgeable in how a credit score is derived is able to successfully manipulate their financial behaviors to ensure that their credit score remains in a range that meets underwriting guidelines. Such behaviors can more easily be detected by analyzing all disclosed accounts and information, as well as other information sources available based on the consumer's consent to identify those behaviors (e.g., paying one debt by getting cash advances from their credit card). Conversely, the consumer may have a low credit score, either because of some situation that occurred a couple of years ago, or situations such as seasonal employment leading to recurring late payments for 1 or 2 months per year. A more in-depth and potentially ongoing analysis of the financial situation (e.g., including a review of all disclosed accounts and information as well as other information sources available based on the consumer's consent) may allow the lender to determine that this person may indeed be able to receive a mortgage, especially if they have secured the consumer's permission for ongoing access.

There are several other instances of the data handling issue that demonstrate how quickly issues proliferate. In addition to the initial verification steps done by the mortgage acquirer, there is also a need in certain instances to monitor the loan continuously to ensure that it remains viable throughout its life or at least until certain critical stages in the loans lifecycle have been achieved and the originator's underlying liabilities have been reduced (e.g., in some cases a mortgage originator's liabilities for assessing a borrower's assets and liabilities goes away after a loan has been paid as agreed for a period of N years). Often the mortgage holder will engage a mortgage servicer to accomplish this task and others. There is also the possibility that a loan modification could be triggered automatically (e.g., as a result of an adjustable rate mortgage needing to be adjusted or because of a shift in the loan-to-value ratio such that it no longer requires private mortgage insurance) or because of actions undertaken by the borrower or lender, which would require a re-examination of data. Investors who invest in mortgage-backed securities also sometimes desire access to certain data to evaluate the potential efficacy of their investment. As should be clear by now, there are many entities who either require or desire access to certain pieces of information associated with a mortgage. As already stated, one area of concern here is that the borrower/applicant is often not made aware of all of the entities that have access to their data. This is a technical problem related to data security, privacy data integrity, auditing, etc. Another issue, already alluded to, is that the process of data collection (for all parties involved) is usually cumbersome, confusing, time-consuming, sometimes inaccurate, and open to fraud. This is a technical problem associated with the ingesting of data (including sensitive data) from a plurality of different sources and in a plurality of different formats. Still another problem to consider is that the processes of data transference between interested parties is usually opaque and inefficient, meaning the receiver may have no guarantee that the information is correct or complete. This is a technical problem relating to those areas discussed above, as well as issues of provenance, etc.

Certain example embodiments address the above and/or other concerns.

Certain example embodiments relate to a workflow management system. The system comprises processing resources including at least one processor and a memory coupled thereto, and a non-transitory computer readable storage medium. The processing resources are configured to control the workflow management system to at least: provide a user interface to a user of the workflow management system, the user interface being configured to present to the user information concerning a status of a multi-step workflow being managed by and under control of another entity, the multi-step workflow including processing, on a computing platform remote from and inaccessible to the user, user data, the user data including user provided data and/or documents shared from the non-transitory computer readable storage medium and data and/or documents authorized by a user to be provided; and responsive to a termination message received from the user and/or a predefined time period elapsing, transmit a signal to the computing platform of the another entity that the workflow is to be terminated, the signal causing the computing platform to terminate the workflow regardless of what step in the workflow is being processed, including regardless of whether responsibility for processing the current step in the workflow resides with the user, the another entity, or a further entity that has partnered with the another entity by request of the another entity. Other information may be considered in some instances, even though it may not be provided by a consumer nor specifically authorized for consideration by a consumer. This may include, for example, public records data, data provided by the lender, data sources that the system may contract with that do not need consumer authorization/consent, data that has been built up by the system (e.g., related to risk tolerance, local effect data, and/or the like), etc.

In certain example embodiments, a data management system comprises processing resources including at least one processor and a memory coupled thereto, and a non-transitory computer readable storage medium. The processing resources are configured to control the data management system to at least: enable a user to define a plurality of different logical containers over time, each logical container being backed by the non-transitory computer readable storage medium; receive sensitive information from the user; retrieve sensitive information from external data sources where authorized by the user; store an electronic representation of received sensitive information to the non-transitory computer readable storage medium; associate received sensitive information with one or more logical containers; store, for each logical container, a set of rules identifying one or more other parties that have access to the sensitive information associated with the respective logical container, and conditions under which those one or more parties are granted access to the sensitive information associated with the respective logical container; grant electronic access to a given logical container, and the sensitive information associated therewith, to a given party, conditioned on the set of rules associated with the given logical container; record data representative of direct and indirect accessions of logical containers and/or the sensitive information associated therewith; and responsive to a user request for a given logical container, present to the user an indication of the party or parties that has or have accessed the given logical container associated with the user request. Each said logical container is reusable over time by different parties based at least in part on corresponding updates to the at least one set of rules. Each of (a) the collection of sensitive information and (b) the content of each said logical container, is updatable over time.

In certain example embodiments, there is provided a data analysis system comprising processing resources, including at least one first processor and a first memory operatively coupled thereto. A first data store comprises sensitive data about a user, as well as a set of data sharing rules, with the set of data sharing rules indicating what sensitive data is sharable and one or more conditions identifying when such sensitive data is shareable, and the sensitive data comprising information elements. A second data store (which may be the same as or different from the first data store) comprises at least one set of analysis rules, with the at least one set of analysis rules being system defined and/or defined by an external party separate from the user. The processing resources are configured to control the data analysis system to at least store, to the first data store, sensitive information received from the user and/or electronically retrieved from a data source external to the data analysis system in response to the user providing appropriate credentialing information for the external data source; receive, from the external party, a request to process a first predefined set of sensitive information; and responsive to a request to process a first predefined set of sensitive information: determine one or more sets of analysis rules to be applied to sensitive information in the first predefined set of sensitive information, based at least in part on the received request; automatically and programmatically attempt to apply each rule from each determined set of analysis rules to sensitive information in the first predefined set of sensitive information; store, to the second data store, information about an outcome of the rules that are successfully applied, the information being associated with the sensitive information on which the rules are run; and for each rule or set of rules that indicates that further action is required, re-assess an outcome of a respective rule or an outcome of a set of rules, responsive to at least one of: (a) automatic retrieval of further information from the user performed in connection with applicable data sharing rules, (b) application of a heuristic to sensitive information already in and/or added to the first predefined set of sensitive information, (c) electronic receipt of further information from the user or the external party in response to a system-initiated electronic prompt for responsive information, and (d) a determination as to whether the indication that further action is required for the respective rule or set of rules can be ignored based on input from the external party; and store, to the second data store, information about an outcome of the respective re-assessed rule or set of rules, the information being associated with the sensitive information on which the respective rule or set of rules is run.

According to certain example embodiments, notifications may be sent under a variety of different circumstances and to a variety of different parties and under a variety of different communication channels. For example, remote termination of a workflow, completed rule application or rule re-application, updates made with respect to flagged issues, successful linkages to external data sources, successful uploads of new documents, etc., may trigger notifications. Such notifications may be sent to consumers, other parties to a transaction or potential transaction, third parties, and/or others, depending on the circumstances. Such notifications may be sent via email messages, SMS messages, instant messages, system-to-system messages, over application programming interfaces (APIs), and/or the like.

Non-transitory computer readable storage mediums tangibly storing instructions for performing the above-summarized and/or other approaches also are provided by certain example embodiments, as well as corresponding computer programs.

Corresponding methods of operating, making, and/or configuring such systems also are contemplated herein.

Certain example embodiments may help achieve some or all of the following and/or other technical advantages:

A reduction in data acquisition times, e.g., from days/weeks to minutes, and the ability to potentially better understand what data is needed and in at least some instances automatically retrieve fully responsive data without direct human intervention, e.g., based on predefined and user-configurable rules as to what data can be shared, with whom, and when;

The enabling of secure collaboration between two or more parties in real time, or at least near real time;

The ability to refresh data on demand from internal and/or external sources, e.g., regardless of whether provided once or multiple times and potentially in accordance with predefined and user-configurable rules as to what data can be shared, with whom, and when;

An ability to conduct analysis that would be impossible or at least impractical to be done by a human;

The creation and maintenance of essentially tamper-free data, e.g., sensitive data resistant to tampering by an applicant, lender, or other party involved with a lending or other related process;

Facilities for digitally-signed documents delivered to lenders and/or other parties to protect against tampering and provide verification;

Provision of ongoing monitoring when authorized by a consumer;

Enabling the sharing of access to consumer data with fine grained control (e.g., the consumer gives the system access to their online accounts, and the consumer shares what financial accounts they are willing to share, while a lender does not get access to their credentials so they can only see what consumer shares; potentially enabling a consumer to only share native and/or computed data elements such as, for example, e.g., cash flow, current monthly rent, net worth, etc.);

Holistic data analysis (e.g., analysis across all information available);

Machine learning/heuristic analysis, e.g., to help define and/or refine analysis rules;

Containerization of data, e.g., to facilitate easy maintenance, sharing, collaboration, etc.

And/or the like.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 4-26 are example screenshots showing a consumer enrolling accounts in accordance with an example embodiment;

FIGS. 27-30 show consumer account management and/or personal financial management views in accordance with certain example embodiments;

FIG. 34A-37B show consumer alert-related and alert response screens in accordance with certain example embodiments;

FIGS. 38-50 are screenshots showing "lender workbench" features, in accordance with certain example embodiments; and FIGS. 51-55B are consumer portal views and sample documents that may be provided by and/or to the system of certain example embodiments.

DETAILED DESCRIPTION

Certain example embodiments relate to a consumer-enabled "financial locker" that helps reduce costs and risks for lenders, loan servicers, loan securitization interested parties, and/or others, by providing actionable financial data throughout the entire loan lifecycle, while also providing transparency and enhanced control over loan-related processes to consumers. For example, certain example embodiments are able to provide some of the following and/or other features:

- A borrower consent and access-controlled portal that provides transparency to the borrower, e.g., throughout the loan process;
- One or more platforms for enhancing collaboration among and/or between the borrower, lender, underwriter, loan servicer, and/or others;
- Real-time (or at least near real-time) verification of assets, deposits, key liabilities, bank transactions, and income;
- Access to other financial sources such as, for example, tax transcripts, Social Security Administration data, real estate records, credit report information, etc.;
- A flexible rules and workflow engine enabling lenders, underwriters, and/or others to specify criteria for, for example: (1) identifying key issues than need collaboration between lender and borrowers, (2) identifying issues where further information or review is needed, (3) granting loans, (4) making exceptions to allow for variations to loan-related policies, (5) indicating who may grant exceptions, (6) ongoing monitoring of data shared to identify when the a consumer's situation has changed and review and action may be needed, (7) when a loan is sellable and/or purchasable, (8) evaluating the quality of a loan portfolio, etc.;
- A calculator for ability to repay type calculations (e.g., in connection with historical data to determine behaviors, cash flow analysis, residual income predictions, etc.);
- A mechanism for certifying bank statements and/or other historical financial information;
- Reporting and/or monitoring for emerging default and/or other warning signs;
- Etc.

Figure 1:
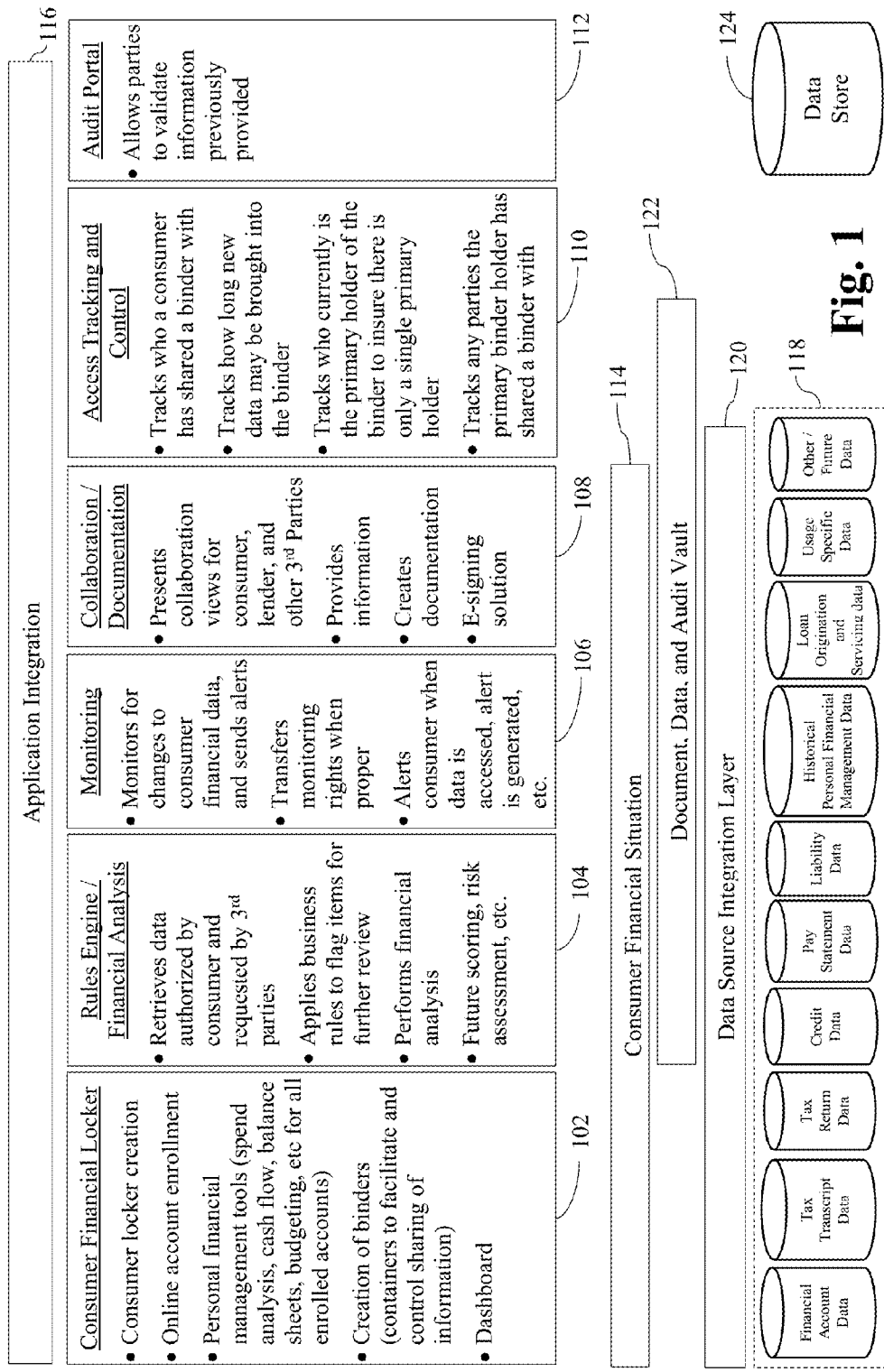
FIG. 1 is a high-level block diagram showing example components and functionality of a system designed and implemented in accordance with certain example embodiments.

FIG. 1 is a high-level block diagram showing example components and functionality of a system designed and implemented in accordance with certain example embodiments. FIG. 1 is a more conceptual view, and it will be appreciated that it may be "backed" or otherwise supported by components such as those shown in the more detailed architectural block diagram presented in FIG. 2, which is discussed in greater detail below. In any event, as shown in FIG. 1, a consumer financial locker module 102 provides a portal for a consumer to create a locker to simplify their financial life. This may in some instances be as straightforward as generating a username and password for their financial locker, or they may use their User ID and Password from a service with support for the OAuth protocol for re-using their credentials between multiple services (e.g., their Facebook account, Google account, Microsoft Live Account, or their Yahoo Account). Furthermore, the user must enroll for Multi-Factor Authentication by providing a phone number where the system may call or text the consumer to further validate the legitimacy of the user. Once enrolled in the system, consumers may also use the consumer financial locker module 102 to enroll accounts and upload documents, thereby providing the consumer a single location to maintain multiple elements of their financial life. More specifically, a consumer may provide access to the information contained in their online bank accounts, brokerage accounts, credit card accounts and/or the like. Concurrently, they may also provide releases so that paystub information, tax transcripts, and/or the like may be retrieved from external sources. Once this second enrollment procedure is completed, consumers may manage access rights to such information. They are able to control which information they wish to share, who it is shared with, and for how long the external party can access it. The binder (or other container) is the vehicle that the consumer will use to manage these access rights. If the consumer applies for some financial product, such as a mortgage or benefit, they will create a binder to hold the accounts and other data they wish to disclose for the application process. They may need to disclose things such as checking accounts, brokerage accounts, tax transcripts, etc. It is possible all of the requested information or information the consumer wishes to disclose may not already be in the consumer's locker and the consumer can not only enroll that information into their locker but also place it into the binder for the party. The party that the consumer is applying can request that certain assets, liabilities, or income be included in the binder, but the final decision for disclosure is left in the hands of the consumer. Likewise, the party may request that the consumer grant access for a certain period of time or extend access previously granted, such as the entire life of a loan, but the consumer is able to either approve the request or only authorize a timeframe they are comfortable with. Consumer enrollment information, together with account enrollment information, access rights, etc., may be stored to a suitable data store.

A rules engine/financial analysis module 104 retrieves data from third parties, e.g., as authorized by the consumer and/or as requested by a third party. For example, the rules engine/financial analysis module 104 may obtain tax transcript data at the request of a mortgage lender, provided that the consumer authorizes such information to be released to the mortgage lender. It then applies predefined business rules, e.g., to identify items that have been flagged as needing further review, additional documentation, or collaboration with the consumer. For instance, a business rule might indicate that a gap in employment of longer than 6 months should be flagged for follow-up. If so, the rules engine/financial analysis module 104 may then notify a mortgage lender of this item being flagged, request further explanation from the mortgage applicant (consumer), require specialized review within a mortgage lender, etc. As another example, a business rule might indicate that a large and apparently non-recurring deposit to a checking or savings account should be verified and, thus, a consumer may be notified to provide supporting documentation or the like. In a similar vein, the rules engine/financial analysis module 104 performs financial analysis, e.g., assessing metrics such as ability to repay, residual income, future scoring, risk assessment, and/or other calculations. Such calculations may be based on system-specific guidelines, lender-specific guidelines, investor-specific guidelines, industry wide guidelines, and/or the like. Additionally the rules engine/financial analysis module 104 may flag items for further review at the detail level, and then subsequently mark items as resolved based on other information identified or based the total picture painted by the information disclosed. Conversely the rules engine/financial analysis module 104 may look at the total picture painted by the information disclosed and subsequently flag additional items for input from the consumer or mortgage lender (e.g., the rules engine/financial analysis module 104 may identify that the consumer's debt to income ratio is too high and go back deposits at a lower level than normal to request further information to determine if there is additional income which may be used to improve the debt to income ratio). The rules engine/financial analysis module 104 may be invoked either by a workflow in the mortgage lenders platform, the internal workflow engine, or by a request manually originated by the mortgage lender (e.g., a loan has taken longer than planned and it requires more up to date data be retrieved and analyzed to determine if the consumer's situation has changed). Whenever data is retrieved and/or new analysis is performed by the rules engine, copies of the data and/or analysis will be placed inside the consumer's binder and the consumer, at their option, can be notified of the new data and/or analysis being provided to the receiving party.

A monitoring module 106 monitors for changes to consumer financial data and issues alerts as appropriate, e.g., during loan origination, for the life of the loan, or some other period of time based on what the consumer consented to. The monitoring module 106 may also allow a potential investor in a loan or portfolio of loans to assess the quality of a loan or portfolio of loans before acquiring them as well as continuing to monitor the loans in their portfolio. The monitoring module can be configured to run on a periodic basis and then, based on certain business rules, determine if an event has occurred which requires further analysis by the rules engine/financial analysis module 104. As a mortgage moves from origination to the day-to-day servicing (e.g., billing, questions, interaction with the consumer, making modifications, handling short sales and foreclosures, etc.), the monitoring module 106 can be engaged to stay apprised of the consumer's financial situation (if the consumer has or does grant permission for it to do so). This shift from origination to servicing and loan performance monitoring and management invokes a new rule set designed to monitor continuously for notable updates, such as a significant change in the borrower's or guarantor's income, asset's, liabilities, etc. Another purpose of the monitoring module 106 is to increase transparency for all parties involved in the lending process. It accomplishes this agenda by inserting copies of all data retrieved and any analyses performed into the relevant binder. Additionally, the consumer may choose to be notified every time his or her data is accessed, or any time alerts are put on some of the data, even when it is outside of the conventional purview of consumer monitoring, control.

A collaboration/documentation module 108 generates several collaboration views. A consumer collaboration view may present the following: (1) commentary and requests for further information, (2) the ability to upload additional documentation, (3) a collaborative interface for communicating with one or more parties in the mortgage lender organization, (4) information concerning the linking of data (e.g., the linking of a deposit to its source and/or subsequent withdrawal), and/or (5) a mechanism to perform linking (including being able to enroll new data sources and upload information when it is not available from an online data source) between various elements of the consumer's information (where appropriate and when such linking was not able to be performed by the rules engine). Lenders, servicers, and/or other third parties may have a collaboration view in which they can communicate with and/or otherwise receive information from/provide information to the consumer, share internal commentary, show flagging of items, flag additional items, remove flags from items, close reviews, etc. Perhaps more generally, the collaboration/documentation module 108 helps share information so that consumers and/or third parties can conduct review relevant to their business practices. The collaboration/documentation module 108 can create letters of explanation that disclose all items identified by the rules engine/financial analysis module 104 as requiring further input. This includes inputs such as those provided by the consumer directly, via mortgage lender personnel (e.g., information provided verbally, via email, fax, etc.), or any documentation provided to support the input. The letter is then presented to the consumer for signature either via the internal e-signing capabilities, integration with external e-sign services, or preparation for traditional wet-ink signatures, etc. The collaboration/documentation module 108 also creates documents and documentation packages which may contain as little as one portion of the data (e.g., a bank or other statement, a portion of a bank or other statement, the summary of the liability represented by a single credit card, etc.) to a complete collection of all data retrieved, all data provided, all analysis performed, letters of explanation, and any additional data. The specific contents of a documentation package are configured based on the using party's needs, the party receiving the documentation package's needs, and the specific use cases of the documentation package. The documentation package can take the form of system to system data feeds, data files, spread sheets, documents (e.g., Microsoft Word, Portable Document Files, etc.) and can be provided at any appropriate point(s) in the process to one or more parties in the process (e.g., the mortgage lender could get a feed of the raw data (unprocessed data as soon as it is retrieved), and a parallel or independent copy of that data could be provided to other participants in the mortgage origination process, at any point in the process).

An access tracking and control module 110 manages the process of enforcing primary access that has been granted by the consumer, including that primary access may be transferred to another party or if the party with primary access shares that access with one or more affiliated parties. Primary access is the access granted to the current holder of the mortgage application or the mortgage, and the primary access holder may then transfer the primary access to another entity, thereby relinquishing their ability access or share the binder other than to access data retrieved during or prior to their tenure as primary access holder. The primary access holder may also share their access with other parties in the lifecycle of the loan during their tenure as primary access holder. Any party who the primary access holder shares their access with typically cannot further share that access. In the lifecycle of a loan, mortgage, financial transaction, or other data sharing/collaboration exercises between a consumer and a $3^{rd}$ party, it is a common occurrence for a consumer's data access permission to transfer to a new party once the party that holds it has completed their work and no longer needs to retrieve new data (if the consumer has consented to such a transfer). Transference of access happens, for example, when an originator sells a closed mortgage to an investor, who could then sell it to another investor as part of a bundle of mortgages. In the case of this transfer, it is the responsibility of the access tracking and control module 110 to ensure that the previous holders of primary access to the consumer's shared data can no longer retrieve new information, but can still retrieve any information they had access to while they were the primary access holder. It is also the responsibility of the access tracking and control module 110 to ensure the new primary access holder can only access the information the consumer has granted the primary access holder access to along with the information that was retrieved by prior primary access holders. When a primary access holder shares their access with an affiliated party, the access tracking and control module 110 is additionally responsible for ensuring the affiliated party only accesses data that is consistent with the access granted to the primary access holder by the consumer, and also consistent with any additional restriction placed on the access to the consumer's data by the primary access holder (e.g., an investor purchases a loan from an originator, and then contracts with a servicer to handle the day to day care of the mortgage; to facilitate the servicing of the loan, the servicer may need access to all or part of the data which the investor has access to when they gained primary access to the data shared by the consumer).

An audit portal 112 allows parties to validate information that previously has been provided. The audit portal 112 may, for example, be used by internal quality assurance specialists to check on the status of applicants, approved mortgage applications, the integrity of data that is being provided, etc. Acquirers, outside auditors, securitization entities, and/or others may also validate the authenticity of data provided by a lender, investor, servicer etc.

It thus will be appreciated that the consumer financial locker 102, the rules engine/financial analysis module 104, the monitoring module 106, and the collaboration/documentation module 108 form a logical representation of consumer financial situation 114, whereas the rules engine/financial analysis module 104, the monitoring module 106, the collaboration/documentation module 108, and the audit portal 112 form a logical representation of application integration 116. The latter may include application integration between a loan application system, loan origination system (LOS), a servicing party, an automated underwriting system (AUS), quality control system, other products and services the customer may choose to utilize and where they need to share one or more components of the consumer's financial situation with other parties and systems.

Information from internal and outside data sources 118 may be integrated into the system via a data source integration layer 120 that is ultimately in communication with a document, data, and audit vault 122 and the data store 124. As alluded to above, the document, data, and audit vault 122 may store information about enrolled consumers, enrolled consumer accounts, rules applied by the rules engine(s), analysis performed, audit trails (e.g., for flagged items and possible attempted resolution activities), documents, etc. The data store 124 may serve not only for data retrieved with the consumer's consent or provided by the parties a consumer has agreed to share their data with, but also as a store for data backing future model and score development, analytics, risk assessment, machine learning, and/or other features.

FIG. 1 shows example outside data sources 118 coming from: data aggregators such as Yodlee, Fisery (CashEdge), Intuit, ByAllAccounts, etc.; the IRS for tax transcripts or the like; etc., as well as for tax data such as e-filed retrieved directly from tax software providers, derived from tax return processing software providers which extract tax return data directly from tax return documents and provide the extracted data along with some basic analytics of the data, payroll systems like ADP, etc.; pay statement data from sources such as, for example, Work Number, ADP, etc.; and LOS data such as, for example, loan application data, credit reports, data specific to a lender, investor or servicer processes, internal data sources, etc. It will be appreciated that other data sources may be consulted in place of, or in addition to, these examples.

The functionality implied by the components of FIG. 1 may be used in connection with a number of different use cases, e.g., as set forth below.

First Example Use Case

A first example use case relates to a computer-implemented approach in which a consumer enrolls his/her financial accounts, stores financial data, and permits the sharing of such financial data with third parties of his/her choosing for a time period of his/her choosing, while providing traceability as to the source of the financial information to the third-parties. Elements of that information needing further review are identified, and a mechanism facilitating that review is provided. In this vein, a consumer creates a persistent account and enrolls one or more of their financial accounts. Information about the enrolled financial accounts, as well as any information the consumer uploads, is stored in the persistent account. A mechanism is provided to aid in retrieving historical data from the consumer's enrolled financial accounts and in periodically retrieving updated information from the consumer's financial account. This is done to create a repository for each of the consumer's financial accounts that contains both historical and recent detailed financial data, with the possibility of a current financial data as well. The repository's provides the consumer with financial management tools and a rich set of data the consumer can share via a container with third parties.

A party other than the consumer may request that the consumer give that party access to information about the consumer, regardless of whether such information is held within the consumer's persistent account, must be retrieved from one or more of the accounts enrolled, or may require the consumer to enroll additional accounts. The request from that party may be presented to the consumer so that consumer may create a container which defines what data that party may access and grant them access to that container. The accounts or data placed into the container may come from accounts currently enrolled in their persistent account, sub-accounts of the online financial accounts that have been enrolled, data that has been stored in the persistent account, etc. In cases where the where the account is not already enrolled in their persistent account, the consumer may enroll the accounts that the party has requested access to into their persistent account and then share them immediately by placing them into the container, upload the requested data to the persistent account where it is not available from an enrolled account, etc. The consumer is able to create a container that identifies all accounts, sub-accounts, and data that the consumer wishes to share with the party, and is able to grant that party access to all the accounts and data referenced in the container. The consumer may determine the period of time that such access is permitted, whether such access can be shared from one party to another, etc. The time period may be specified in absolute terms (e.g., a specific date/time) and/or with reference to an event (e.g., until an application is approved/denied by that party or another party, until revoked by the consumer, for the life of a loan, etc.).

A workflow is initiated, and it facilitates a number of operations that take place cooperatively among and/or between different parties. For example, the workflow facilitates the retrieval of information from financial accounts and data identified in the container for a party to which the consumer has granted access. The retrieved information may be transformed into an internal representation appropriate for the system and/or the specific party with which it is being shared. Using the rules engine, rules are applied to the retrieved information, e.g., to identify potential items that require further review or analysis. The rules may be specific to that party, the system, the industry, etc. In a similar vein, calculations about the consumer's financial status, ability to support an anticipated financial transaction, etc., are made. The rules engine and/or calculations may be applied against individual items of data retrieved from each data source, across all items of a particular set of financial information retrieved from a data source, information retrieved from multiple data sources, and/or all retrieved information. A list of items to be addressed may be generated based on the business rules analysis of the data, various analytics, and calculations individually or in combination. Items may involve the identification of missing pieces of information (e.g., because an application was incomplete) or requests for further explanation as to certain facets of the consumer information (e.g., the source of a large gift, an absence of paystubs for a prolonged period of time, a regular outgoing amount of money, etc.).

Based on the analysis of the corpus of data about the consumer and the list of items to be resolved (if any), a next action is determined. The next actions may involve any one or more of the following and/or other determinations and/or actions. One determination that might be reached is that no action is required, and all items which were flagged being marked as no longer needing further analysis and/or explanation and therefore resolved.

Another determination that might be reached is that the items are appropriate for the consumer to address. In this instance, the consumer may be notified of the need to review the items identified and provide additional explanations, data, and/or documentation. This may include providing the consumer with a portal through which the information retrieved, the items that were identified as needing further review, information regarding why additional information is required, how the consumer might resolve the issue, etc., may be seen. The consumer, at his/her own choosing, can respond to any or all of the items for which additional information is sought. In cases where the consumer provides additional information, the additionally provided information can be immediately reprocessed by the rules engine, e.g., to identify whether follow-up information is needed, whether the additional information is sufficient to satisfy a perceived need, whether manual review by another party is needed, etc.

Still another determination that might be reached is that the items that require further review are not appropriate for the consumer to address (e.g., IRS tax transcript data where the tax transcript document is largely unfamiliar to the consumer, and the most efficient way to address any items needing further review is having a party with access to the container use the flagged items guide their discussions and data capture activities with the consumer). In this case, the party may be notified that it needs to review the items identified and provide additional explanations, data, and/or documentation. This may include providing the party a portal through which the information retrieved, the items that were identified as needing further review, information regarding why additional information is required, how the party might resolve the issue, etc., may be seen. The party at its choosing can respond to any or all of the items requiring additional information. In cases where the party provides additional information, the information can be immediately reprocessed by the rules engine and algorithm engine to identify if follow-up information is needed. The party may indicate the consumer needs to provide additional information, that its review is complete as to some or all items, etc. It will be appreciated that these engines may be implemented together or separately in different example embodiments. Similarly, different executable modules may be run on the same or different computer hardware components in different example implementations.

Based on an updated analysis that takes into account the new data requested, the new updated data provided and processed by the rules engine, etc., the workflow engine will determine the appropriate next step(s). This may involve routing a request to the consumer for yet further information, routing a request to a third party for its review and information input, routing a request to a more senior person or management personnel within the party to perform a final review (of all items addressed and any remaining open items) in order to close the information review process or re-route for additional action, determining that the information review process has been concluded (e.g., because of information provided by the rules engine, as directed by the consumer or another party, etc.), and/or the like.

The consumer is provided with a report, which potentially includes: (1) all data shared with any another party (whether such data was specifically requested by another party or was automatically retrieved by the workflow and/or rules engine), (2) the items that were identified by the rules engine, (3) the notes or data entered by the consumer and/or the party, (4) additional artifacts entered by either the consumer or another party, (5) results of analysis performed (possibly excluding any indications for fraud or other wrongdoing), (6) an identification of the financial account data which was retrieved or analyzed, etc. Similarly, the party may be provided with a corresponding report and/or a subset thereof, potentially formatted as a feed or other appropriate data package that is meaningful to the party.

It will be appreciated that the financial data involved in this example use case may include real-time transaction data, real time balance data, historical transaction data, historical balance data, tax data, income data, and/or other data and documents the consumer needs to share with another party. It also will be appreciated that the consumer may be a mortgage applicant or some type of financial guarantor related to the transaction, and that the other party may be a mortgage lender in some instances. In other instances, the party may be a third party to a mortgage transaction and therefore may be, for example, a loan servicer, internal or external auditor, or other party.

Second Example Use Case

A second example use case relates to a computer-implemented approach in which a third party requests information from financial accounts, financial sub-accounts, and/or other data that the consumer has identified in a container that the third party (e.g., a party who the consumer has designated directly, or a party that has to some extent "stepped into the shoes of" such a party, e.g., through the sale of a mortgage, sharing with or the transference to a servicing entity, etc.) has access to in a manner which provides traceability as to the source of the information, while also identifying elements of that data that need further review and providing a mechanism to facilitate that review. In this regard, a request to access accounts and/or data identified in the container is received from the third party. A determination is made as to whether access to the container is appropriate, e.g., based on whether access was previously granted by or is currently being granted by the consumer, whether previously granted access has ended because of expiration of the access, an event has occurred which ended the access grant, the consumer has revoked access for the third party, the third party has transferred the access to another third party (e.g., a lender originates a loan with a consumer, and then sells the loan to an investor, the lender originating the loan loses access to the container and the investor gains access to the container, assuming the consumer has consented at some point the access being transferred or shared), etc.

A workflow is initiated that facilitates a number of operations which take place cooperatively among and/or between different parties. For example, the workflow facilitates retrieval of information from financial accounts, financial sub-accounts, and/or other data the in the container to which the third party has been granted access. The retrieved information may be transformed into an internal representation appropriate for the system and/or the specific party with which it is being shared. Using a rules engine, rules are applied to the retrieved information, e.g., to identify potential items that require further review or analysis. As above (e.g., as noted in connection with the first use case), the rules may be specific to that party, the system, the industry, etc. In a similar vein, calculations about the consumer's financial status, ability to support an anticipated financial transaction, etc., are made. Also as above, the rules engine and/or calculations may be applied as against individual items of data retrieved from each data source, across all items of a particular set of financial information retrieved from a data source, information retrieved from multiple data sources, and/or all retrieved information. A list of items to be addressed may be generated based on the business rules analysis of the data, various analytics, and calculations individually or in combination. Based on the analysis of the corpus of data about the consumer and the list of items to be addressed (if any), a next action is determined. The next actions may involve any one or more of those set forth in detail above. Based on an updated analysis that takes into account the new data requested, the new updated data provided and processed by the rules engine, etc., the workflow engine will determine the appropriate next step(s), e.g., as set forth above. Reports also may be generated as set forth above. Also as above, the financial data that is involved in this example use case may include real-time transaction data, real time balance data, historical transaction data, and/or historical balance data.

Third Example Use Case

A third example use case relates to a computer-implemented approach for monitoring (e.g., periodically, on demand, when issues are detected, etc.) data from the financial accounts, financial sub-accounts, and/or data a consumer has identified in a container that a party has access to, e.g., in a manner that provide complete traceability as to the source of the information and complete transparency to the consumer, while identifying elements of that data that need further review and providing a mechanism to facilitate that review. In this regard, a determination as to whether a party who has access to a container has identified that it wishes to monitor all components identified in the container, or just a subset of the accounts, sub-accounts, and/or data identified in the container. Access rights to the data are checked, e.g., as set forth above, and invalid requests may be removed from an automatic or periodic polling system and, depending on the configuration, the party who requested the access is automatically notified.

A workflow is initiated, and it facilitates a number of operations that take place cooperatively among and/or between different parties. For example, the workflow, based on rules defined for the monitoring, retrieves and/or refreshes information from the container, as appropriate. The retrieved information may be transformed into an appropriate format, and a rules engines applies rules to determine whether there are any items and/or situations that should be called to the attention of the monitoring party.

Using the rules engine, rules are applied, and calculations are performed on the data, e.g., to determine the consumer's financial status, whether there is anything in the information suggestive of a potential impact on the consumer's current relationship with and/or product provided by the party, etc. The rules engine may be used for this and/or other purposes on some or all of the information. As above, items that might require attention are identified, and determinations are made as to whether to follow-up with any action and, if so, what particular follow-up action should be taken. Based on an updated analysis that takes into account the new data requested, the new updated data provided and processed by the rules engine, etc., the workflow engine will determine the appropriate next step(s), e.g., as set forth above. Reports and/or data feeds also may be generated as set forth above. Also as above, the financial data that is involved in this example use case may include real-time transaction data, real time balance data, historical transaction data, and/or historical balance data.

Based on these and/or other scenarios, further use cases may be provided in connection with different example embodiments, e.g., as will be appreciated from the description that follows. It will be appreciated that these use cases may have aspects related to the transitioning of access throughout the lifecycle of a loan or other financial service or product, the ability to provide documents for consumer signature, an approach for exposing or otherwise disclosing progress to the consumer throughout the loan process, allowing a consumer to select a period of access and revoke access at any time, transparency for all parties to and/or interested in a loan application, an audit portal, consumer-initiated and/or consumer-responsive updates to a container (e.g., add/delete accounts, provide further information, etc.), and/or the like.

Example Implementation

Figure 2:
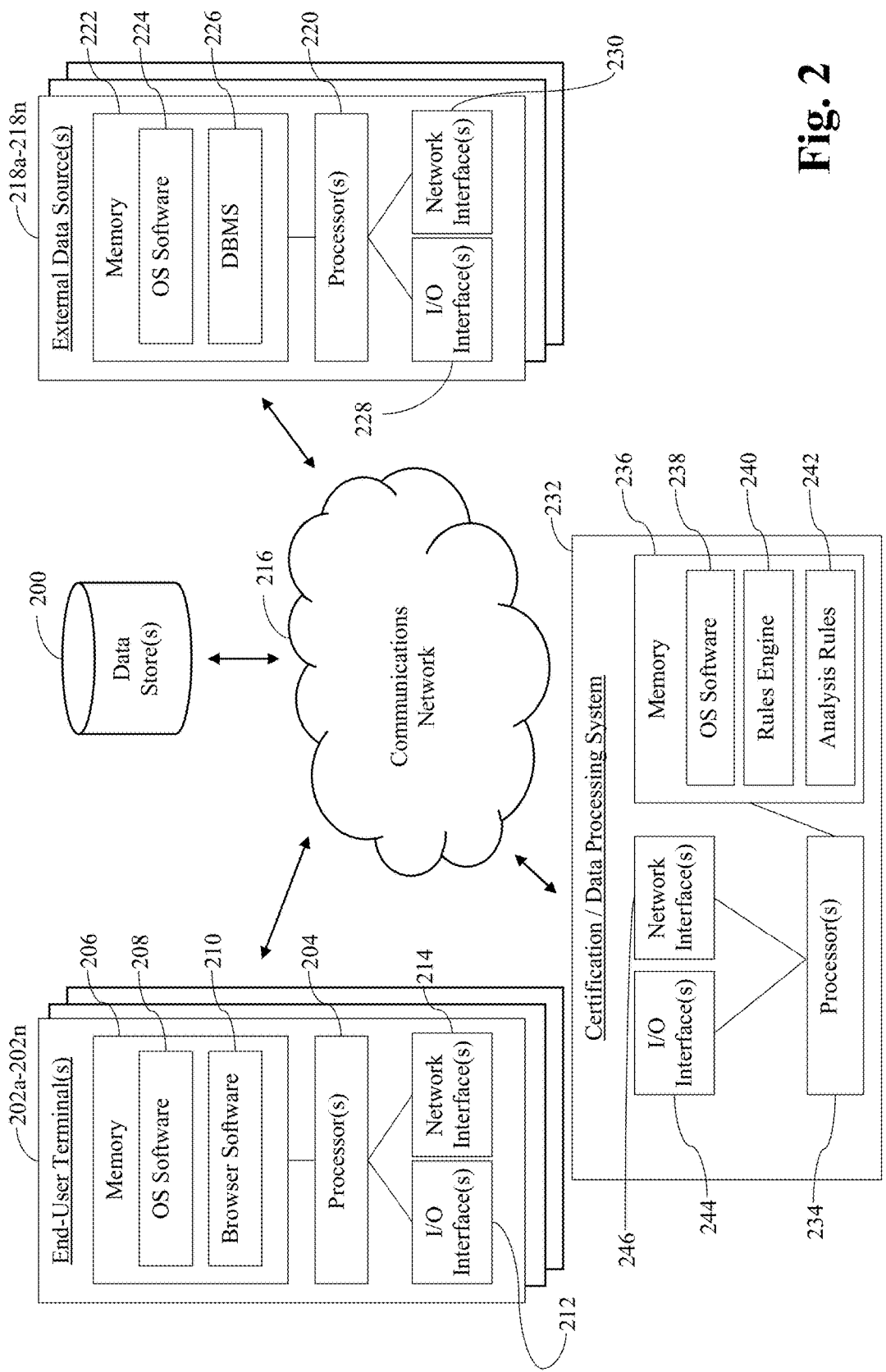
FIG. 2 is a block diagram showing an example computer architecture that may be used to implement the higher-level components and functionality shown in FIG. 1.

An example implementation will now be provided, e.g., in connection with the FIG. 2 example architectural diagram, and the flowcharts and screenshots that follow. It will of course be appreciated that the functionality described herein may be implemented in connection with different hardware backbones and/or different front-end graphical user interfaces. Thus, the description that follows is provided by way of example.

FIG. 2 is a block diagram showing an example computer architecture that may be used to implement the higher-level components and functionality shown in FIG. 1. As FIG. 2 includes end user terminal(s) 202a-202n. These end-user terminal(s) 202a-202n may be used by consumers (e.g., to submit financial account credentials, credentials for other relevant accounts such as tax related accounts, payroll accounts, etc., documents, consent to access other data sources such as credit reports, and other similar information, respond to requests for further information from lenders or others, define binders and access rights thereto as discussed in greater detail below, etc.), lenders or others (e.g., to facilitate the review of submitted applications, initiate requests for more information, etc.), and/or others. The terminal(s) 202a-202n may include processing resources such as, for example, one or more processors 204 and a memory 206 operably coupled thereto. The memory 206 may include operating system software 208, as well as browser 210 or other stand-alone application software that facilitates interactions with other systems, e.g., as described in greater detail below. The I/O interface(s) 212 facilitate the receipt of information from users and may include, for example, keyboards, mice, scanners, and/or the like. The network interface(s) 214 provide a communications link with the communications network 216 which may be, for example, the Internet or the like.

External data sources 218a-218n may represent one or more of the following and/or other systems from which data may be obtained: one or more banks, the IRS, brokerage houses, public information sources, credit rating services, payroll facilitators, tax software providers, etc. The external data sources 218a-218n also may include processing resources such as, for example, one or more processors 220 and a memory 222 operably coupled thereto. The memory 222 may include operating system software 224, as well as a database management system 226 that houses data retrievable by the system, e.g., when appropriately authorized. Similar to the above, I/O interface(s) 228 and network interface(s) 230 are provided.

Data provided by the end users and/or from the external data source may be stored to one or more secure data stores 200. The one or more secure data stores 200 may be accessible via the communications network 216 and may include, for example, user-provided data, data retrieved from the external data sources 218a-218n upon the request of a consumer, rules as to who can access such data and when such data can be accessed, etc. The one or more secure data stores 200 may be backed by a server or other computer related computer hardware, etc. It will be appreciated that the one or more secure data stores 200 include non-transitory computer readable media.

Using information from the one or more secure data stores 200, the certification/data processing system 232 may facilitate the review of data from applications, data retrieved from the data sources outlined above as well as other data sources, documents and other files, data sources that do not require consent from the consumer to retrieve data, data sources that are created within the system based on techniques such as, for example, analytics, heuristics, machine learning and other data science techniques and technologies, workflow collaboration, and/or the like. In this regard, the certification/data processing system 232 may include processing resources such as, for example, one or more processors 234 and a memory 236 operably coupled thereto. The memory 236 may include operating system software 238, as well as a rules engine 240 (which may be implemented as hardware, software, and/or the like) that operates in accordance with analysis rules 242. The Analysis rules may be system defined, vendor specific, and/or the like. The rules may specify conditions for flagging issues with applications and/or data provided. The rules may be simple or complex, and they may be implemented as logical statements that can be evaluated, heuristics, scores, computations, models, and/or the like. The rules may be predefined and/or machine learned over time in a supervised and/or unsupervised manner. Similar to the above, I/O interface(s) 244 and network interface(s) 246 are provided.

When requested, the certification/data processing system 232 may attempt to retrieve consumer information from the data store(s) 200 and, if data sharing rules permit, identify and run a set of rules from the analysis rules 242 using the rules engine 240. Results may be communicated to the consumer, loan originator, and/or other parties. Additional information may be requested to help resolve issues, etc., and the system as a whole may facilitate the sharing of data and cooperative resolution of such issues.

The various network interface(s) 214/230/246 may include network cards, wireless transceivers, application programming interfaces, and/or the like. The OS software 208/224/238 running on the various hardware elements may be the same or different. That is, the various computing devices may be a part of a heterogeneous computing environment. The communications network 216 may include the Internet as noted above, and/or one or more LANs, WANs, VPNs, and/or the like. Data may be passed across the communications network 216 in an encrypted format.

Figure 3:
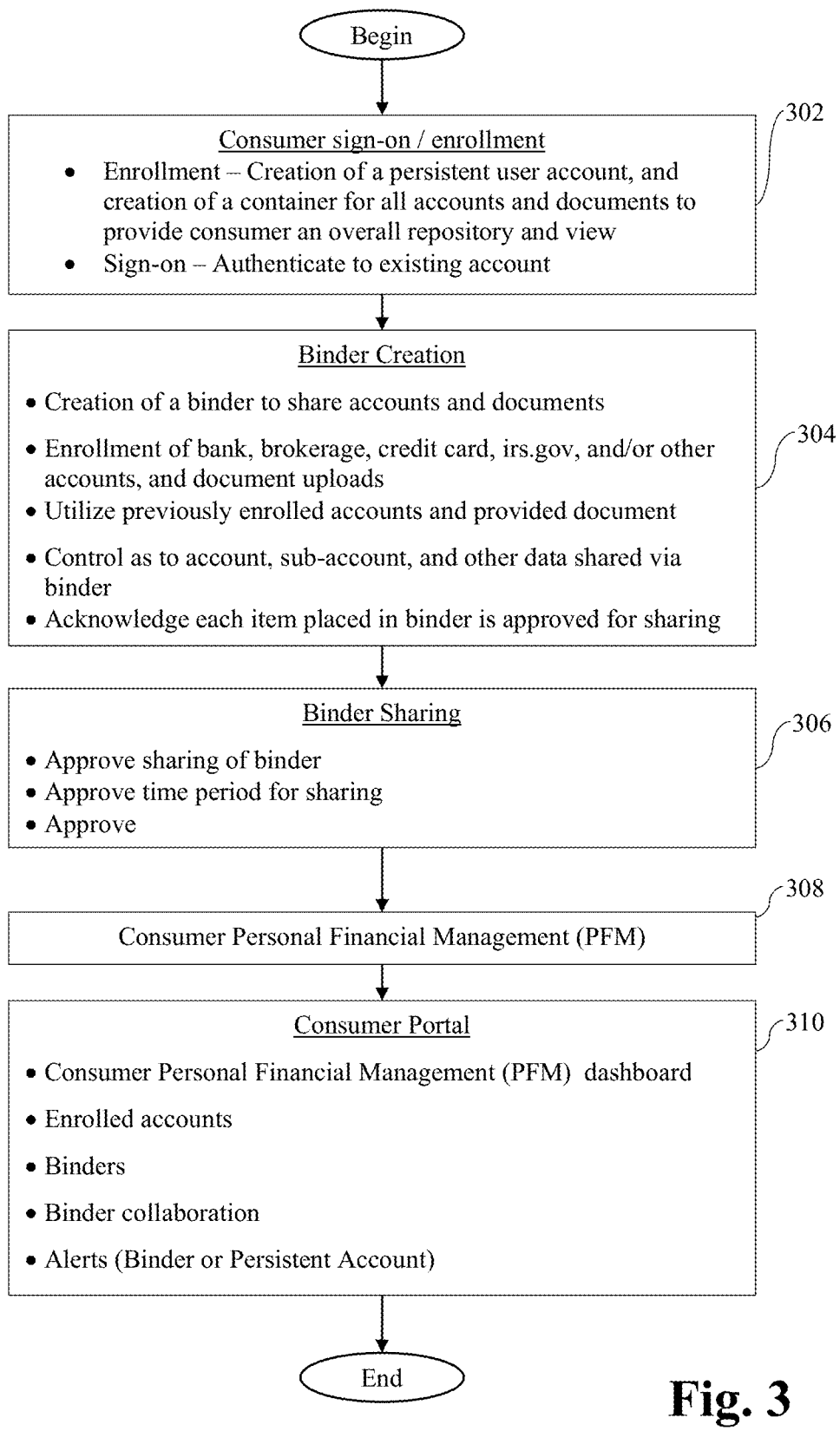
FIG. 3 is a flowchart showing, at a high level, a process that a consumer might use in registering with the system and enrolling account in accordance with certain example embodiments.

FIG. 3 is a flowchart showing, at a high level, a process that a consumer might use in registering with the system and enrolling accounts in accordance with certain example embodiments. As shown in FIG. 3, in step 302, a consumer signs on or enrolls in the system. The consumer is able to enroll specific accounts and/or provide additional information in step 304. This may include, for example, the creation of a binder that facilitates the sharing of accounts, sub-accounts, documents, and/or other information. The binder itself may be thought of as a logical grouping of some or all of financial and/or other information that a consumer wishes to share with third party. The consumer may also provide directions to the system to enroll accounts from banks, brokerage institutions, credit cards, irs.gov accounts, etc. The system may include interfaces to facilitate the capture of such information such that, for example, the user need simply provide a username and password for such accounts, together with an optional indication as to which accounts or sub-accounts should be enrolled, etc. Previously enrolled accounts, sub-accounts, and/or other information may be added to a binder. It will be appreciated that multiple binders may be created and that the contents of the binders may vary.

In step 306, a binder is shared. This involves the consumer indicating that the binder may be shared and optionally specifying who the binder may be shared with, how long the binder may be shared for, and what purposes the binder may be used. Once a binder is shared, the consumer may be provided with visibility into who is using the data, how it is being used, when it is being used, what analysis is being performed on the data, whether any notes or documents are created with reference to the binder, etc. Consumer personal financial management (PFM) capabilities are also provided as a consumer benefit in step 308. In step 310, the consumer has access to the consumer portal, through which it is possible to access a PFM dashboard, access details of enrolled accounts and/or enroll further accounts (or delete or modify existing ones), access details or binders and/or create further binders (or delete or modify existing ones), access alerts created by the system (e.g., on behalf of another party), participate in collaborative activities with other parties, etc.

It will be appreciated that the FIG. 3 process may be initiated by the user, or in response to a request from a lender that has perhaps received a "normal" or "paper" mortgage application and seeks to redirect a consumer to the system of certain example embodiments.

Figure 4:
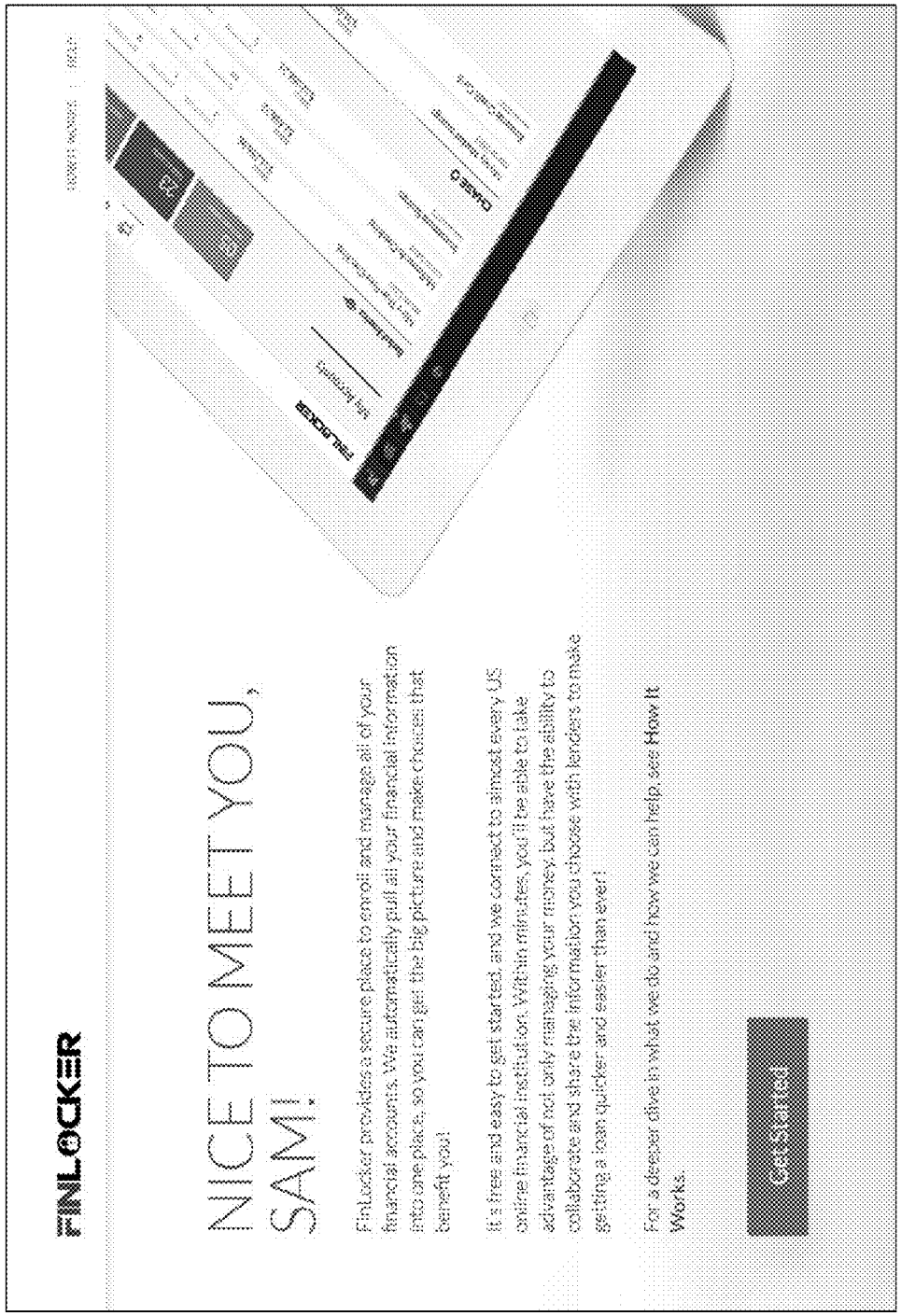
Figure 5:
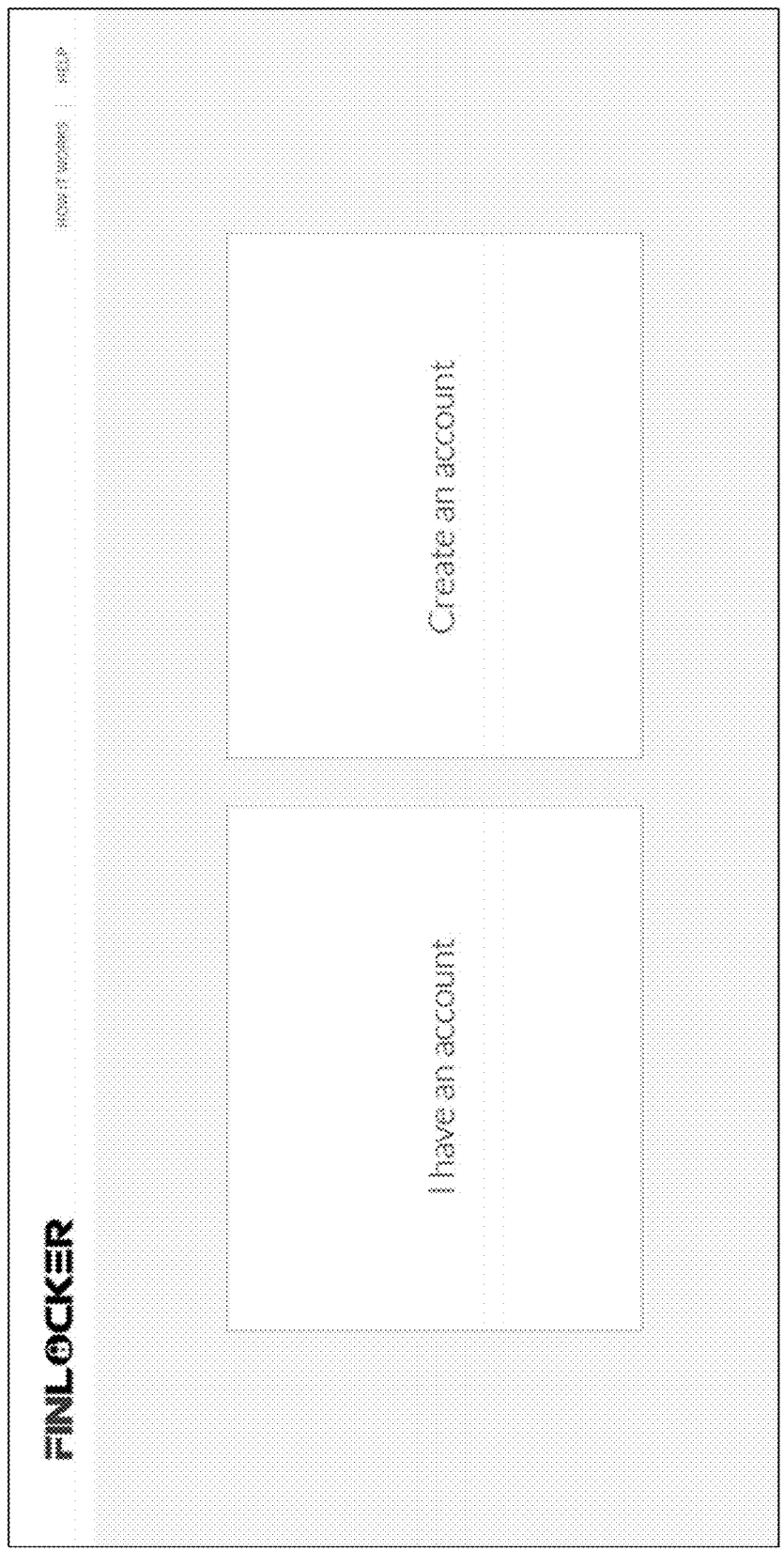

FIGS. 4-26 are example screenshots showing a consumer enrolling accounts in accordance with an example embodiment. FIG. 4 is an example welcome screen and, as shown in FIG. 5, a consumer can use an existing account to login to the system, or a new account may be created. If the system receives a request from a lender or other requesting party, the request may be held for a certain amount of time (e.g., 14 calendar days) so that the consumer can login or create an account and seamlessly respond to the request. The request may be tied to the consumer's email address, social security number, and/or the like. In certain example embodiments, the system may send an email or other notification to a consumer once a request has been received from the lender.

Figure 6:
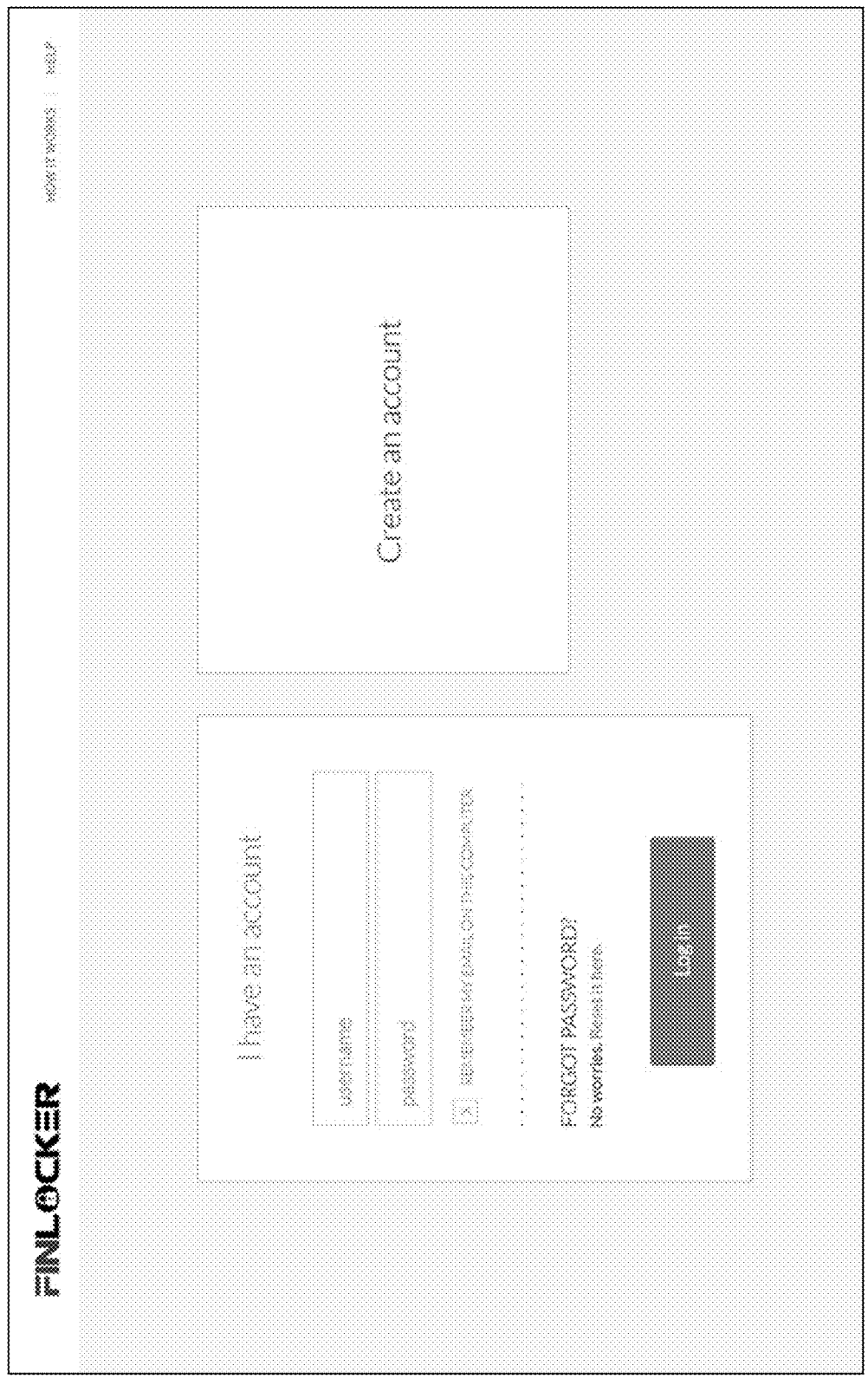
Figure 7:
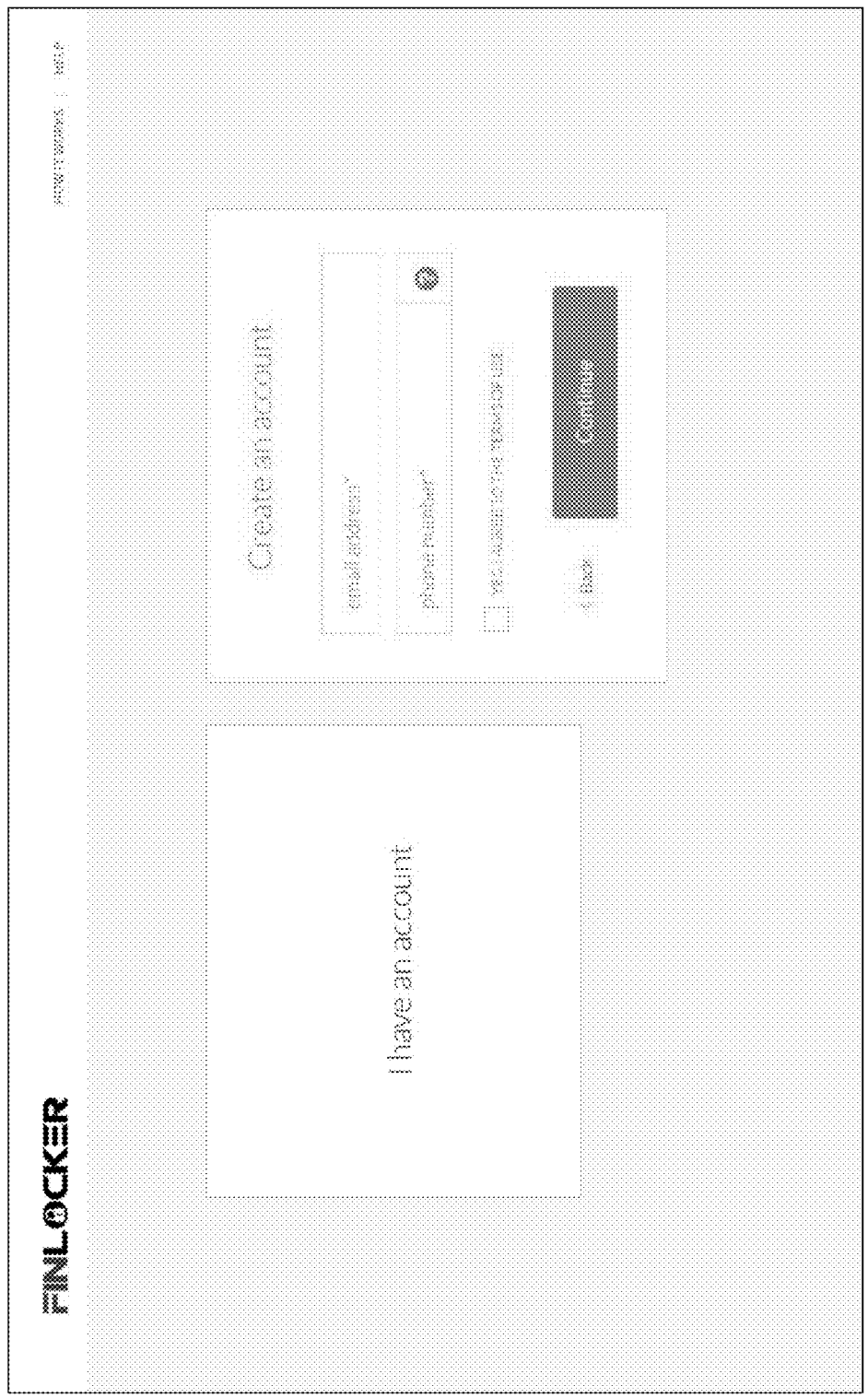

The FIG. 6 screenshot shows a consumer logging in using an existing account, and the FIG. 7 screenshot shows a consumer beginning the process of creating a new account. The use of Oauth (e.g., in connection with Google, Facebook, Microsoft Live, etc.) also may be supported. Multi-Factor Authentication may be implemented to help with high risk logins in case the Oauth provider is ever breached, or other similar issues arise.

Figure 8:
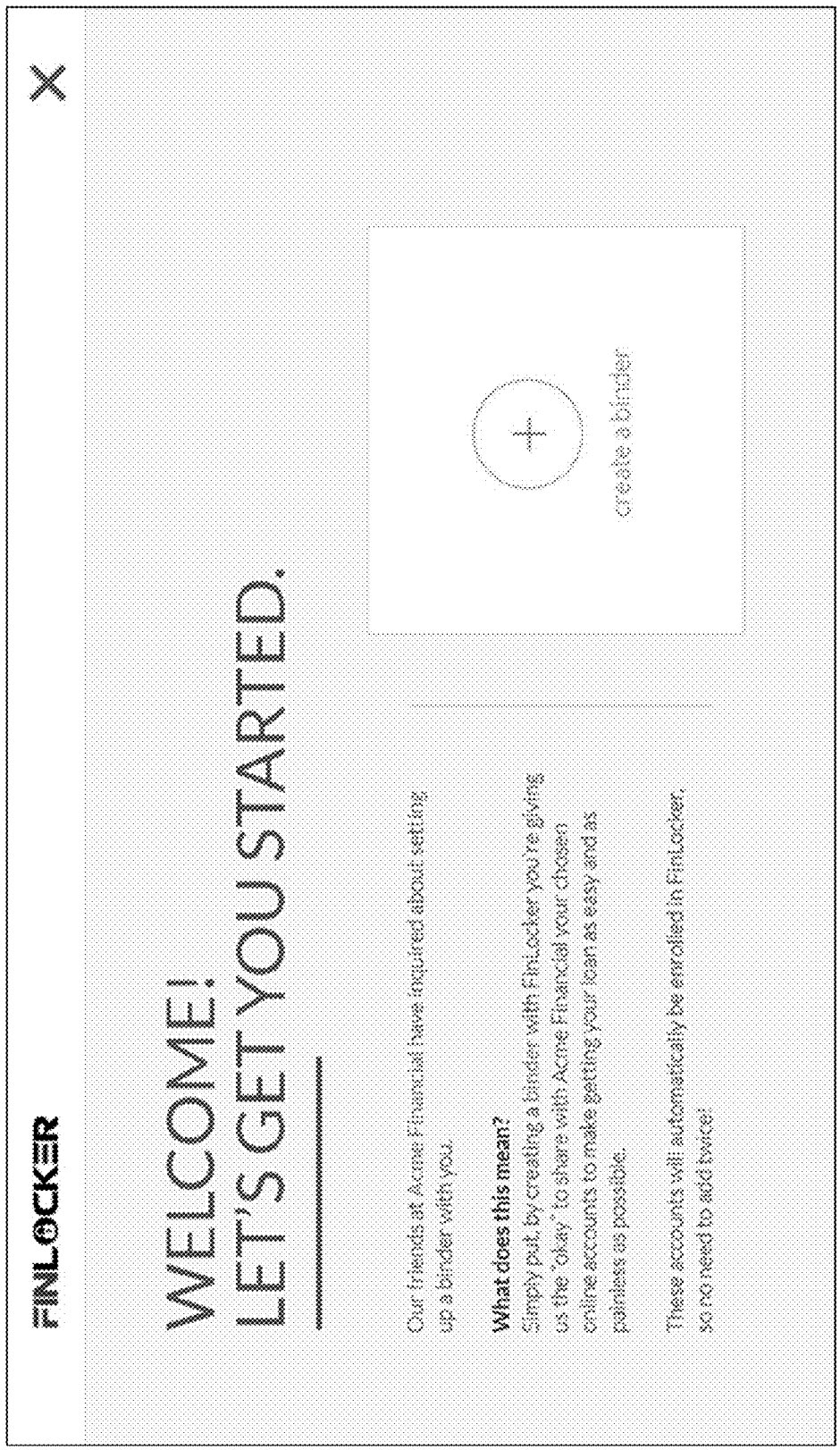

FIG. 8 shows the consumer creating a binder in response to a request from another party. The consumer is taken through a directed process to enroll their financial accounts for the first time, provide access to previously enrolled accounts from their persistent account, upload documents (e.g., tax returns), and/or upload any other information or account they wish to disclose to the other party. The consumer may name the binder at the time of creation and can later edit the binder to select a picture (e.g., from a list of stock pictures) and color to associate with their binder. The consumer may be given the opportunity to review existing binders and the accounts contained therein, and the consumer may copy and edit that binder to create the new binder.

Although this and the following screenshots represent a scenario in which accounts that need to be disclosed come from the lender, it will be appreciated that other scenarios are possible. For example, it may be the case that the lender specifies a minimum set of accounts to be enrolled and/or information to be provided. As another example, a lender may only provide the consumer's email address and loan number, and the consumer will have to self-direct the enrollment. In still other cases, the consumer may take the initiative to create a binder prior to an application being lodged and to optionally send the binder to one or more parties to streamline the process, determine options or secure multiple offers.

Figure 9:
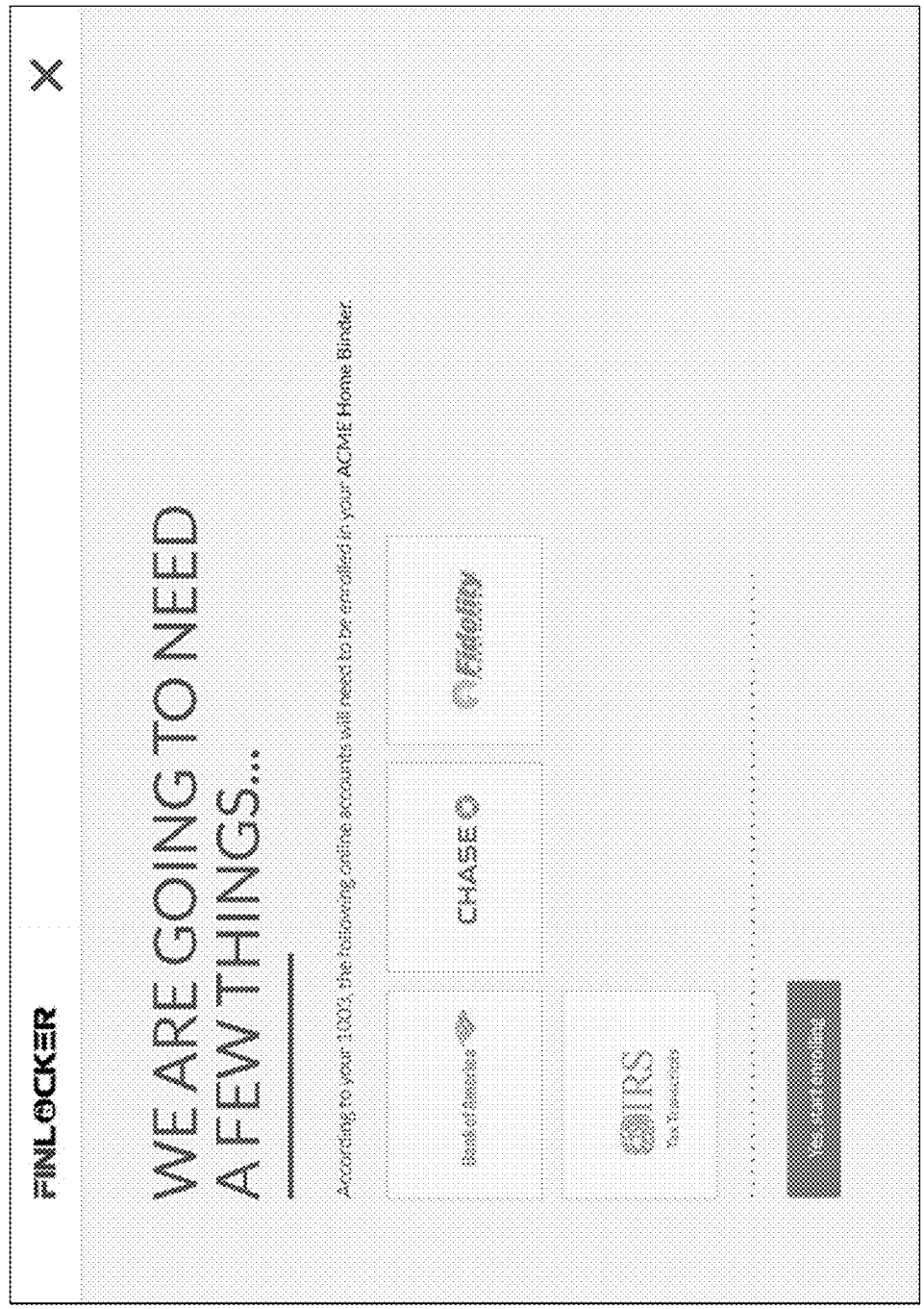

As shown in FIG. 8, after a consumer has either logged in or created an account, they are taken directly to their pending binder request(s) from this lender. The binder request that needs to be completed was determined by email that contained a link that identified this specific binder request, or the consumer was redirected to the web site by a link that specified this binder request from the party requesting access to the consumer's financial data. In the event that the consumer had logged directly into the web site and they have never enrolled accounts in their locker, if there is a pending request, the consumer will be taken directly to the pending request to begin the account enrollment and binder creation process. If the consumer already has accounts enrolled, the consumer will see the binder request in his/her alerts and can click the alert to navigate to begin the binder creation process. As can be imagined in other embodiments the specific workflow the consumer may be offered to enroll accounts and create containers to share their information can change significantly. FIG. 9 shows the accounts the lender is asking to access. Typically, in the process of a consumer applying for a mortgage, these accounts would have been disclosed on the loan application or would be additional information the lender knows will be needed (e.g., IRS tax transcripts for mortgages). The lender sends over to the system a request for whatever accounts, documents, reports, and other information they would like the consumer to provide them access to, and the system auto-populates the FIG. 9 with such information. The process shown by these screenshots corresponds to a scenario where the consumer does not have most of the requested accounts enrolled. If the consumer does have one of these accounts enrolled and it is clear which account the consumer needs to place in their binder, it may be suggested for automatic inclusion in the binder, or the consumer may be given a chance to select which financial accounts from a previously enrolled online account should be included to fulfill the request or whether enrolling a new online financial account is required. It is possible for a consumer to have multiple online accounts with a single institution so it is critical for the consumer to make sure they are including the correct online account and the correct financial accounts from within each online account.

The consumer is then taken through a process to enroll or provide access to each account shown. In FIG. 9, once the consumer clicks 'start enrolling', they are taken to enroll their first account in the request, which is Bank of America in this example. The consumer is presented in FIG. 10 multiple potentially matching institutions. The FIG. 10 screen may be used to select which online bank account is the correct one for the Bank of America account entered on the loan application. Certain example embodiments provide suggested accounts that are believed to be the closest match and/or enable the consumer to perform a more exhaustive search.

Figure 10:
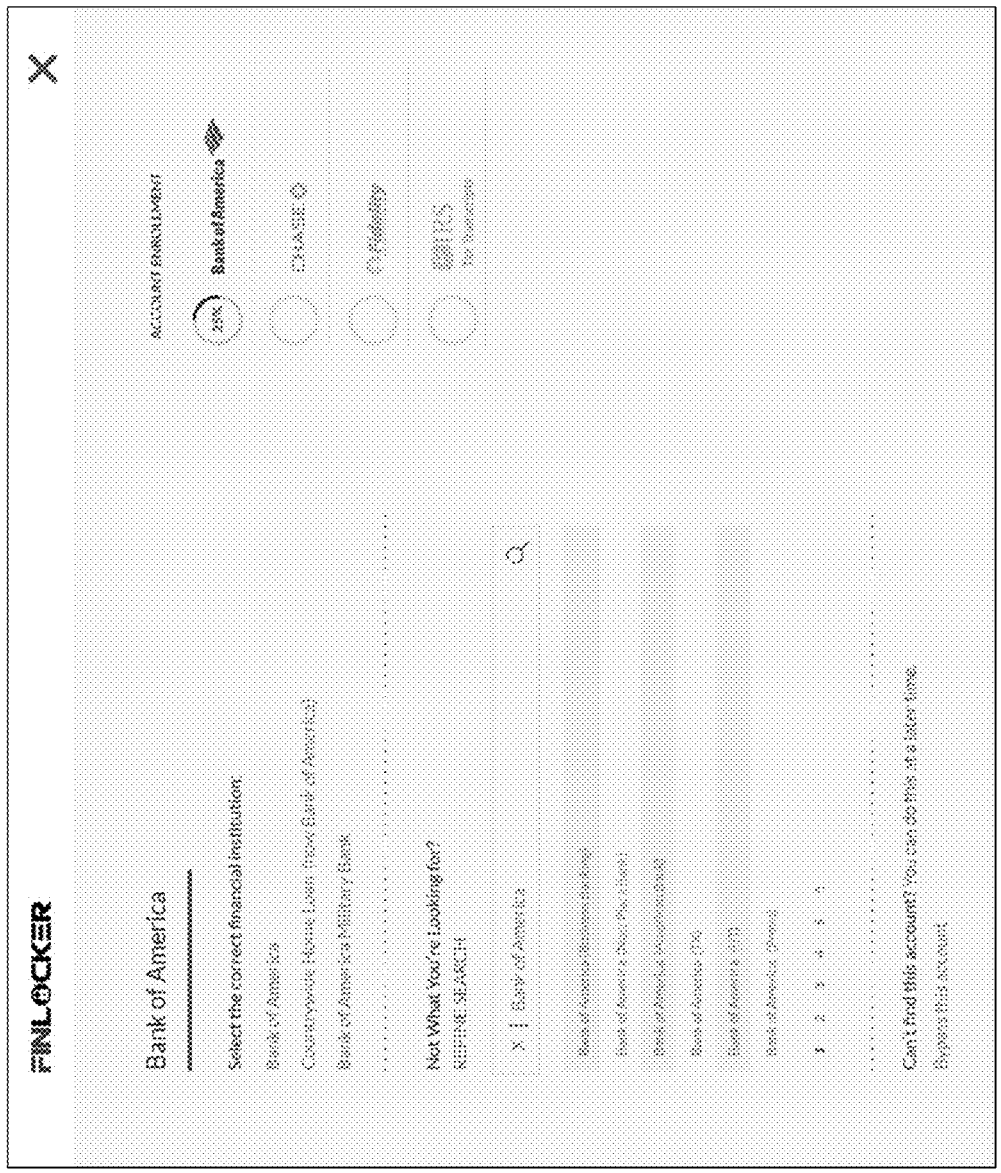

The FIG. 10 screen alternatively or additionally may notify the consumer if the consumer already has the selected online account enrolled and confirm whether the consumer wants to use it in this binder. Certain example embodiments prevent consumers from duplicating online accounts from the same financial institution (which may be facilitated by uniquely identifying accounts with a financial institution ID and consumer ID). Certain example embodiments enable consumers to select from all previously enrolled online financial accounts in case with a certain account or accounts were somehow omitted from the request from the lender and another account should be associated with the application. The consumer ultimately selects which of the financial institutions shown is the same as the institution identified in the request.

Figure 11:
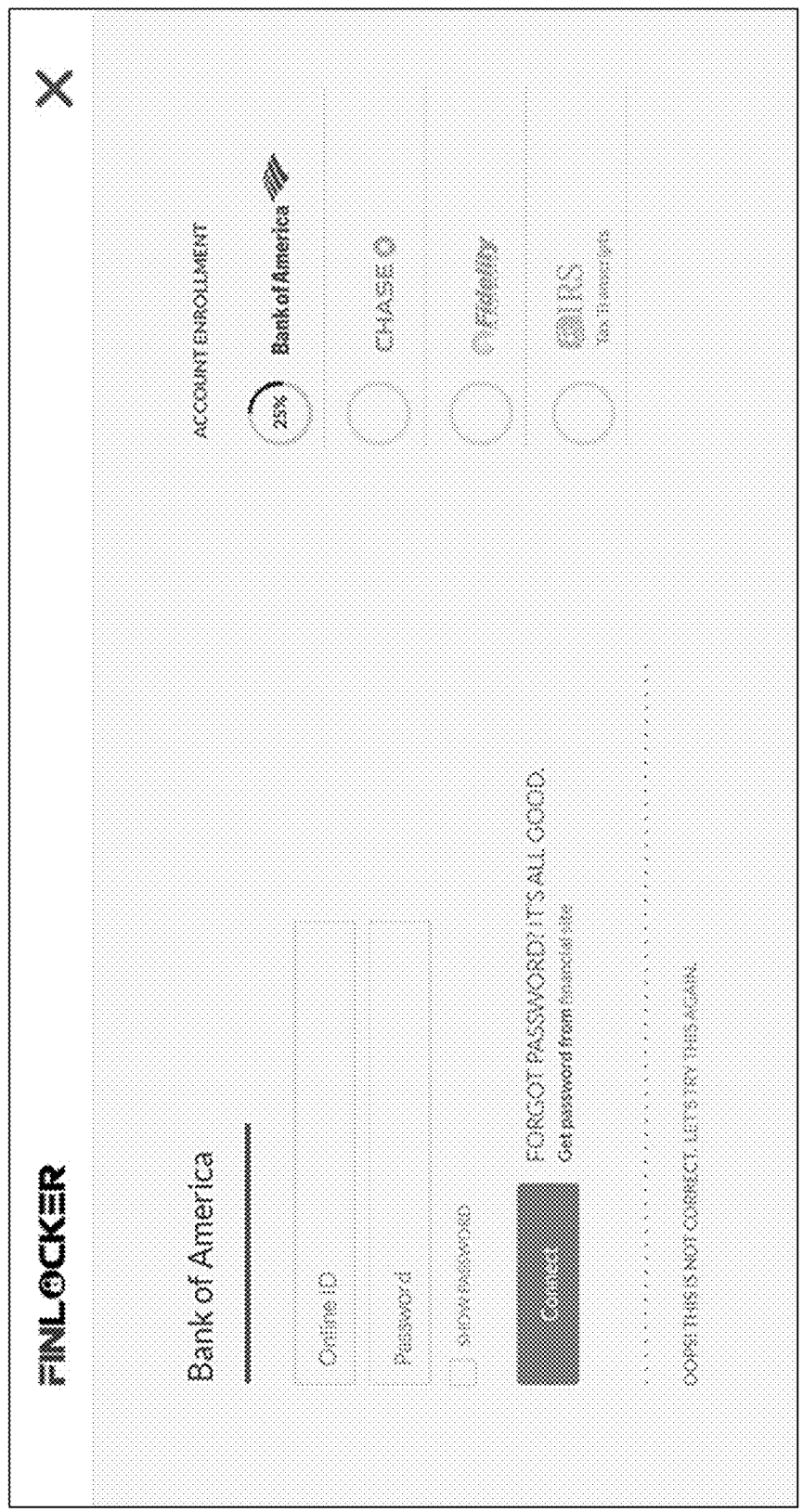
Figure 12:
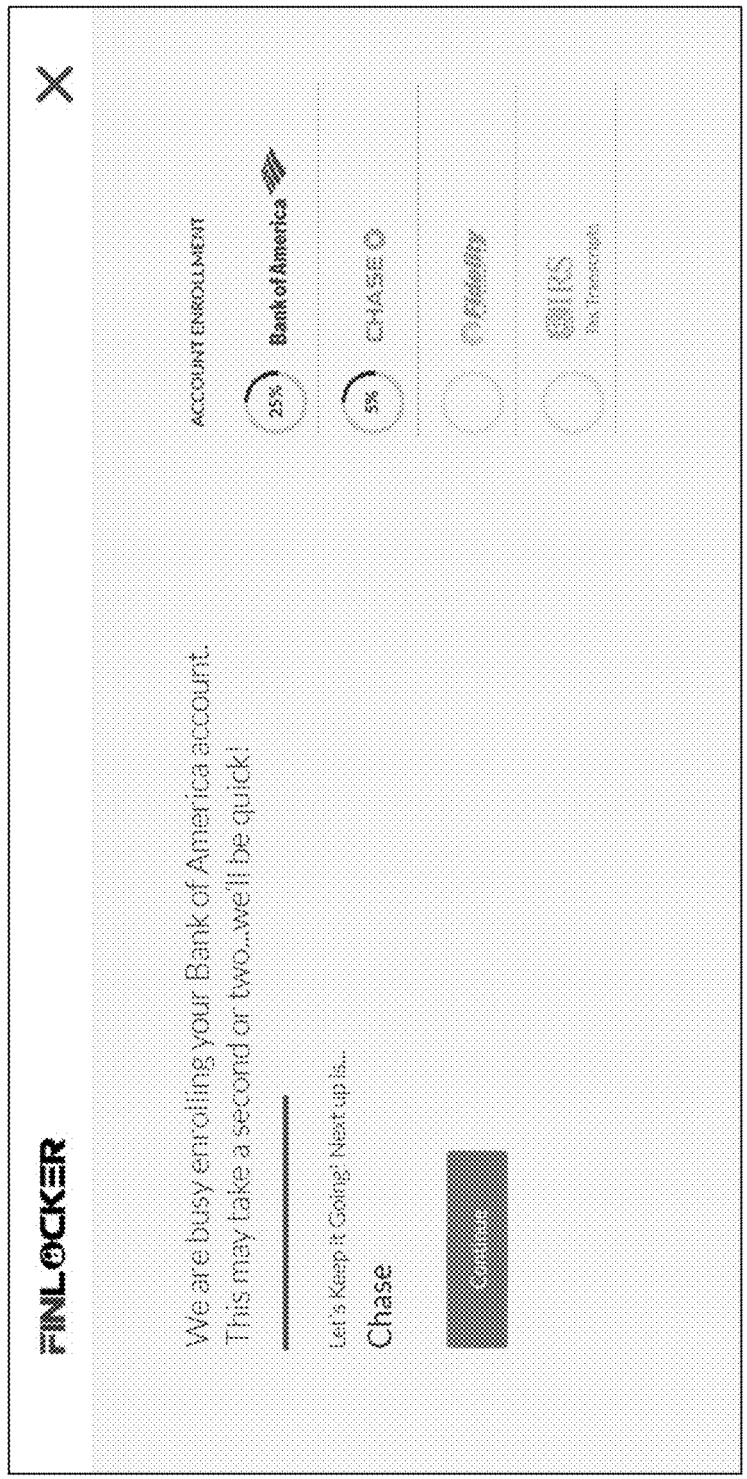
Figure 13:
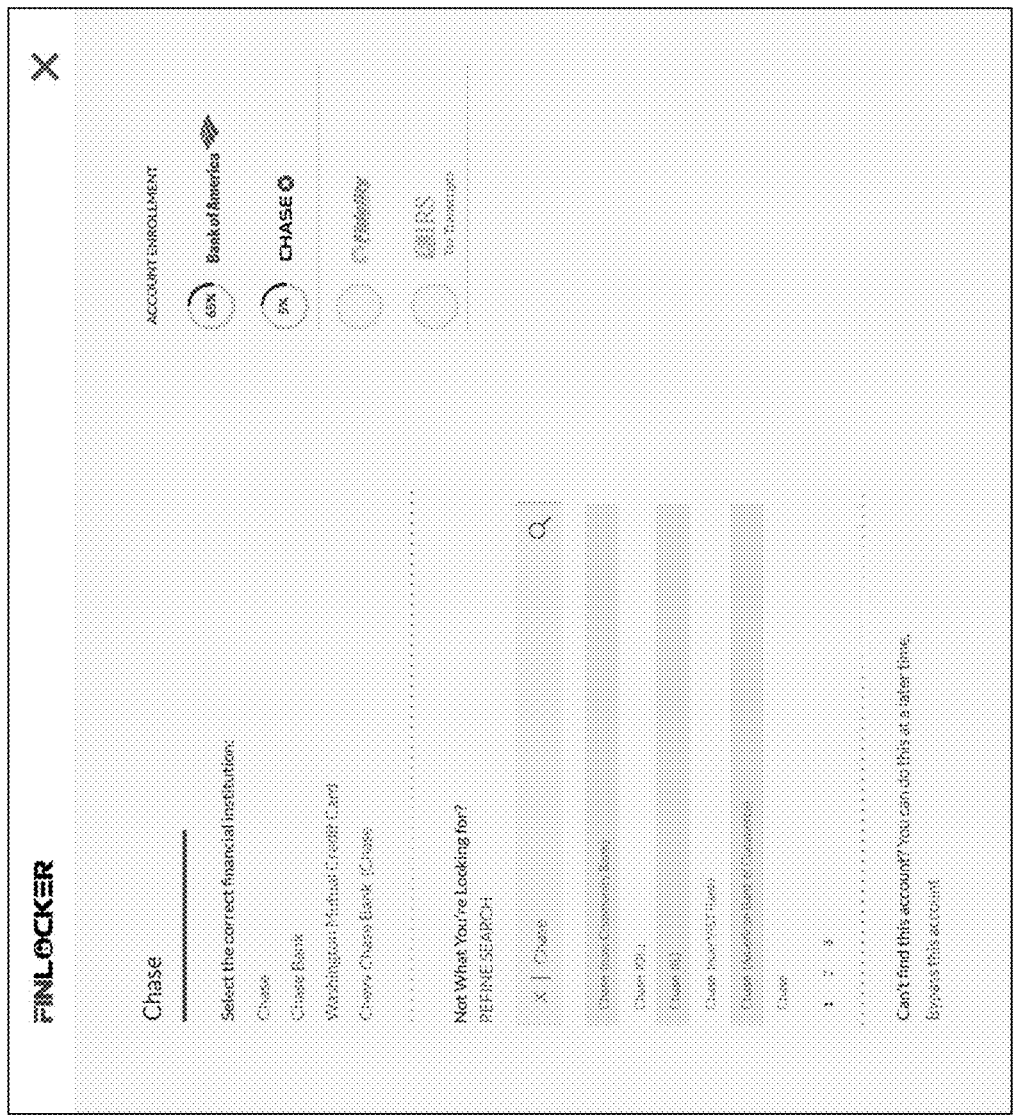

FIG. 11 is a screenshot that aids in "capturing" the consumer's User ID and password for the Bank of America online account. A progress indicator on right shows 25% progress for Bank of America online account enrollment. Below that are the other entities the lender has requested the consumer provide access to. If the consumer has forgotten the password, a link is provided to go to the lender's website to get or reset the password. For online bank, brokerage, and credit card accounts, certain example embodiments will not store the user's password and instead will only pass it through to an aggregation service (which may provide the connectivity to multiple unique data sources via a common application programming interface and a standardized data model so that the user of these data sources does not have to deal with the each one independently and each of their unique characteristics in terms of how to retrieve data and their specific data models) which allows authorized parties the ability to (with the consumer's consent and the consumer provided User ID or equivalent, password, and other authentication data) access the online financial accounts from a wide variety of entities including but not limited to: bank, brokerage, credit card, mortgage, other liability, insurance, and other accounts.

Once the consumer enters the User ID and password for this institution, a determination is made as to which data aggregation service will work best for the selected institution for this consumer. Program logic may help to determine the best aggregation service to use for this consumer and institution based on factors such as, for example, which aggregators support the institution, what the system's internal rating score for the aggregator is with this institution, costs for the aggregator, whether the consumer has multiple accounts with this aggregator, completeness of data, quality of data, etc.

The process of authenticating the financial account with the User ID and password provided by the consumer may take a while (e.g., typically about 1-2 minutes, but also perhaps higher or lower). Certain example embodiments therefore may continue this authentication process in the background and allow the consumer to proceed with the next institution in line, e.g., Chase, as suggested in FIGS. 12-14B.

Figure 14A:
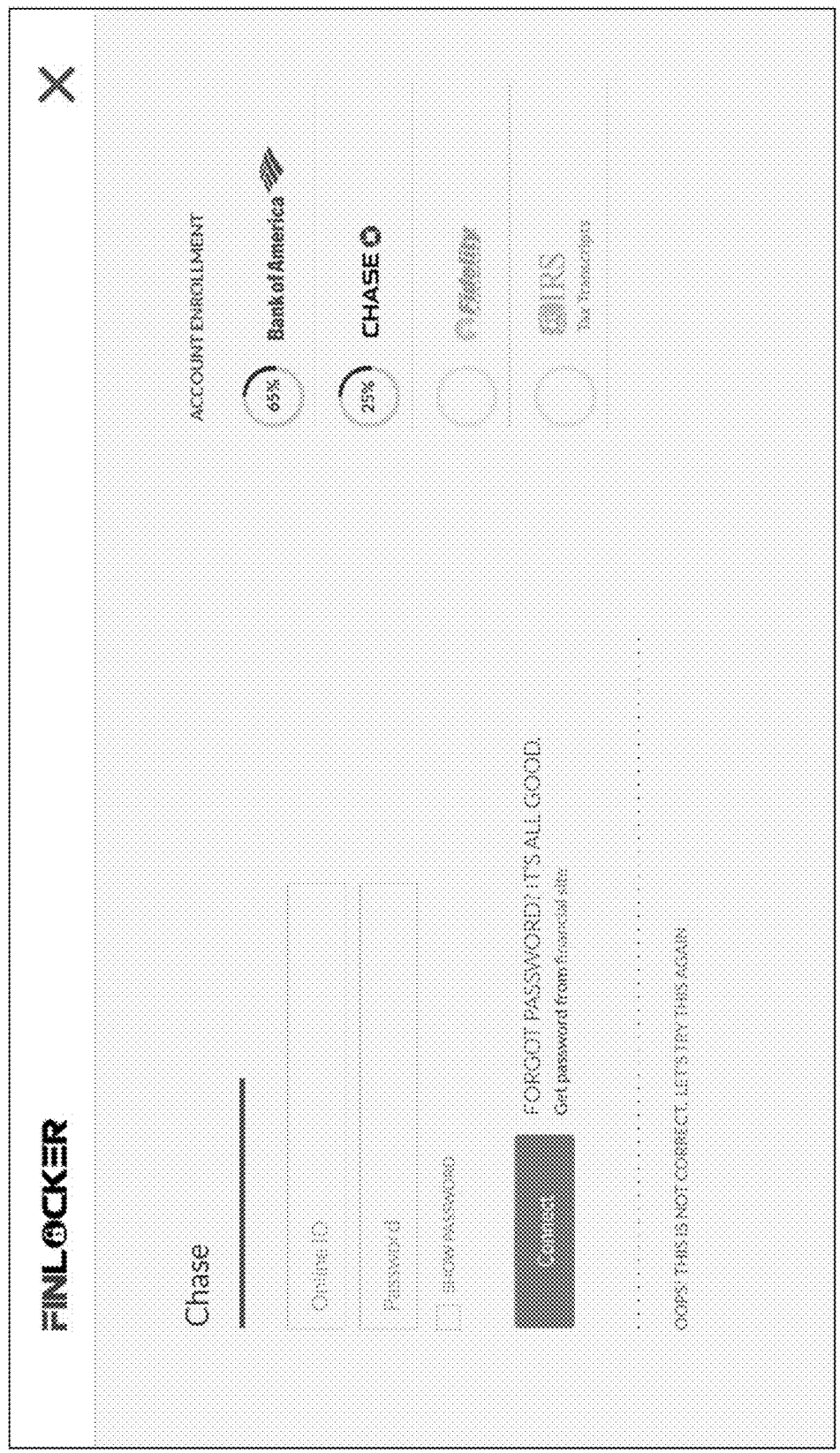
Figure 14B:
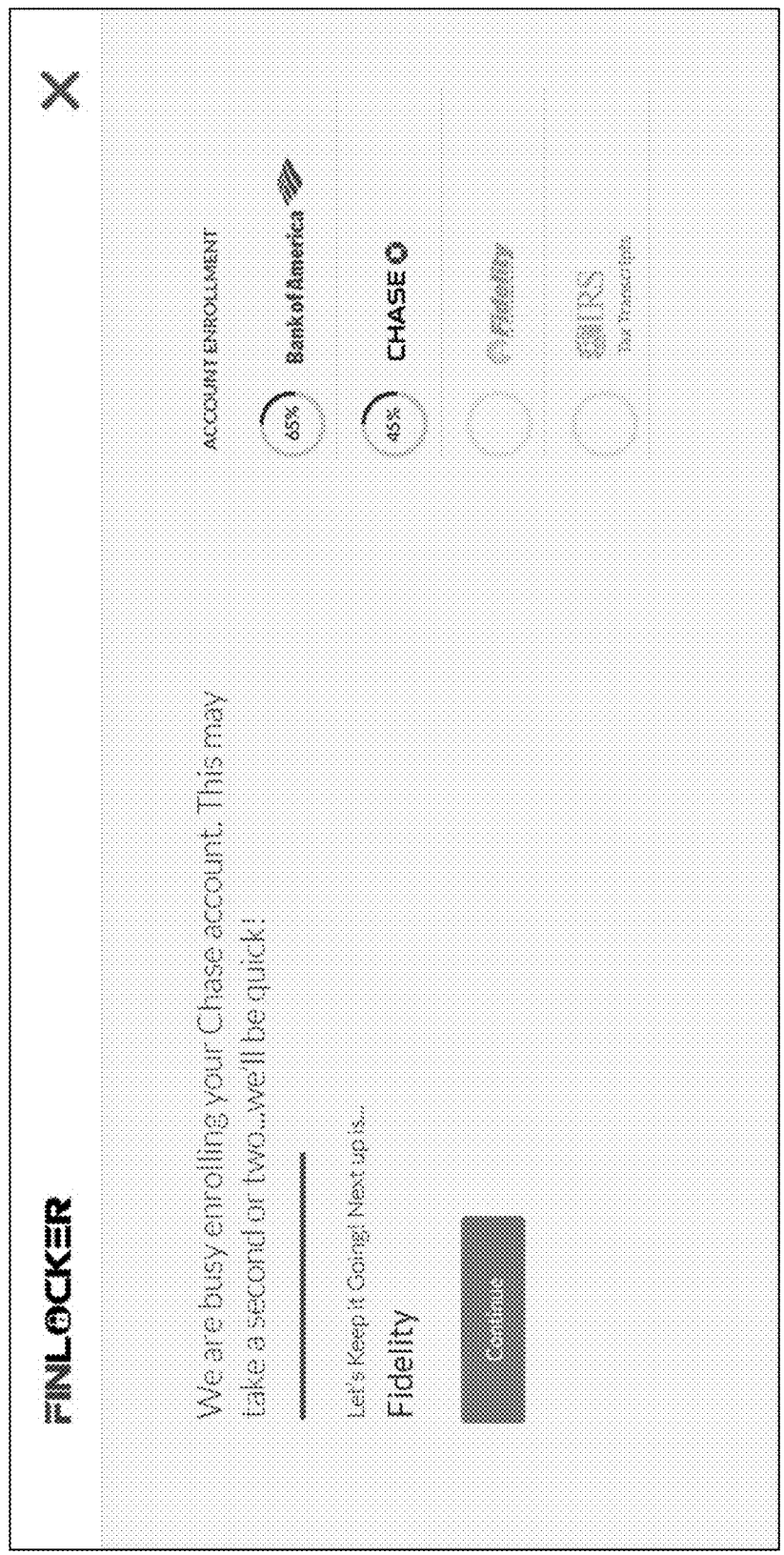
Figure 15:
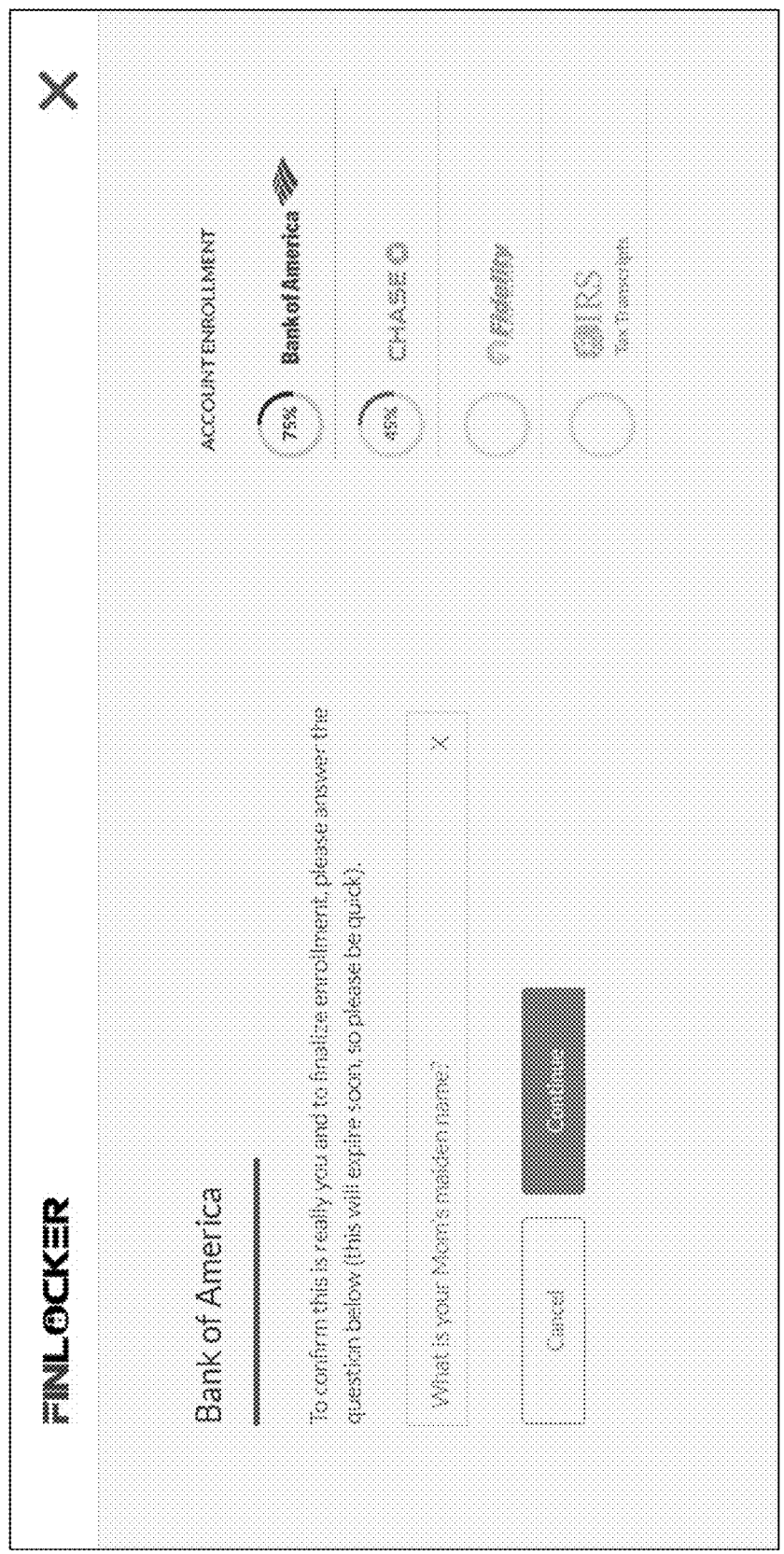

As shown in FIGS. 14A-B, the enrollment of the consumer's Chase account has reached a point where they are waiting on Chase to validate their credentials so they are moved to the next financial institution on the list which is Fidelity As shown in FIG. 15, in the main content area, Bank of America (the first institution enrolled in this example) has now moved to the forefront, preempting the consumer enrolling their Fidelity online account. Two things have occurred, namely, (1) the consumer has reached a logical breaking point in the enrollment process (e.g., the consumer's credentials are being validated with Chase, and is about to begin the enrollment process with Fidelity), and (2) Bank of America has indicated that it needs further input from the consumer, the consumer's authentication has failed, or the authentication is complete. As illustrated in FIG. 15, Bank of America has indicated it needs further input from the consumer in the form of the consumer providing an answer to one of the secret questions the consumer has on file with Bank of America. Once the answer is provided, the workflow moves forward.

Figure 16:
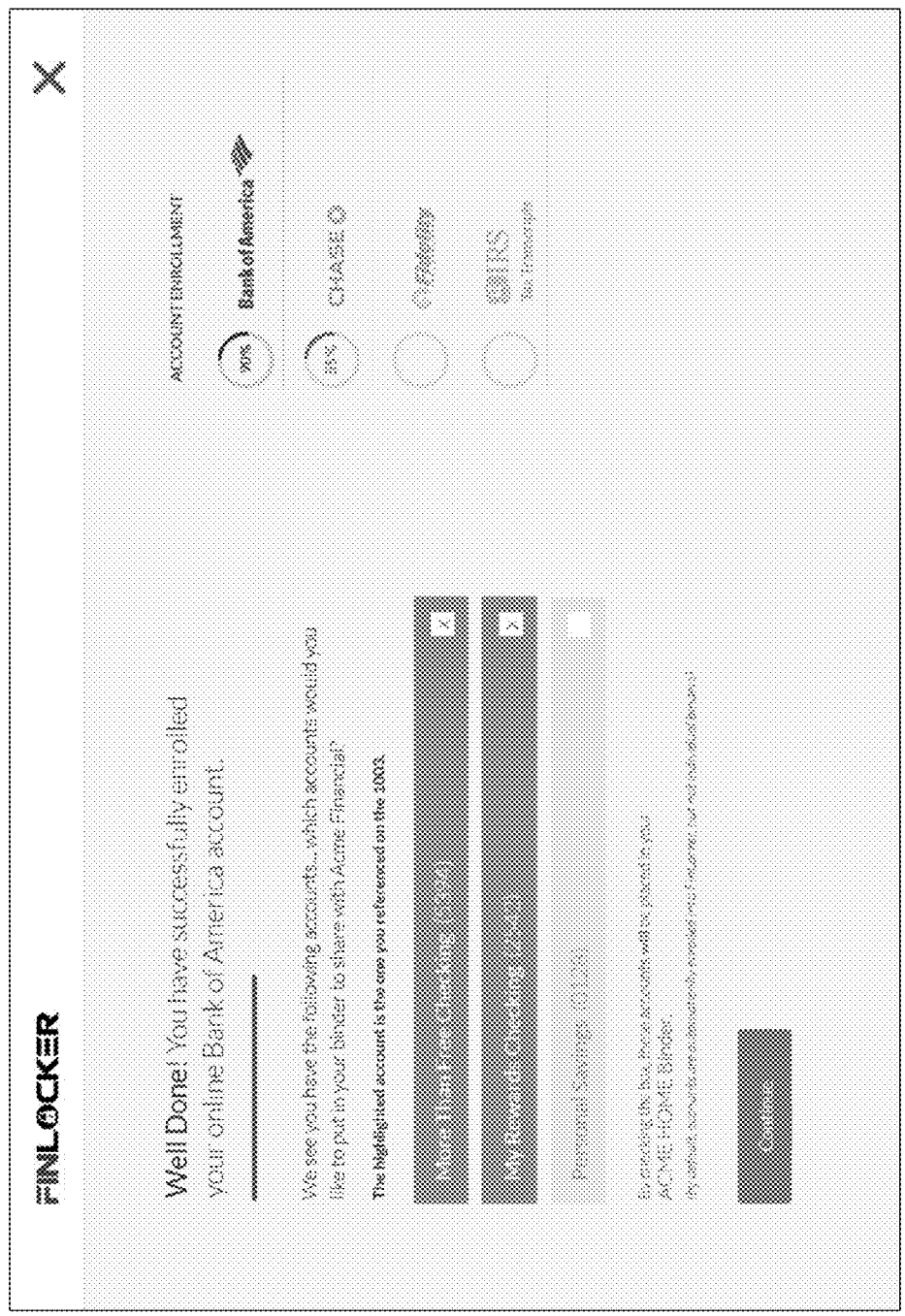

In one mode of operation, the system would present information for Chase or the next institution in line if Chase is still processing the consumer's login credentials while Bank of America validates the answer to the security question. In the FIG. 15 example case, however, confirmation was provided very quickly and, thus, an indication is provided that the consumer has completed the enrollment of the Bank of America online account. All of the sub-accounts (e.g., checking, savings, brokerage, credit card, etc.) will be enrolled automatically in the persistent account. In certain embodiments, all of the sub-accounts may also be automatically selected to be placed in the binder and the consumer is provided the option to de-select sub-accounts they do not wish to include in the binder. In other embodiments, no sub-accounts are automatically selected, but they may be highlighted to suggest these are the account or accounts the consumer may want to enroll. This typically occurs when the party submitting a binder request includes in the request not only the desired financial institution name, but also the specific account numbers or portions of account numbers that they desire access to. When the account numbers are provided, if one or more of the accounts retrieved from the financial have account numbers that match either partially or completely, those accounts will be highlighted, but not selected. If matching account numbers cannot be identified, then the consumer will have an opportunity to match the accounts provided by the financial institution to those identified in the request. The user must explicitly select which sub-accounts to place in the binder. In this example as illustrated by FIG. 16, the consumer has selected two of these sub-accounts is being placed in a binder that will be shared with another party (e.g., a lender) and thus the system will allow that party to retrieve info from these sub-accounts.

Figure 17:
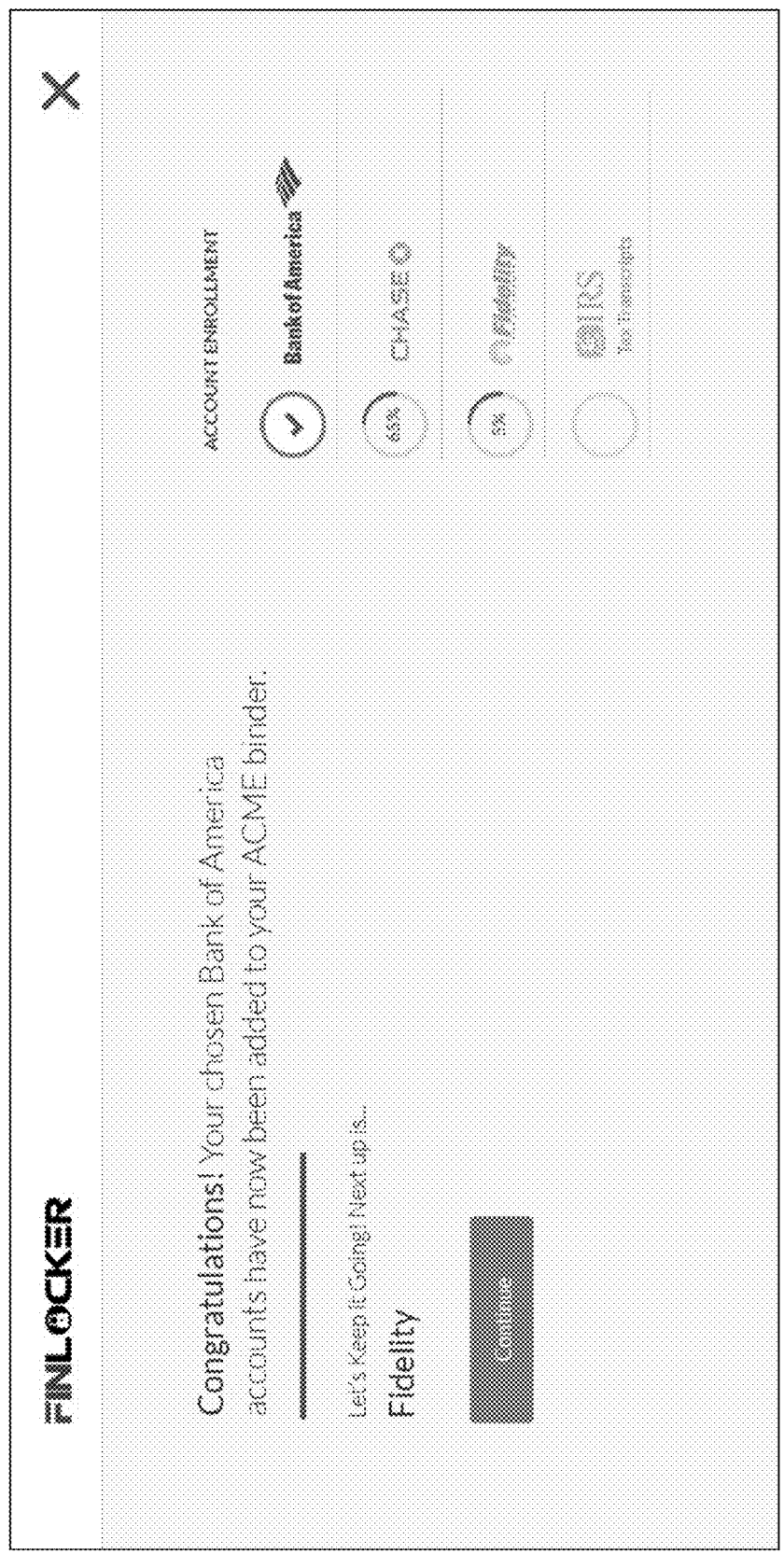

FIG. 17 shows that Bank of America has moved to 'Successfully Enrolled', and the presentation, in effect, returns to where the consumer left off. Chase is still busy processing the consumer's credentials, so the consumer starts the process with Fidelity.

Figure 18:

FIG. 18 shows the consumer they already have a Fidelity online account enrolled in their perpetual account so they only need to confirm this is the correct online account. It is possible the consumer has multiple online accounts with Fidelity (or any other institution), and if that was the case the consumer would be shown the all of the online financial accounts enrolled for the institution along with the underlying financial accounts to both to aid the consumer in identifying the correct online account, and to ease the selection of the financial accounts to place in the binder. If the consumer determines that the previously enrolled Fidelity online account is not the correct one, then they would choose "No, enroll another" and begin the enrollment process for Fidelity just as they have done for Bank of America and Chase earlier in this example. If the consumer accidentally selects to enroll a new Fidelity online account and uses the same User ID as was used for a Fidelity online account enrolled in their perpetual account, the system will detect this and inform them that the account is already enrolled. They will then be given the option to provide a different set of online account credentials or to use the previously enrolled online account. An alternate embodiment may be based on a particular sub-account type for Fidelity included in the request, which can determine whether a consumer may use a previously enrolled account (e.g., the consumer has enrolled two Fidelity online accounts, one of which contains 2 brokerage sub accounts and a retirement account and another which contains one brokerage sub account and one checking sub account, but no retirement accounts. The request, however, indicates that the desired sub-account is a retirement account. It then would not show the consumer any of the previously enrolled Fidelity online accounts as an option, and instead would take the consumer directly to enroll a new Fidelity online account which contains the retirement sub-account). For this example the consumer is going to use their previously enrolled Fidelity account which, as a result, means the Fidelity online account enrollment need not be repeated.

FIG. 18 shows the consumer the sub-accounts from this Fidelity online account, and the consumer may simply select the sub-accounts to be placed in the binder.

Figure 19:
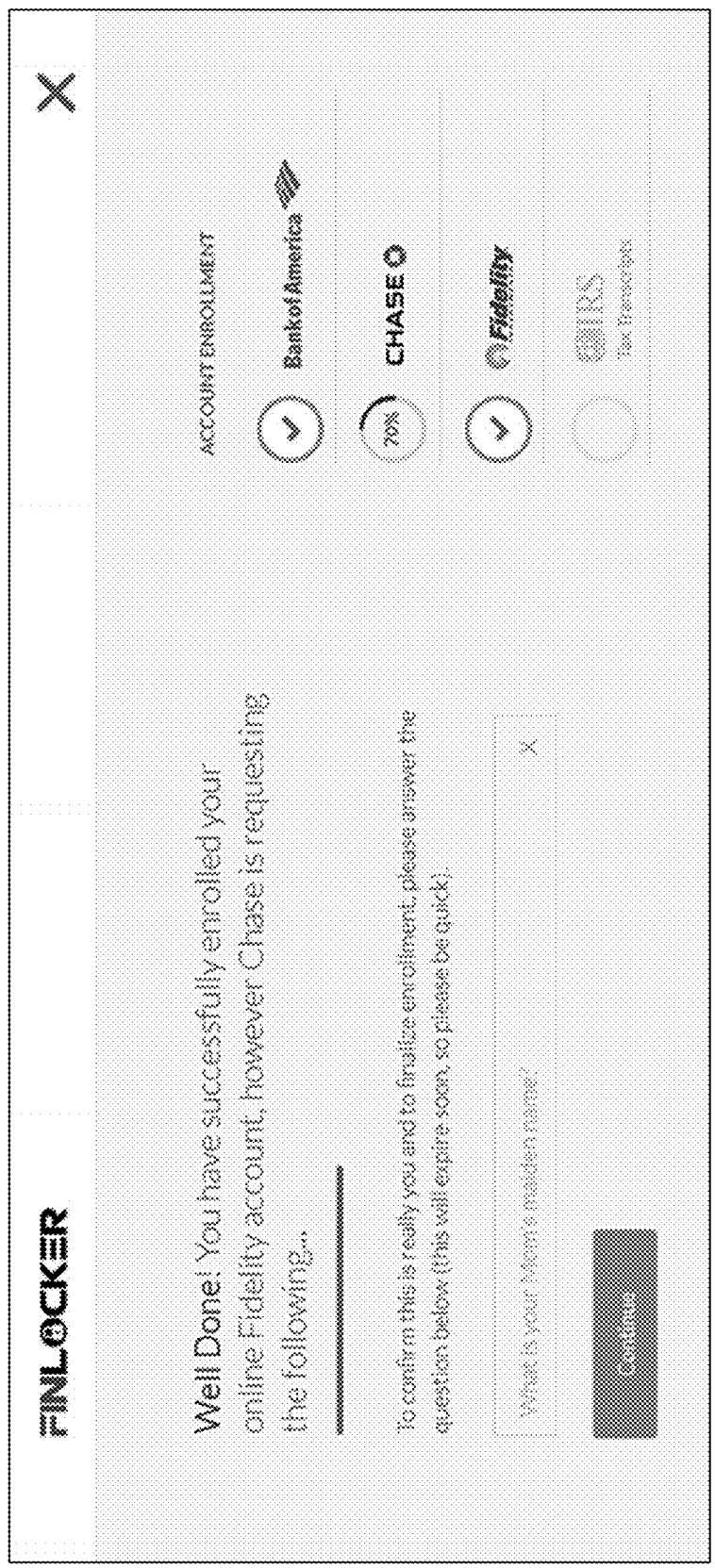

As shown in FIG. 19, a Chase screen returns to the forefront to complete a security question or other multi-factor authentication. The type of multi-factor authentication used, if any, may be specified by the financial institution, their level of trust with the aggregator, and (potentially) consumer preferences.

Figure 20:
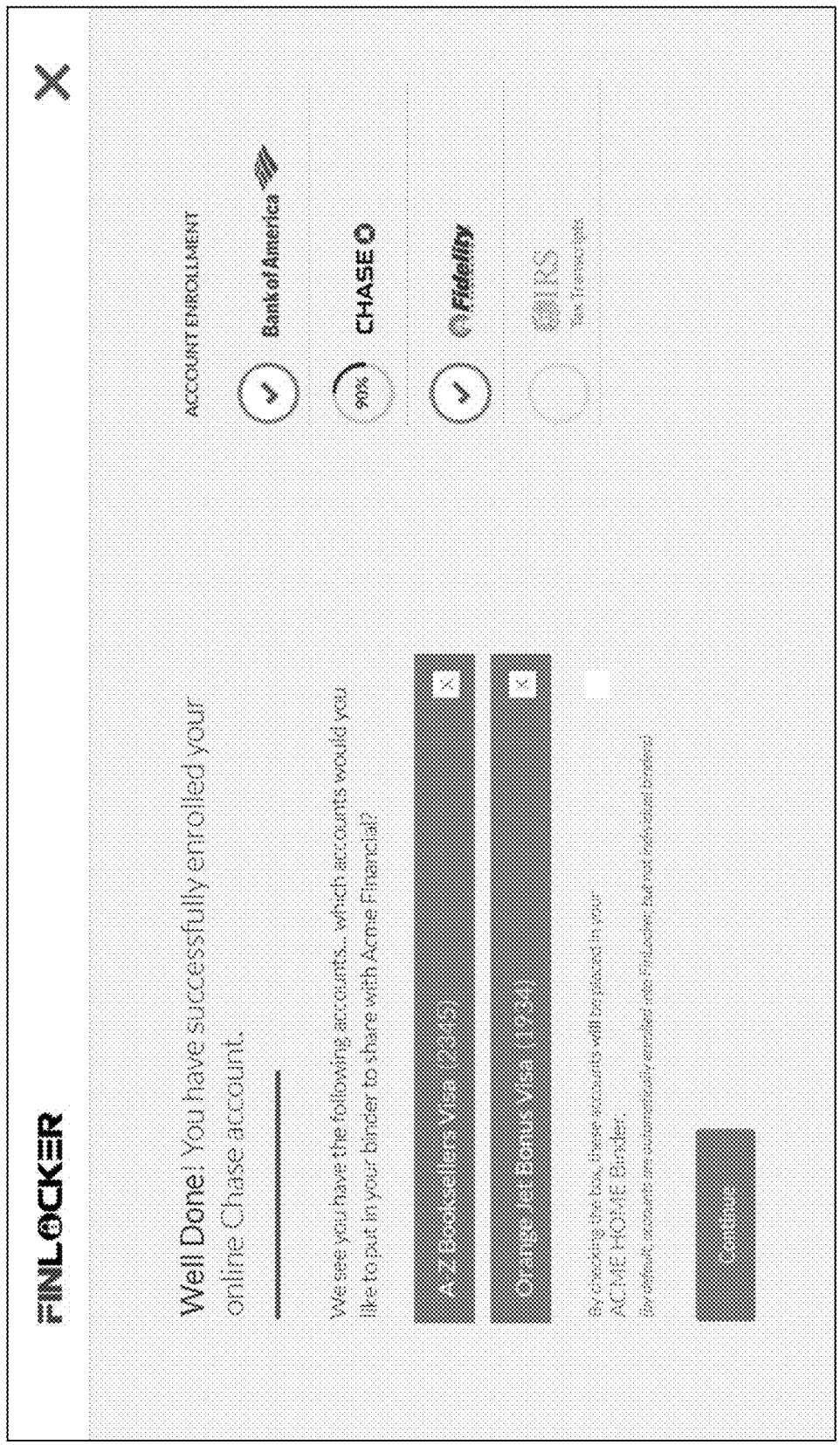

FIG. 20 shows how Chase sub-accounts may be selected such that they are placed in the binder for sharing.

In certain embodiments, at the time enrollment, the consumer may be asked whether the consumer has any additional accounts they need to enroll and then have the ability to provide the ability to add other accounts either not requested by the lender, or a screen that enables accounts to be enrolled if there is no received request for specific accounts. In the latter case, the consumer may reach this screen after passing through the initial login information and/or after each successive account is enrolled.

Figure 21:
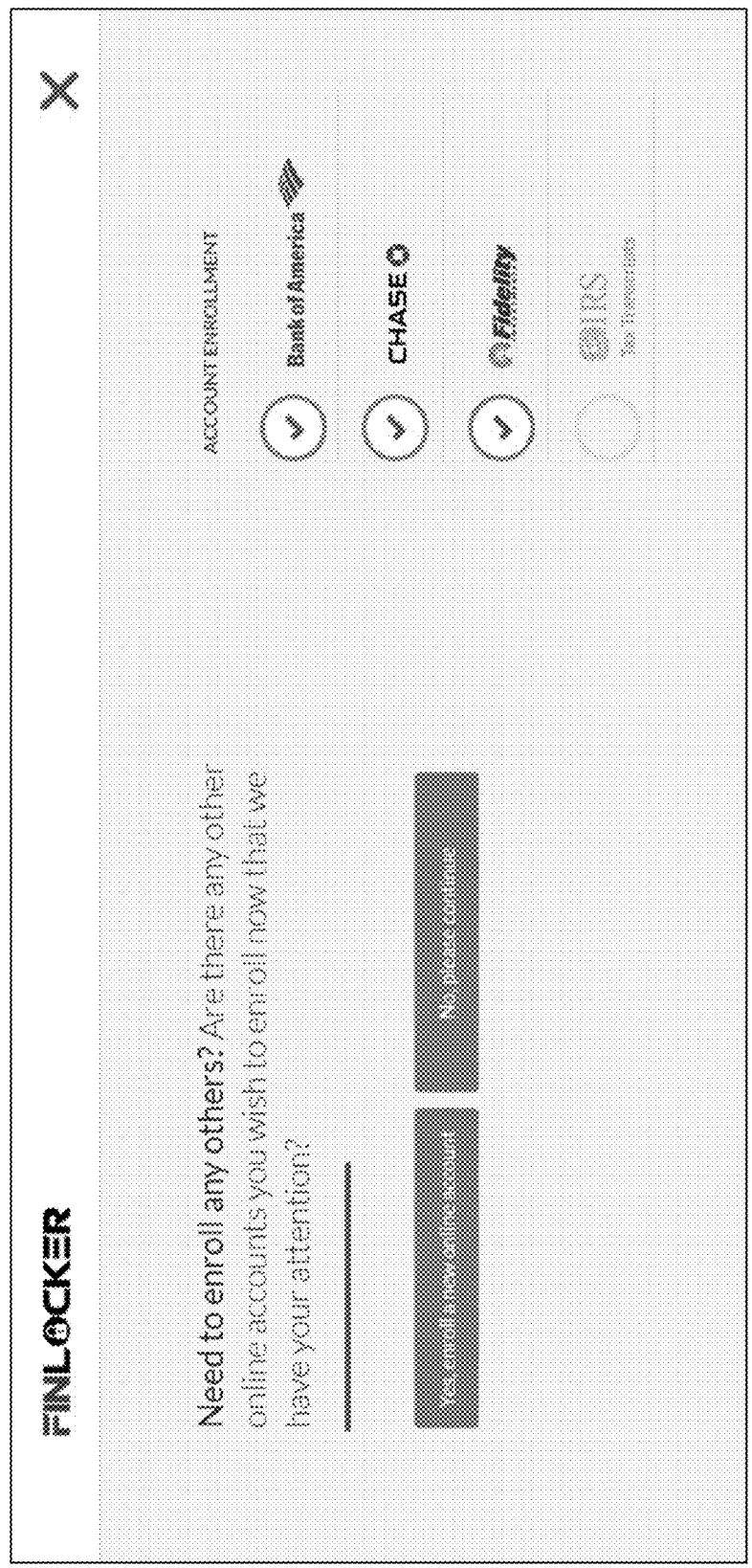

In FIG. 21, the consumer is given the option to add additional accounts. In cases where the consumer has received a request for the accounts to enroll, the consumer can enroll an online account they may have forgotten to disclose to the requesting party and place the necessary financial accounts into their binder. In the case where the consumer is either simply enrolling their financial accounts in their persistent account for use with the personal financial management features or for creating a binder which they may proactively share (e.g., push) to one or more parties. This allows them to add accounts until they have enrolled and/or shared all of the accounts needed.

Figure 22:
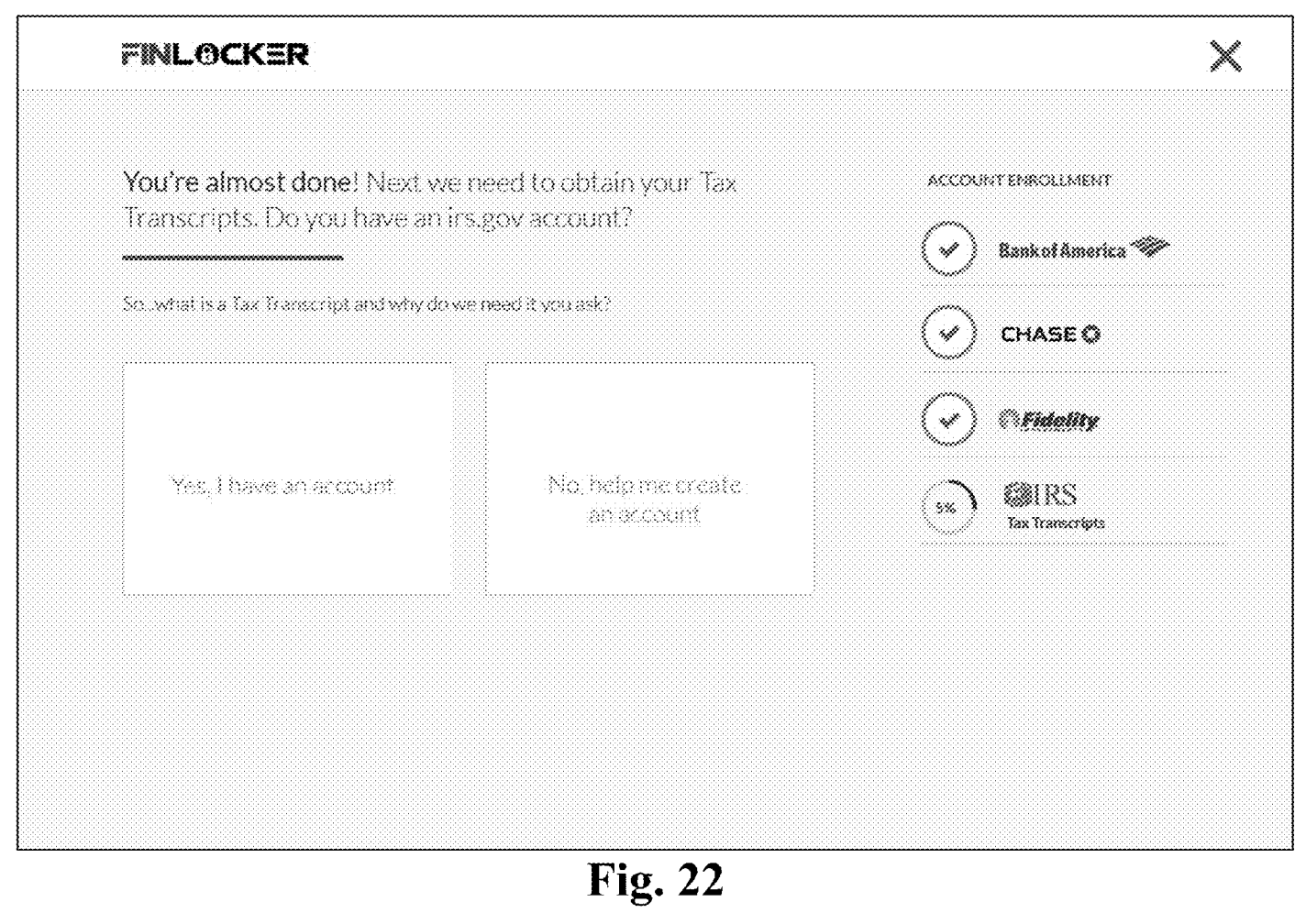

In addition to requests based on information disclosed by the consumer, the lender may also make requests for accounts to be enrolled or documents uploaded (tax transcripts, tax returns, pay statements, etc.) based on standard information needed to complete the lending process. One of the requests from the lender in this example was for access to the consumer's tax transcripts. As shown in FIG. 22, if the consumer already has an irs.gov account, ask the consumer to share the corresponding login credentials.

If the consumer does not have an irs.gov account, then certain example embodiments will help the consumer understand what it is and how to create one. This is shown in FIG. 23.

Figure 23:
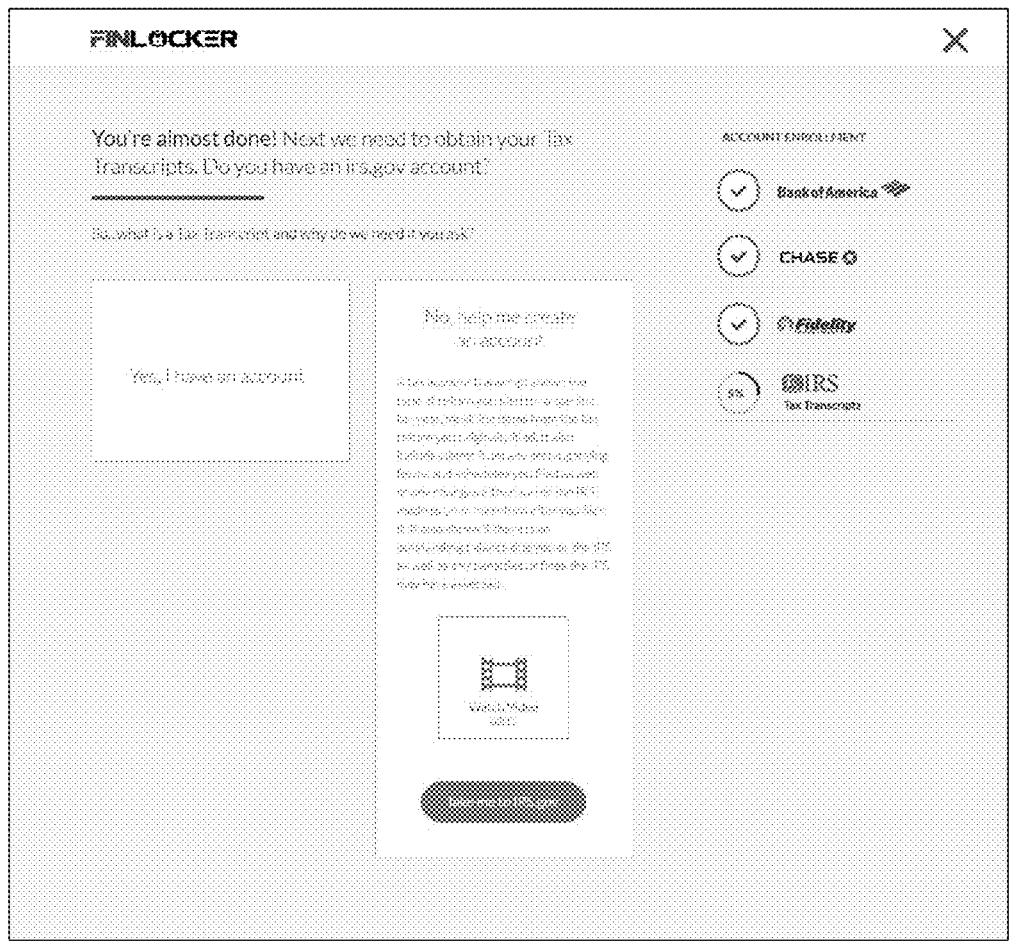
Figure 24:
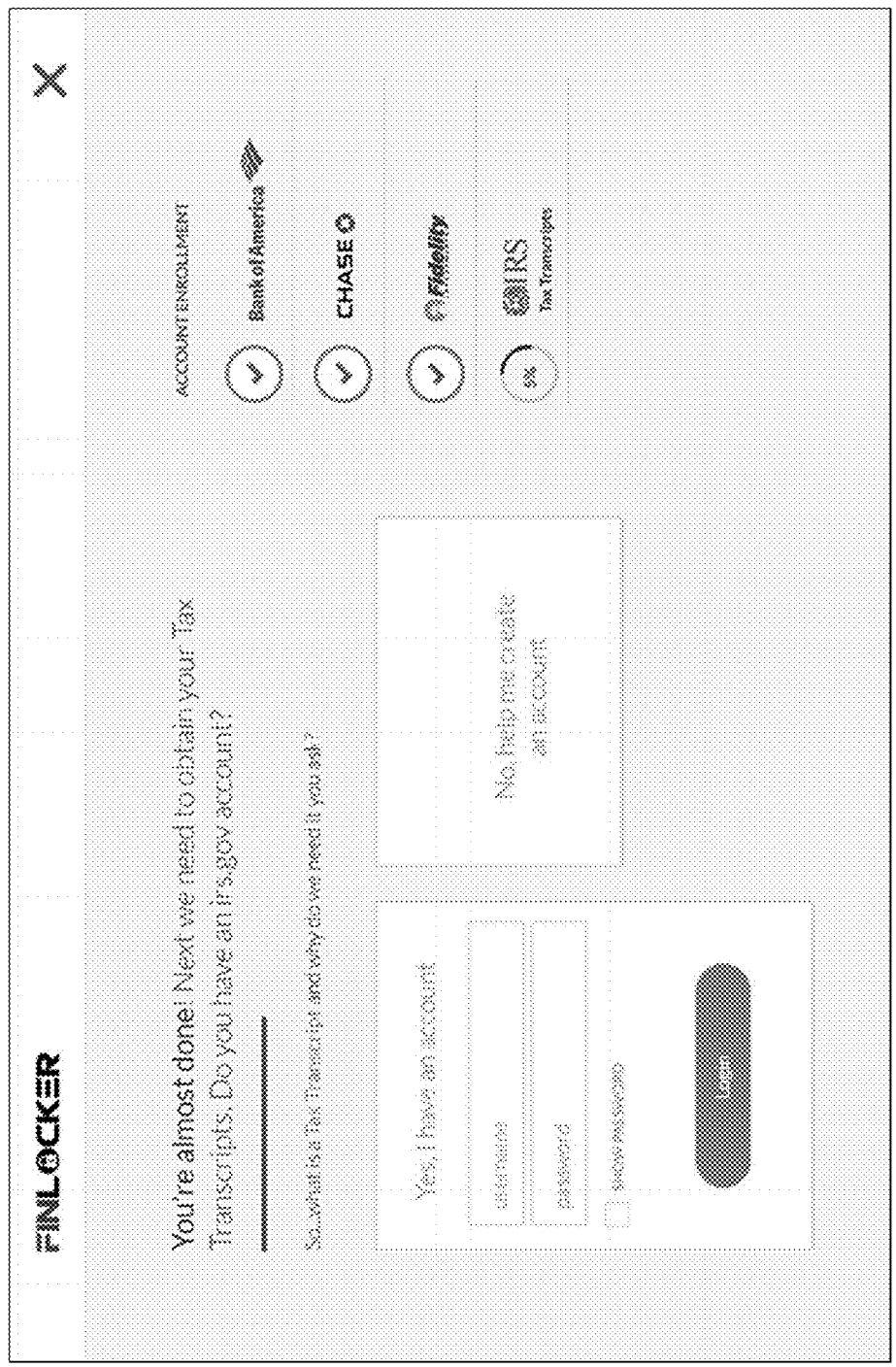

FIG. 24 corresponds to an indication that the consumer has one or has created one based on the tutorial information they may access from FIG. 23. As a result, the consumer simply provides login credentials. Unlike the case with most financial institutions, in certain examples the embodiment may persist login information in the system directly (e.g., in an encrypted format) when the embodiment directly accesses the financial institution or other data source without the use of an aggregator or other intermediate $3^{rd}$ party. In certain embodiments a mechanism may be provided to allow for the consumer to complete an IRS Form 4506T, print it, sign it, and upload it so that the lender, a $3^{rd}$ party provider, or the system can submit to the IRS to obtain the tax transcript.

As shown in FIG. 23, a consumer may be shown videos, documents, etc., to help understand what a tax transcript is, what it is used for, and how an irs.gov account can be created.

Figure 25:
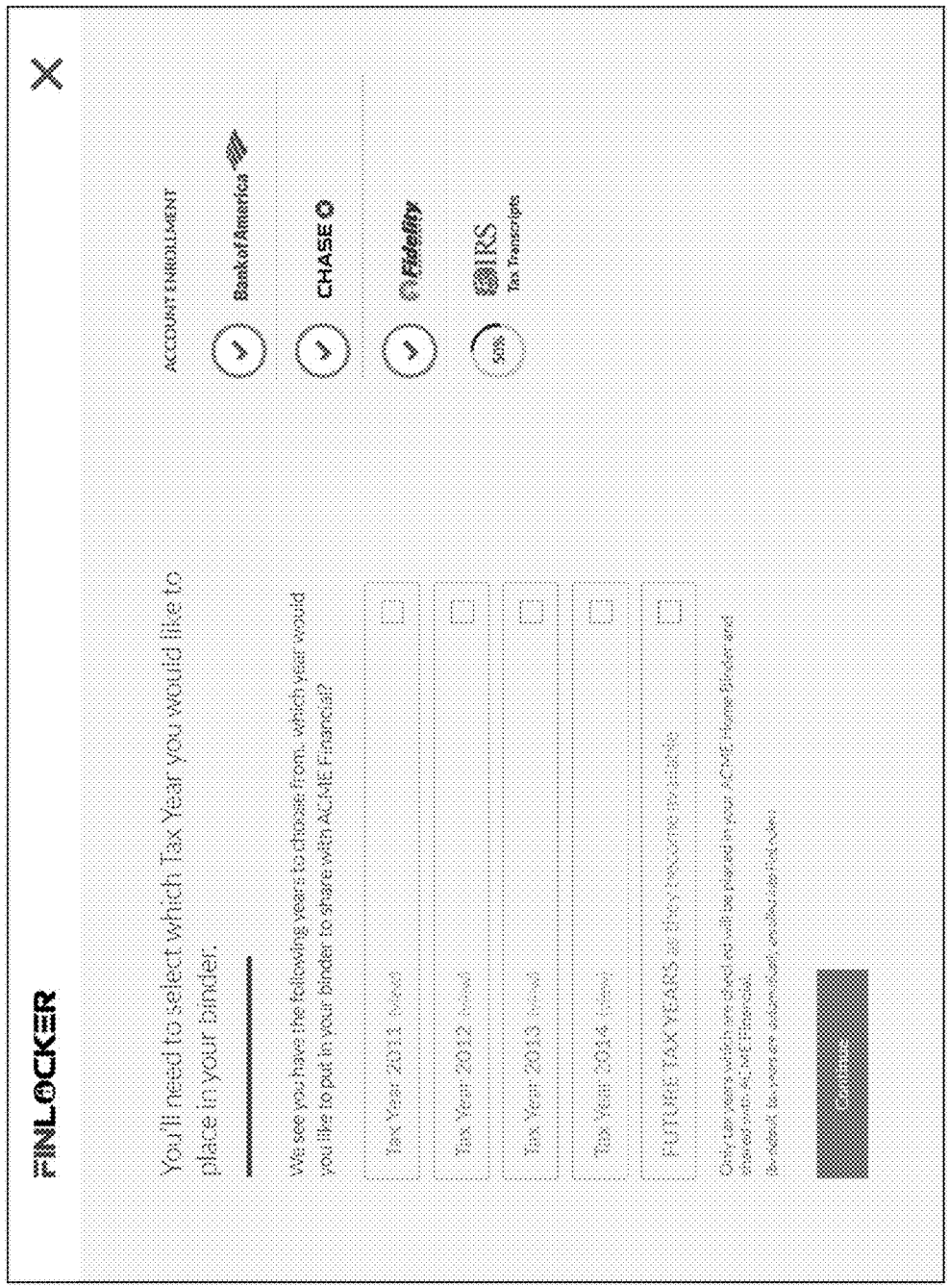

Once the consumer has provided irs.gov credentials, FIG. 25 shows the consumer which tax transcripts are available. The consumer is able to select which tax transcripts to place in the binder, including pre-authorizing the release of future tax transcripts as they become available and/or as needed, e.g., for the length of time the binder is available to the other party (lender) or subsequent parties. The consumer can also download and view the transcripts so that what is being shared can also be seen directly by the consumer. In certain example embodiments, the required transcripts may be automatically added to a binder (e.g., based on business rules defined by a lender, the current and past two tax transcripts may be added to a binder, etc.) with the consumer's consent.

Figure 26:
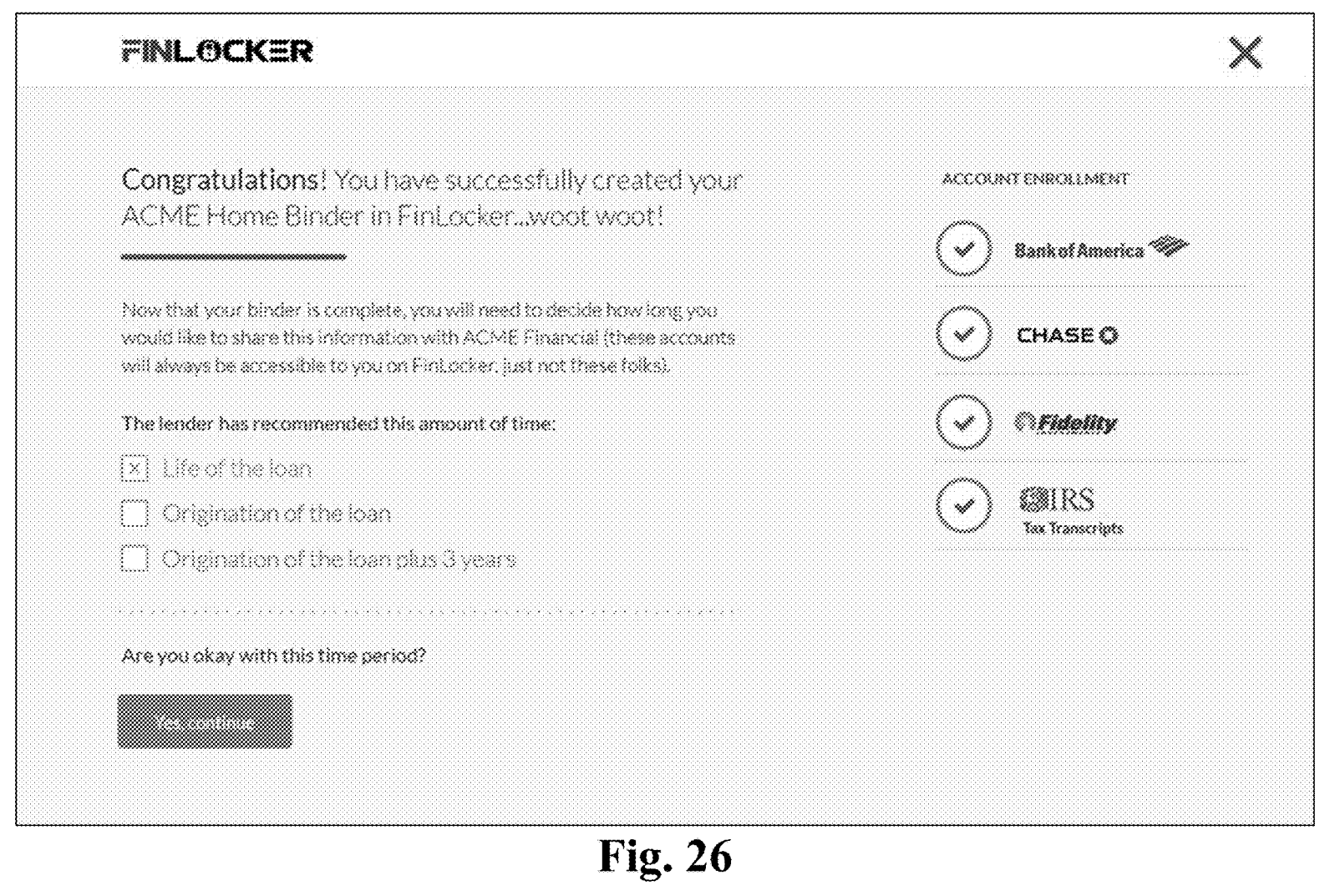

FIG. 26 where the consumer confirms that the binder is to be shared. It also may enable the consumer to select the time period the other party has access to the binder (e.g., for the loan origination period, origination period+3 years, or for the life of the loan). Each time period may be tied to specific product offerings, risk profiles of the consumer, and/or benefits made available to the consumer in conjunction with the financial product(s) applied for. For the period of time the consumer has granted access, a party holding primary access to the binder may transfer that primary access to the binder to another party (the new holder). In such scenarios, the prior holder will lose access to the binder for new information. This situation may arise if a lender sells the loan to another party that also has rights to use the system in certain example embodiments. If the loan is sold to a non-customer of the system, the selling customer would lose access (no longer would hold the binder), and the acquiring entity would not have access, but could get access (become the holder) if they become a customer. In some instances, a one-time report may be shared, with some, all, or none of the information being redacted. A primary access holder of the binder may also share its access with other customer(s) (e.g., if a lender uses a third party to service the loan, both the lender and the servicer may be provided with concurrent access to the binder). Only the primary access holder of a binder may share access to the binder with other customers, or transfer the binder to other customers.

Behind the scenes, once a consumer has completed the creation of a binder requested by a customer (holder of the binder) the holder or holder's system is notified the binder is available. Depending on the requirements of the holder, the binder may remain in a suspense state waiting for the holder or holder's system to request processing of the binder, the binder may immediately move to being processed, or other variants which ultimately lead to the binder being processed. When a binder is processed the data will be retrieved from all data sources (sub-accounts of online accounts, online accounts, etc.) which the party has been granted access to. Using a rules engine, rules are applied to the retrieved information, e.g., to identify potential items that require further review or analysis. Once the retrieval and rules processing is completed the binder enters a state where it is ready for review. Depending again on the requirements of the holder of the binder, the consumer may be notified they need to review their binder and begin the collaboration process, the holder or the holder's system may be notified the binder is ready for review and the holder or holder's system can initiate the review process, or other variants which ultimately lead to the binder review process being initiated. In some embodiments, raw data may also be provided with or without the application of business rules to the holder and/or any other party the holder has shared access with.

Figure 27:
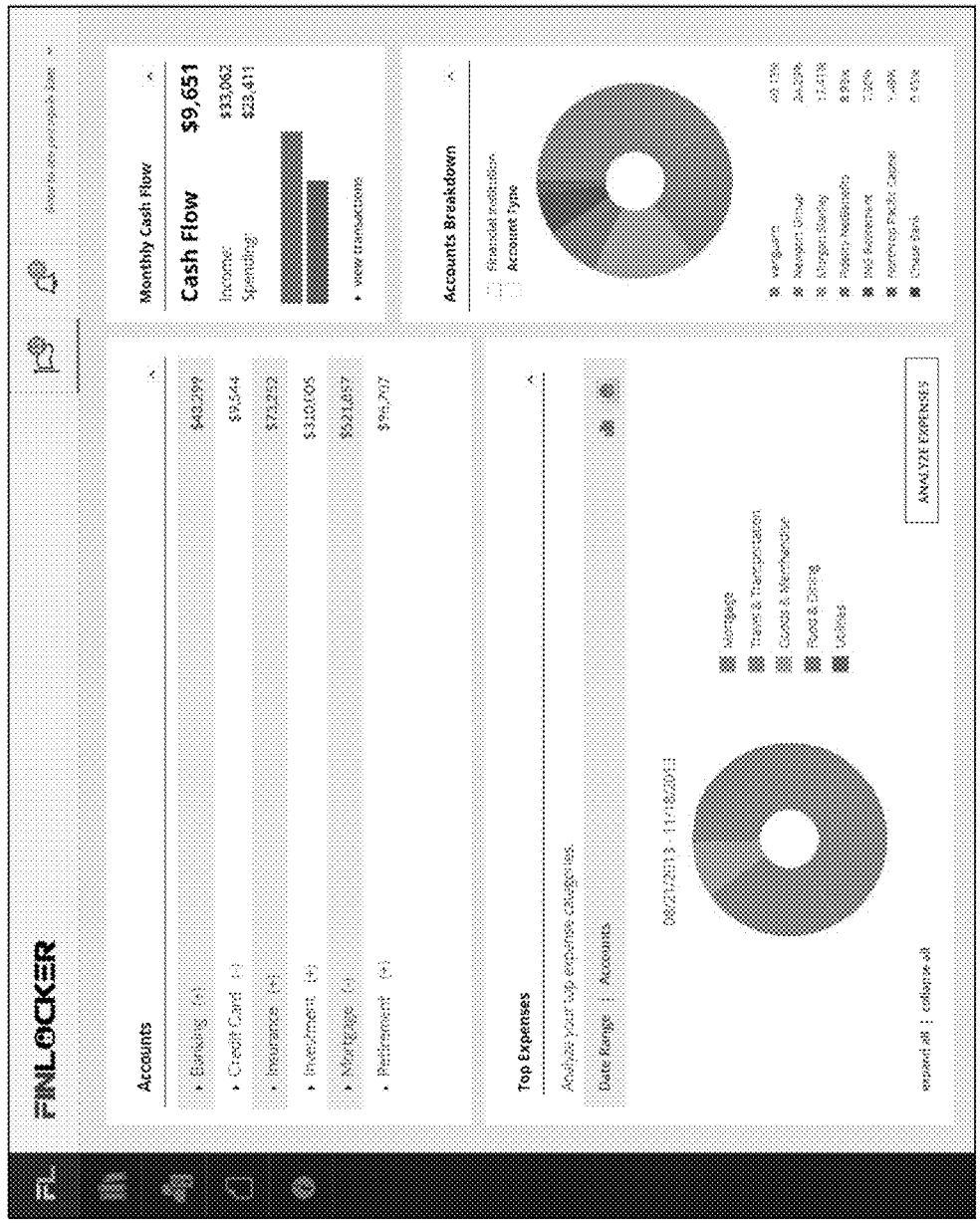

FIG. 27 is an example of the consumer's dashboard for their persistent account (locker). Most prominent is their personal financial management (PFM) dashboard, which represents all of the financial accounts the consumer has enrolled in the system. This view is independent of any binders that the consumer has created. In certain example embodiments, the data may be filtered or viewed on a binder-by-binder basis. Certain example embodiments may, from the time a consumer enrolls the accounts, begin amassing detailed data so that another party (with the consumer's consent) can be presented with a much deeper view into the consumer's financial performance, as well their historical behavior. This sort of holistic view can help reduce risk for the lender and potentially provide the consumer access to products that they may not otherwise be able to access, and/or provide the consumer with access to better products than they could get based on short term views into their financial information. From here the consumer also sees alerts that need their attention, where alerts can include notifying the consumer there are items in one or more of their binders that need attention, informing them that one or more of their online accounts need attention (most typically to provide an updated password if the consumer has changed the password to their online account), the financial institution may wish to re-verify access via the aggregator by having the consumer respond to a multi-factor authentication challenge, or other item where consumer action is needed. The consumer sees notifications which can be items such as an authorized party has retrieved data, access to a binder has been transferred to another party, access to a binder has been shared with another party, or other item the consumer has chosen to be notified of but which requires no further action of the consumer.

Figure 28:
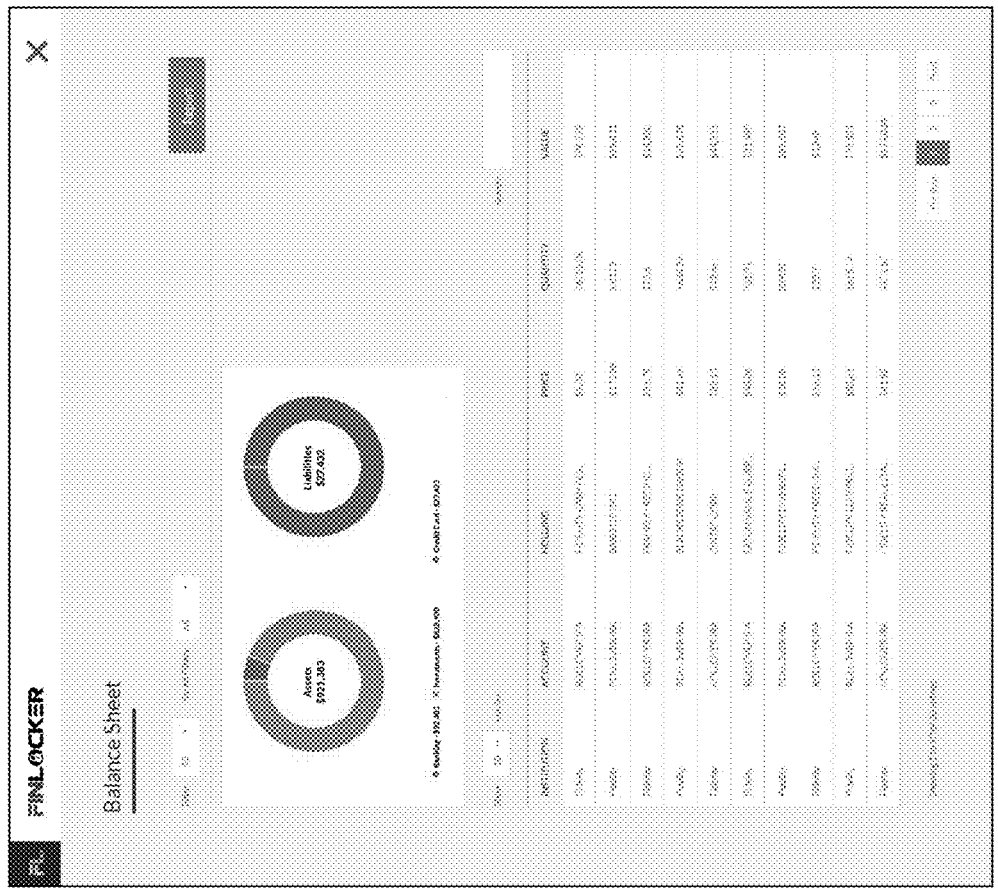

An example of a screen that may be presented if a consumer clicks in to see details behind one of the widgets is shown in FIG. 28. In this particular case, FIG. 28 is showing the details behind the consumer's balance sheet for all online accounts enrolled in the perpetual account. A complimentary set of financial management views (e.g., cash flow, balance sheet, categorization, etc.) may be shown to both the consumer and the lender, for the financial accounts that the consumer has shared in a binder. Since the consumer may not have disclosed all online accounts and/or all sub-accounts in a binder, only the consumer may see the financial management views for the overall perpetual account. From a consumer-facing perspective, the term "locker" can be used interchangeably with the term "perpetual account" used elsewhere in this document. If everything enrolled in a user locker is placed into a binder, then these financial management views will be the same between the locker as a whole and the binder. Conversely, if only a subset of the financial accounts enrolled in locker are shared in a binder, then these financial management views may be very different.

Figure 29:
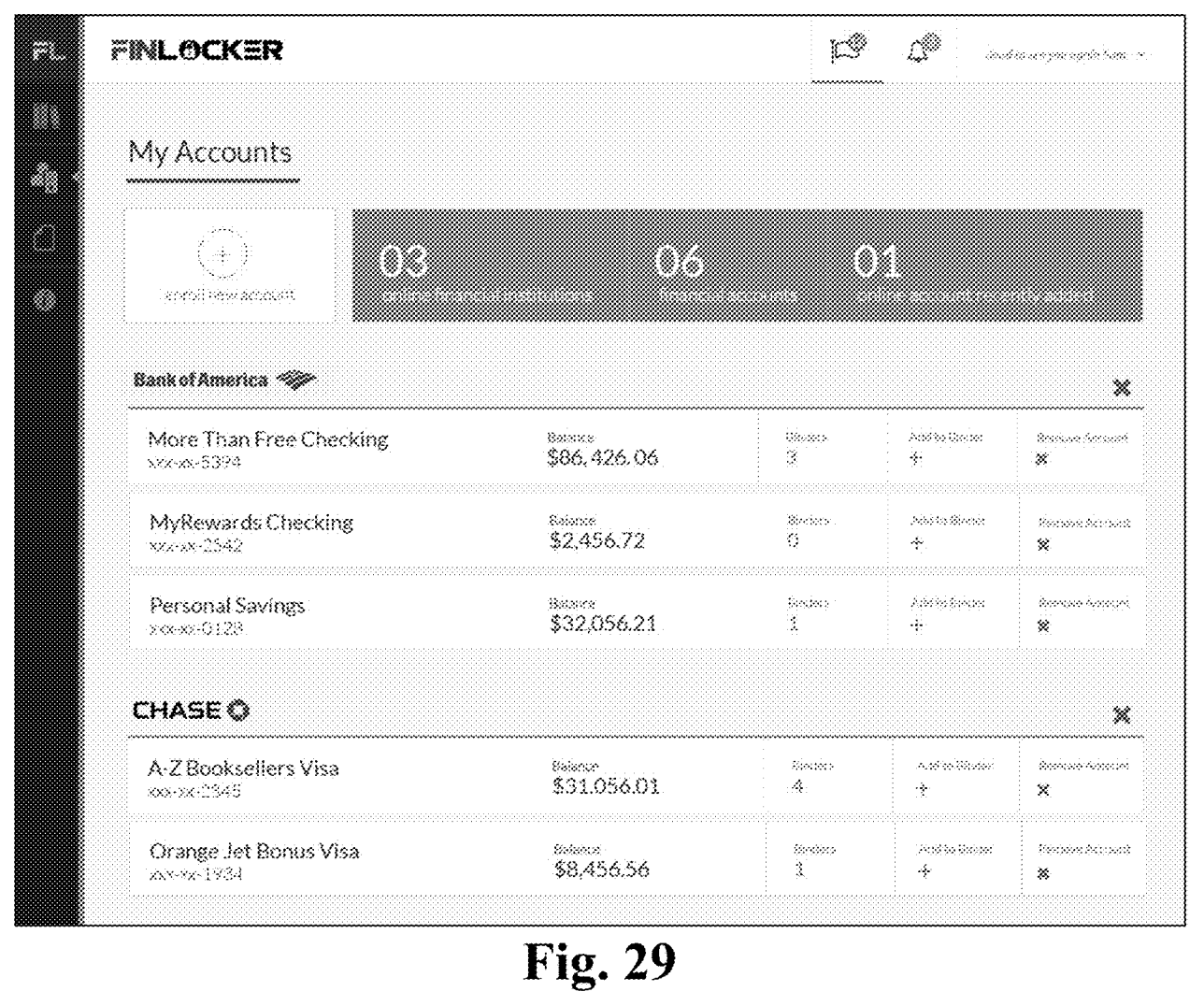
Figure 30:
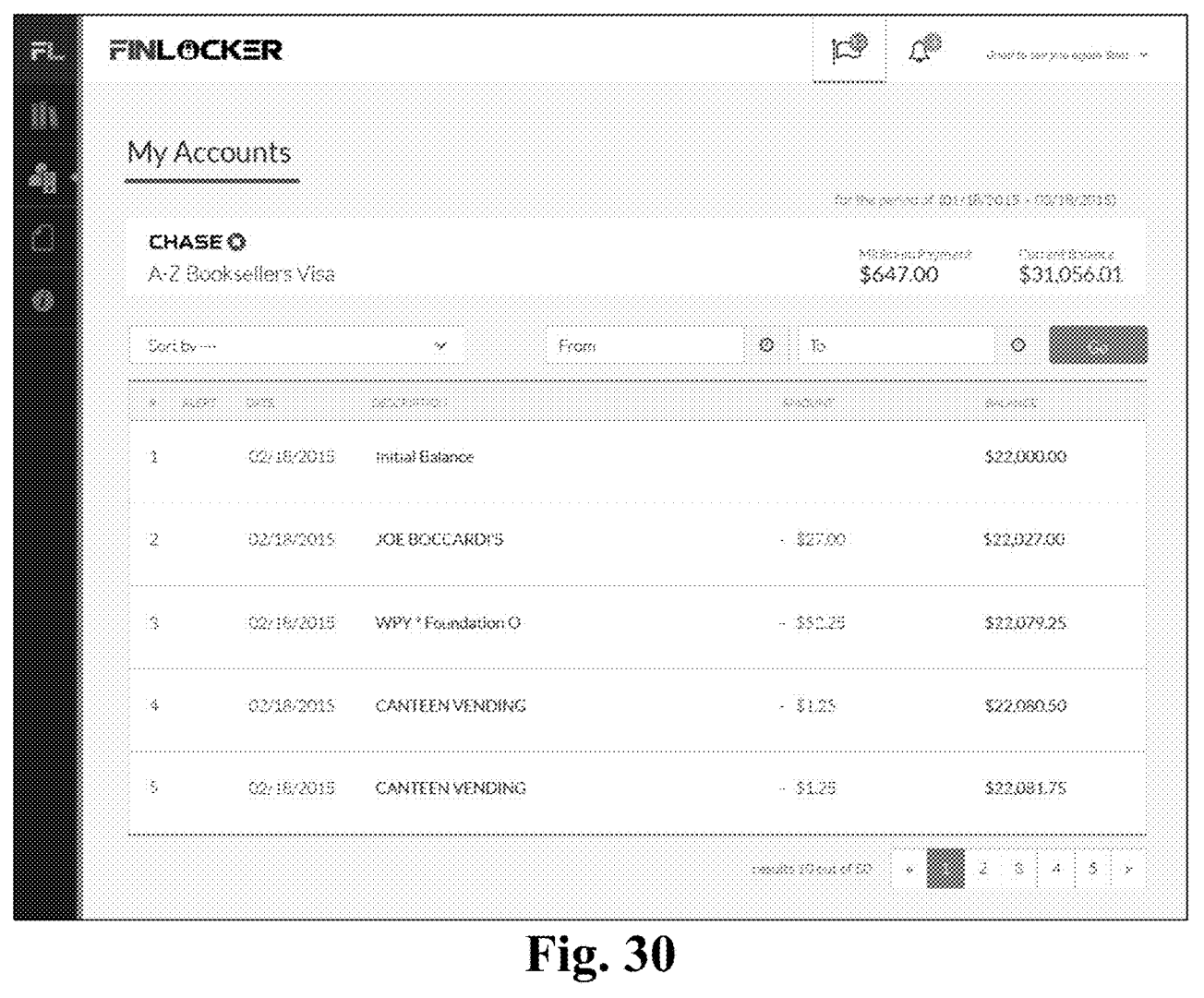

FIG. 29 is an example of the consumer's view of the accounts in the overall locker. Here, the consumer can see the near real-time balances from all financial accounts contained in the enrolled online accounts. The consumer can also see how many binders each online financial account has been shared with, can click that to see the specific binders, etc. In this regard, FIG. 30 is shown when the consumer has drilled into the Chase A-Z Book Sellers Visa Card account to see near real-time transaction level detail.

Figure 31:
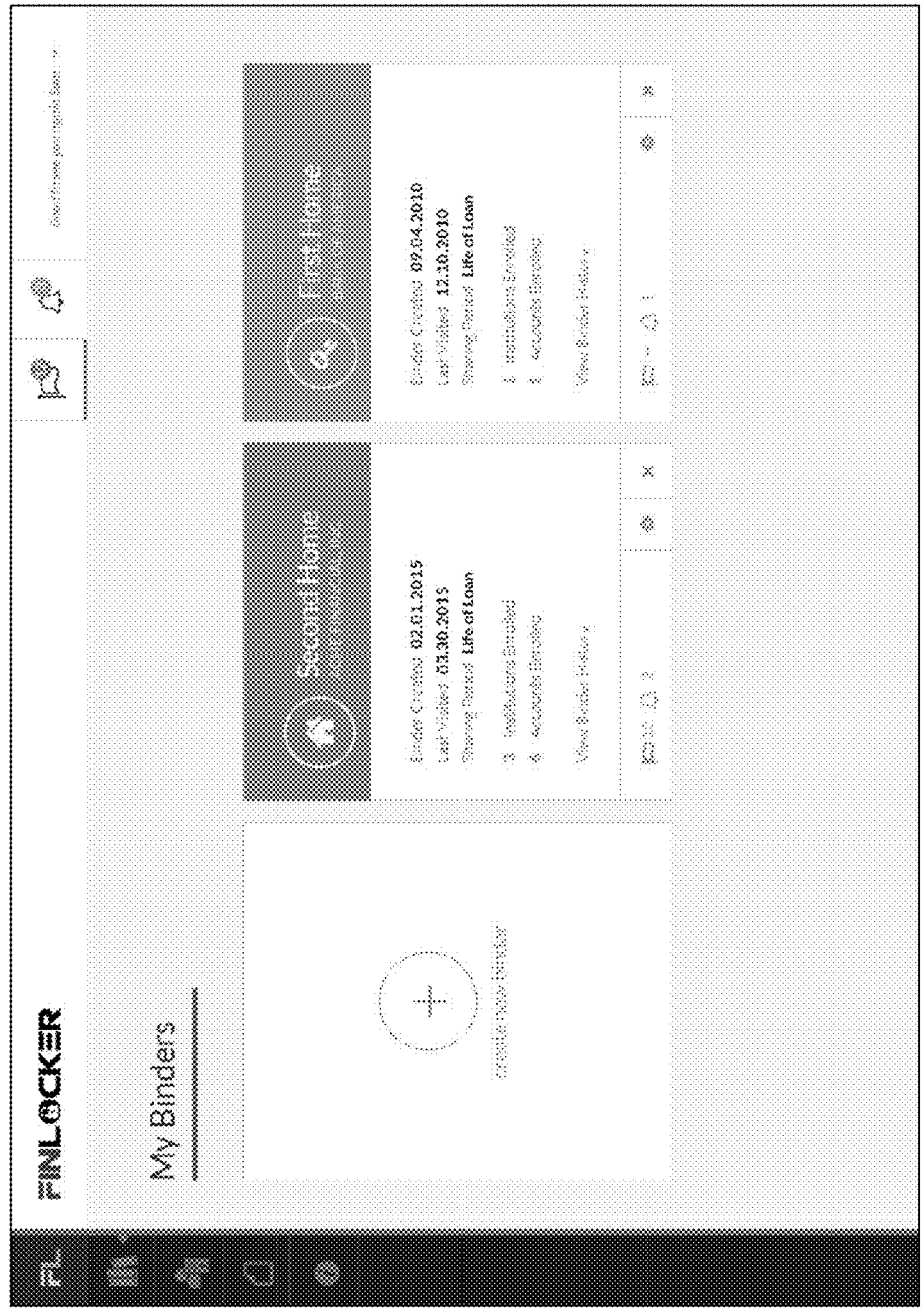
FIGS. 31-33 show consumer binder management views in accordance with certain example embodiments.

FIG. 31 provides an overview of the binders the consumer has created. In this case, both binders are active. As can be seen, the one on the left was just created, whereas the one on the right has been present for 5 years but is still active because the access period has not yet expired. From here, the consumer can click on the binder to see details regarding that binder. The consumer can also select to see the history of the binder. History of the binder may include, for example, who the consumer originally provided the binder to, all parties the binder has been transferred to (if anyone) (e.g., for a loan that was sold by the originating lender to a party that will securitize the loan), who has had access shared with them (e.g., ABC Mortgage sells the mortgage to XYZ Securities), etc. When the first scenario occurs, ABC Mortgage will transfer the binder to XYZ Securities, and ABC Mortgage will no longer have access to new data about the consumer, at least in certain example embodiments. In certain example embodiments, ABC Mortgage may retain the ability to continue to access all data that was placed in the binder while ABC Mortgage held the primary access, which may be beneficial from an audit and/or other perspectives. XYZ, as the new primary holder, will have access to all data from the creation of the binder, and all data added to the binder during XYZ Securities' is the primary access holder. Assume further that XYZ Securities does not have the ability to service the mortgage, so they contract with Easy Loan Servicing, which means XYZ Securities shares their access with Easy Loan Servicing. Easy Loan Servicing cannot further share with other third parties as currently embodied, but possibly future embodiments could provide this capability in the future as long as the access granted by the consumer is strictly enforced. Thus, a selective potentially sub-delegable delegation of viewership rights may be provided, e.g., into some, all, or none of a binder. It will be appreciated that such rights may vary over time, e.g., as further actions are taken with respect to the underlying loan instrument.

Also, as indicated above, the consumer can create a binder independent of any request from a lender. Thus, at some point in the future, the consumer could push the binder to multiple potential lenders or other providers of a financial product, service, or benefit to the consumer. Also, at some future point, the consumer could share their binder with another party where they may not be the direct applicant for or recipient of a loan or other financial product or service, but instead may serve as a guarantor or other participant in a commercial loan or other transaction.

Figure 32:
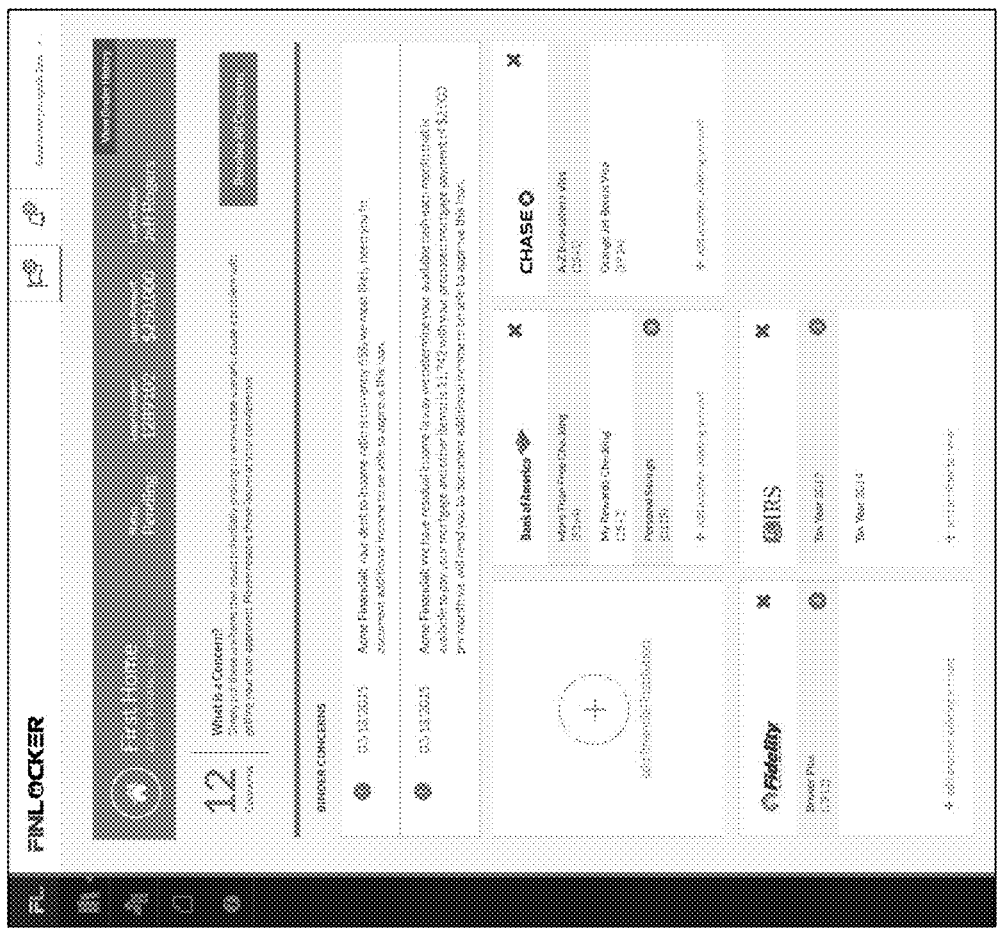

FIG. 32 is a detailed view of all financial accounts, other accounts, and documents the consumer has placed in the binder, organized by online account. An online account may be thought of as a unique financial institution/online account User ID pair. Therefore, it is possible to see a financial institution like Bank of America show up more than once if the consumer has multiple online accounts with Bank of America. In this case, multiple Bank of America tabs would appear, one for each unique Online Account User ID for that institution. For each online account, the actual financial accounts (sub-accounts) that are affiliated with this online account are shown. This may include actual bank, credit card, brokerage, and/or other account(s), or equivalent (e.g., tax years in the case of IRS tax transcripts) that were shared in the binder. A consumer may select to include one or more financial accounts in a binder. When an online account is actually enrolled, all financial sub-accounts may be automatically enrolled in the consumer's locker, allowing for possible inclusion in a binder. Sub-accounts that were selected from each online account for inclusion in this binder also may be shown. In certain embodiments the consumer may choose to add and/or remove financial accounts included in the binder, as well as add and/or remove online accounts from the binder.

Certain example embodiments may also show how many items have been flagged (items marked by the rules engine, processor or underwriter have identified a binder, financial account, or line item as needing further review) for all financial accounts from this online account. The count may include all flagged items, e.g., with the color of the flag being based on the highest level of flag applied to all of the financial accounts included in the online account (e.g., if there are four items flagged yellow and one red, the flag color across the Financial Accounts from this Financial Institution/Online Account will be red).

By clicking on the Financial Institution/Online Account, the consumer will be taken to a view with all of the financial accounts for this Financial Institution/Online Account. The consumer may then begin resolving flagged items or collaborating with the lender, as discussed in greater detail below. The consumer may also view all alerts across all Financial Institutions/Online Accounts before beginning the resolution/collaboration process.

Figure 33:
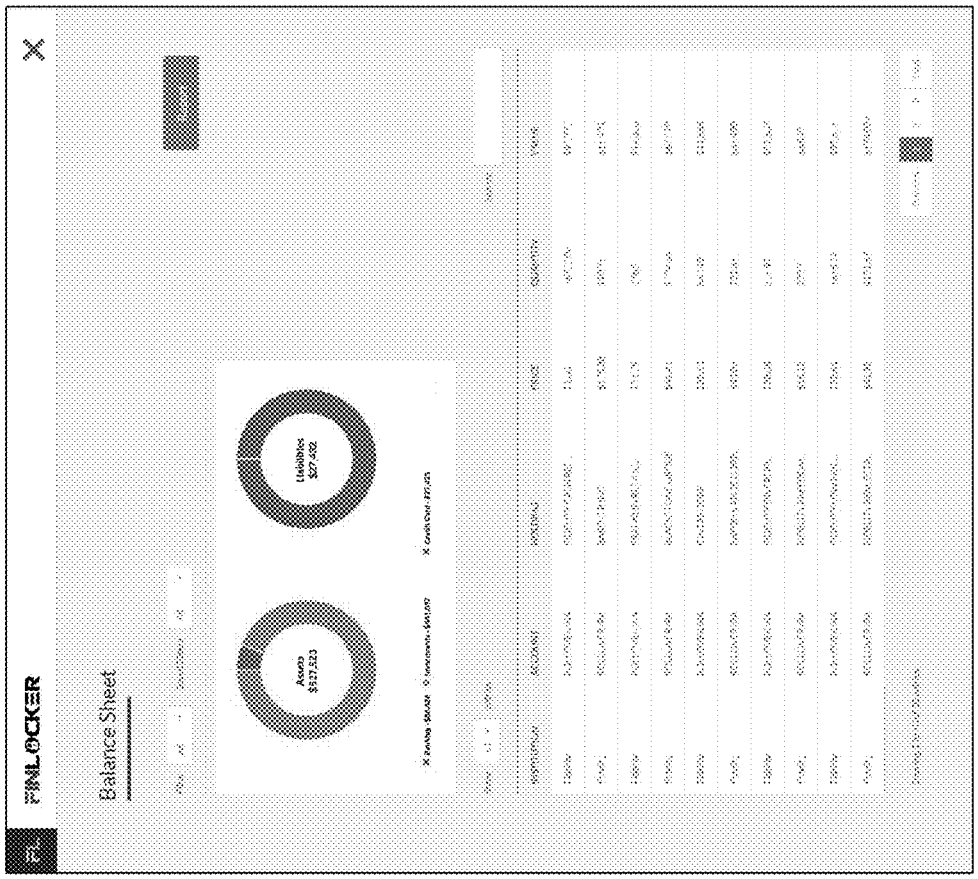

Somewhat similar to the balance sheet shown above in FIG. 28 for all online accounts and the contained financial accounts, FIG. 33 is a financial management (balance sheet) view based not on what is enrolled in the system as a whole for a given user, but rather on the specific financial accounts and/or documents placed into a specific binder.

Figure 34A:
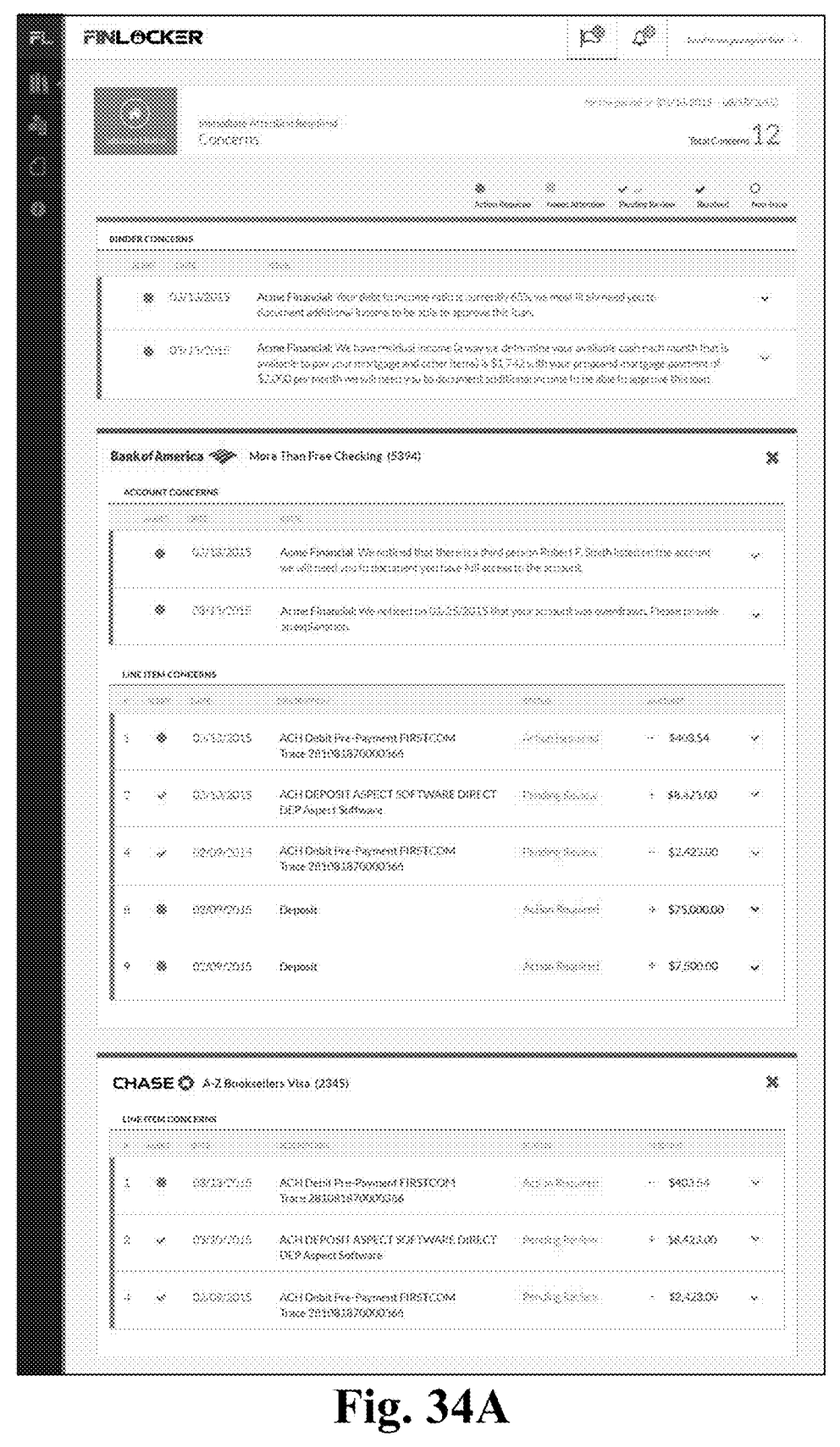
Figure 34B:
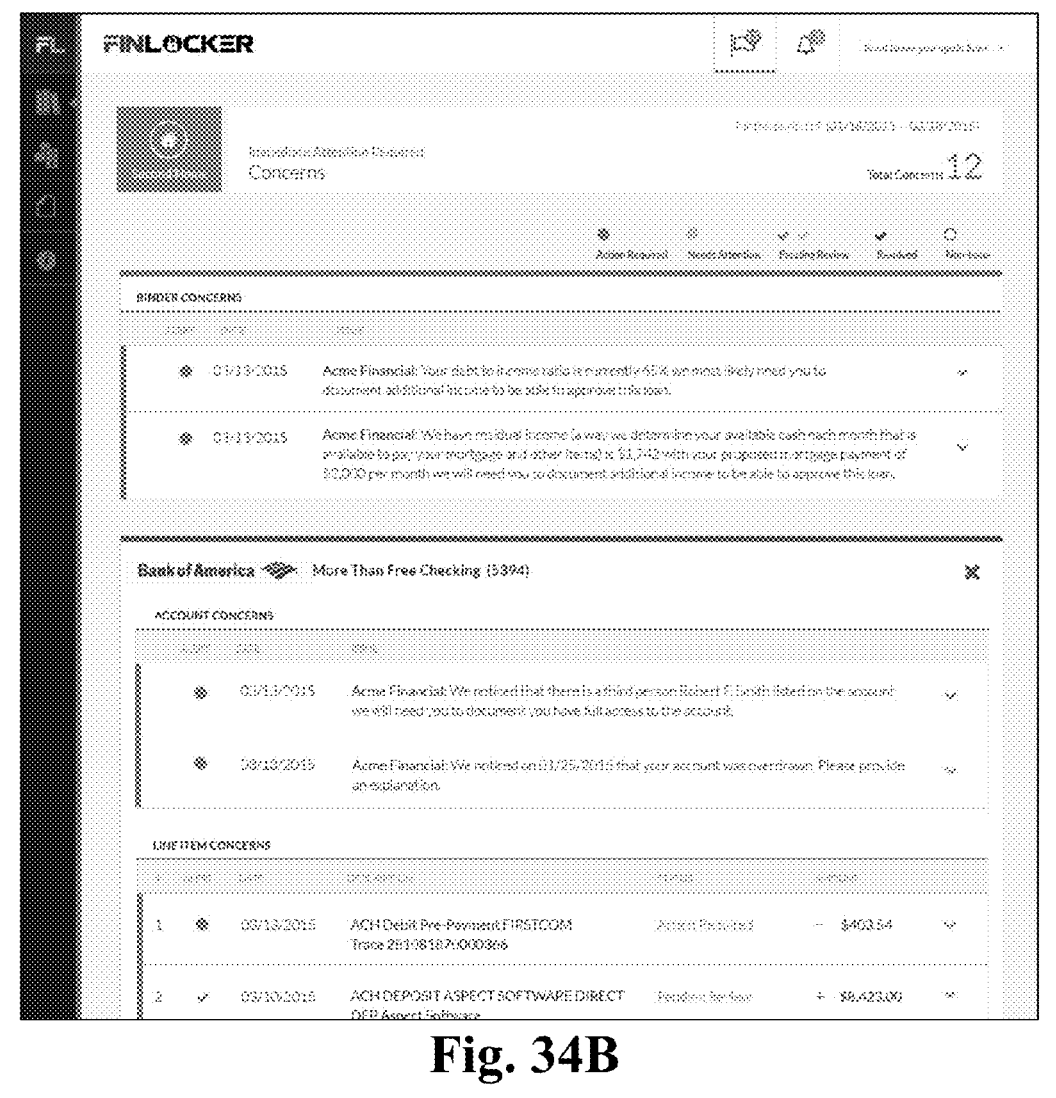
Figure 35:
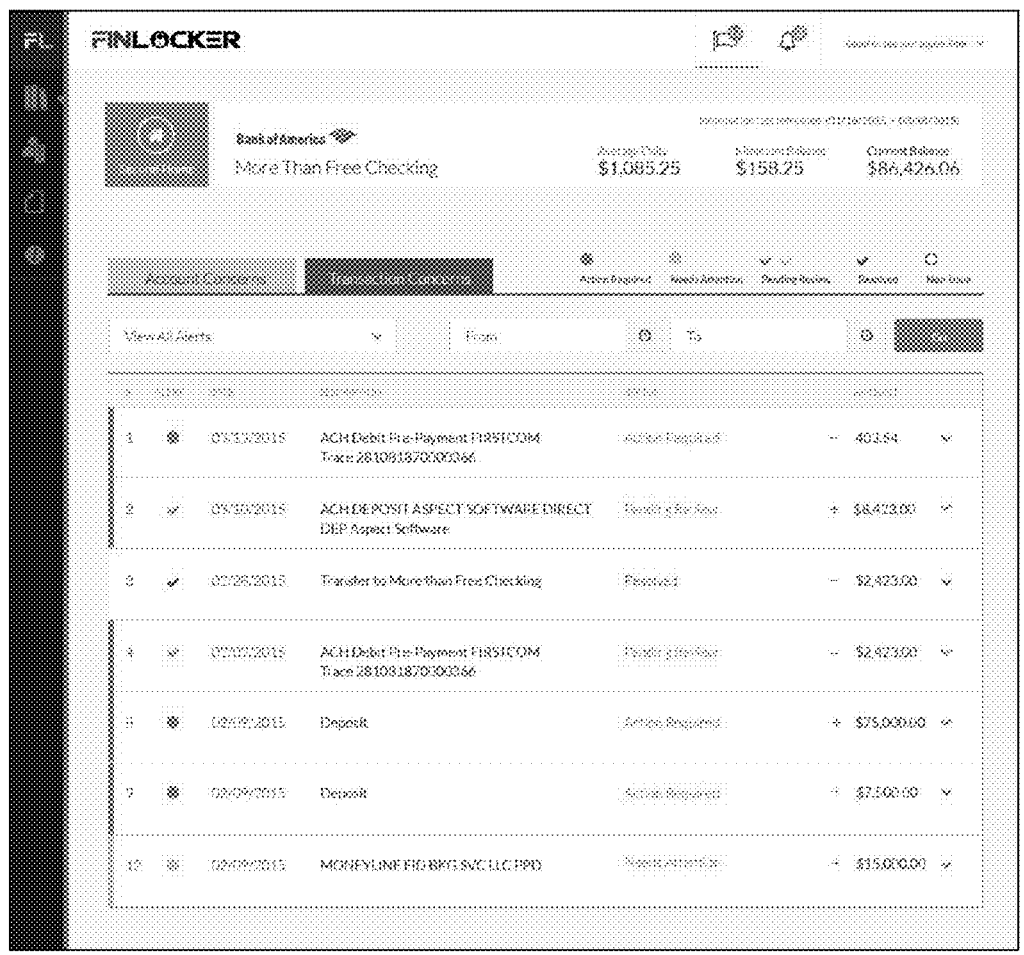
Figure 36:
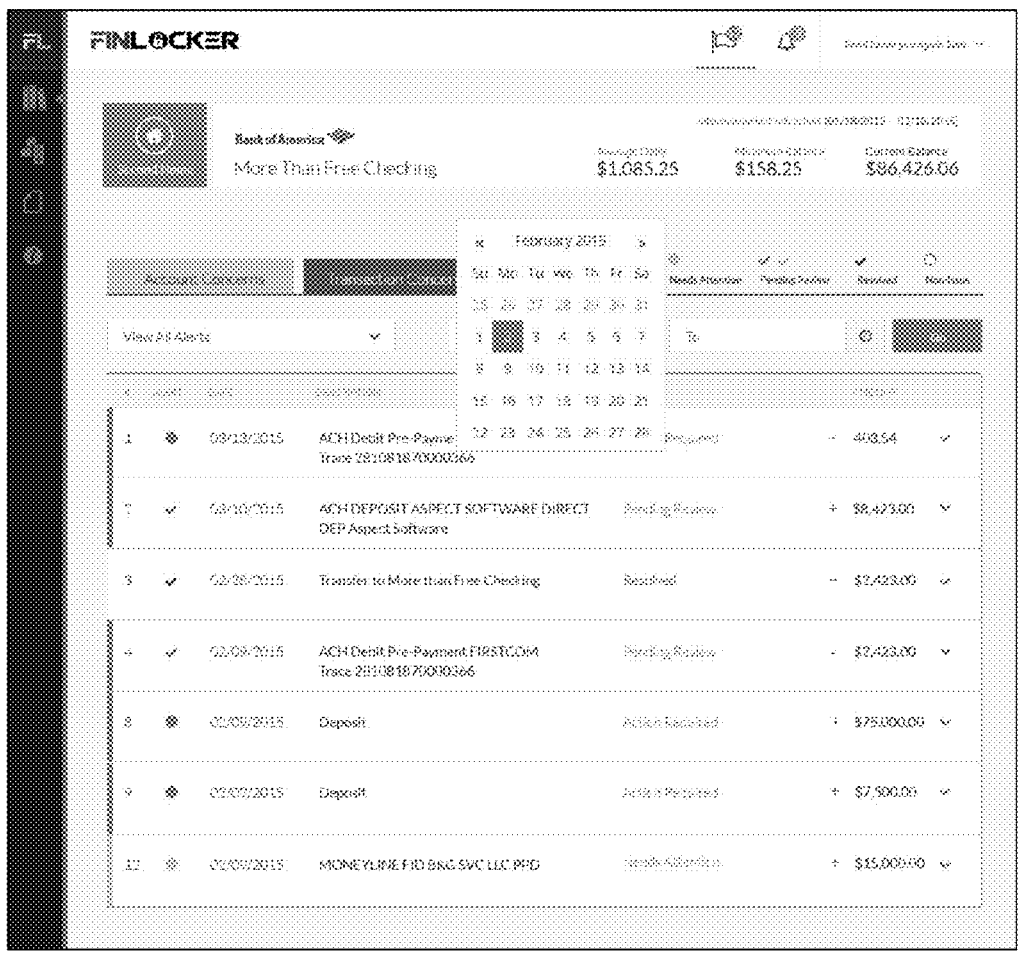

FIGS. 34A-34C show all flagged items across all financial accounts in a given binder. The consumer can click on any flagged item to begin the collaboration/resolution process, as described in greater detail below. This list may be narrowed down in a number of ways. For instance, FIG. 35 is showing the consumer only the flagged items from a specific financial account, which helps simplify the process by segmenting the work into manageable chunks. After resolving the flags items for one specific financial account, the consumer can then move on to the next financial account. As another example, FIG. 36 is a screenshot showing that the consumer can filter the view of flagged items by specific date ranges.

Figure 37A:
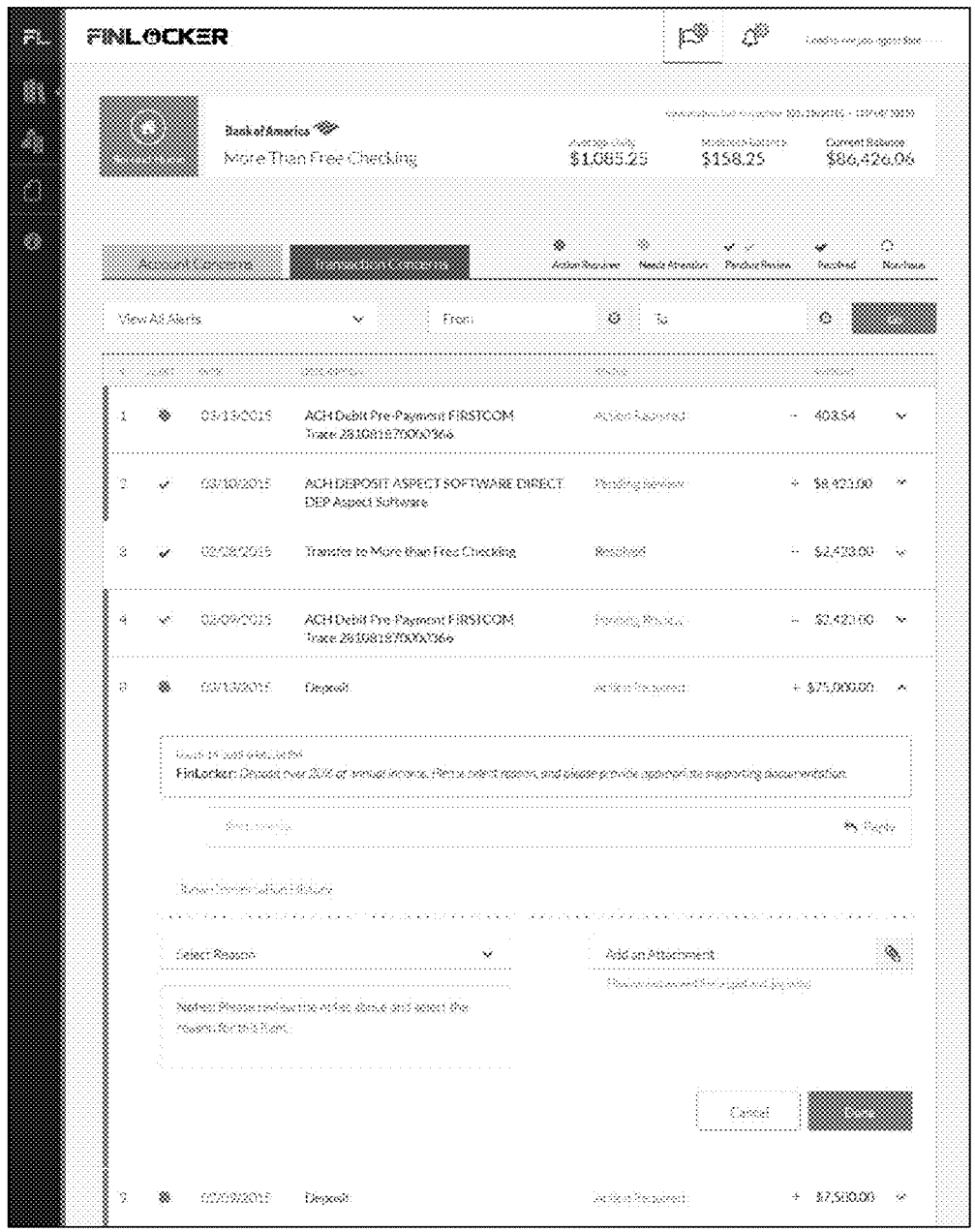

In the FIG. 37A view, the consumer has clicked on a flagged item to help address the question raised by the rules engine and/or the processor/underwriter, which relates directly to why the item was flagged. In this case, a deposit to the consumer's Bank of America account was found (via the rules applied by the rules engine) to exceed 20% of the consumer's annual income. Regardless, the consumer can change the reason for the deposit, which would prompt the rules engine to apply rules to evaluate both the level of flagging applied (e.g., red, yellow, green) and/or provide notes for consumer or binder holder. In the notes section, the rules engine has placed further information about why this transaction was flagged. The consumer may use the notes section to place comments that further explain the transaction, as well as upload any necessary supporting documentation and the binder holder may use it to place comments responding to the consumer. It is possible, based on specific configurations of the system, that this item could be flagged and then auto resolved by the rules engine.

Selecting a reason from a set of predefined options in a drop down menu may cause business rules, the analysis engine, and/or other algorithms to be re-applied with a range of outcomes. These could run the gamut from potentially providing the consumer additional details on information or explanations needed (e.g., the consumer selects the reason of 'Gift' and additional instruction is provided in the notes section indicating a gift letter is required, what a gift letter must contain, and even a link to where the consumer can download a template gift letter) to changing the flagged state of the item under review, automatically resolving the issue based on the additional information provided, and/or other items. The consumer may provide additional information such as: (1) providing no additional information, (2) typing some explanatory text, (3) uploading a supporting document, (4) utilizing a provided template (e.g., downloading a template document such as a gift letter, editing it as appropriate, getting it signed and uploading it), (5) identifying a new online account that needs to be enrolled (e.g., a consumer selects that the reason for a $5,000 deposit is a transfer from an un-enrolled brokerage account), (6) walking the consumer through enrolling an additional online account if needed, and selecting the appropriate financial account, and (7) if the consumer does not want to grant access to the brokerage account, uploading the correct brokerage statement with the line item highlighted. In certain instances, the consumer can also send the lender questions, and the lender can send responses as well as ask the consumer questions.

Figure 37B:
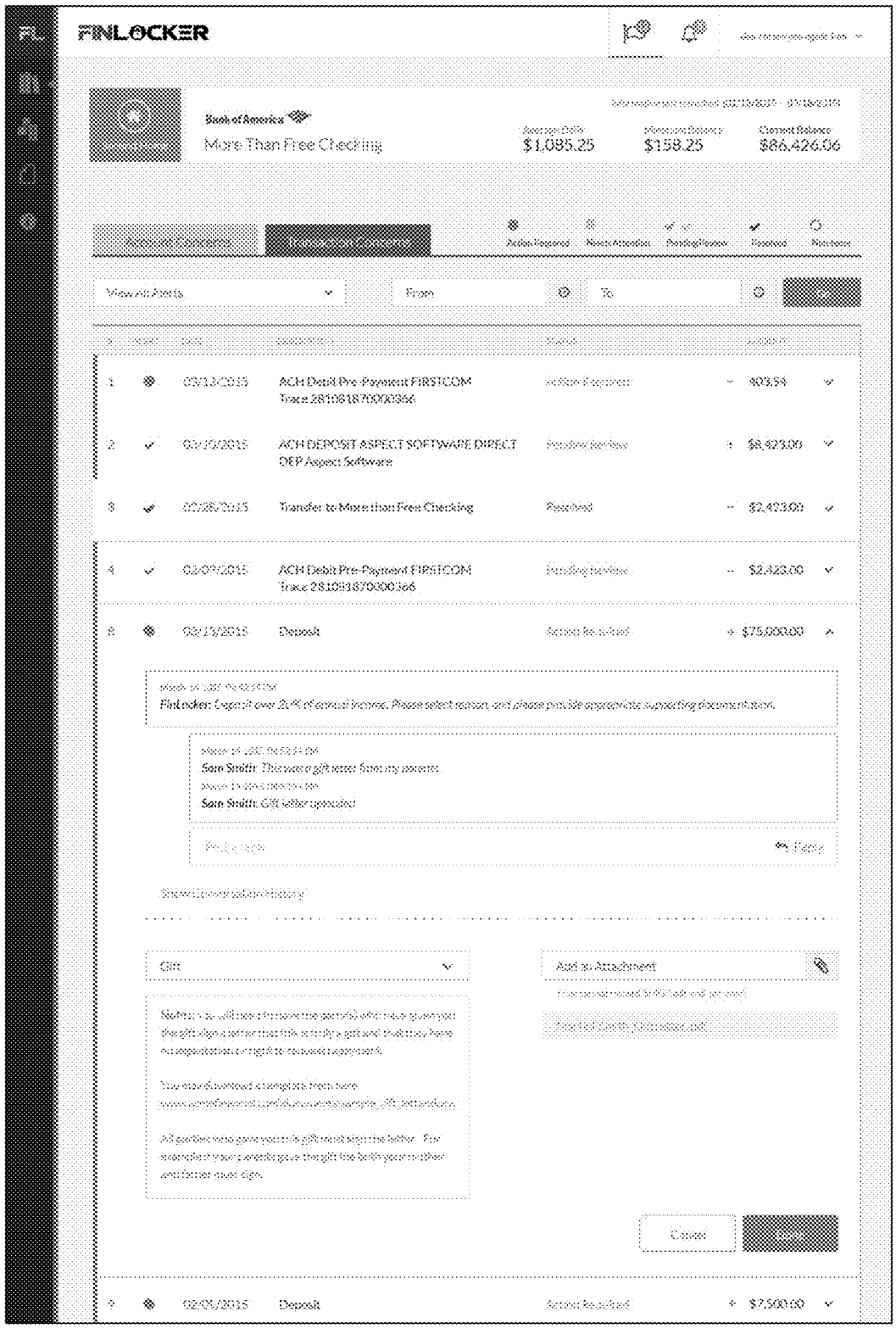

In FIG. 37B, the consumer has selected 'gift' as the reason for this deposit. Once 'gift' is selected, the rules engine selects to-be applied rules based on this reason, the type of loan and it's specific requirements related to a gift, and other factors, to provide specific guidance which is shown in the notes box telling the consumer to provide a gift letter, providing a link to a template document that may be used to ensure the gift letter the consumer creates has the appropriate content, then some other specifics to help insure they provided the correct information and documentation without addition re-submissions. In this case, the consumer has created the needed gift letter, attached it to this transaction, and provided a note back to the lender.

Another example resolution for this deposit could be this was a withdrawal done via check from their Fidelity account. They could select withdrawal from Fidelity Brokerage account and note this was a withdrawal done via check from their Fidelity account and possibly attach a copy of the cancelled check if available or, using the note, the lender might know to look for the corresponding check when reviewing the consumer's Fidelity account in the binder. If the consumer did not place the necessary Fidelity brokerage account in their binder, but they did have another Fidelity financial account already in their locker, they could select 'transfer from Fidelity' from the drop down reason menu. They would then be prompted to select which financial account from their Fidelity online account they wish to add. Once added, the rules engine would reapply the necessary rules. If many cases where funds are transferred between accounts, the rules engine may be able to automatically identify and link these transfers and the consumer simply has to provide notes explaining the transfer and/or uploading supporting documentation.

Once the consumer has addressed as many flagged items as possible and indicated they are done, or when they logout of their current session, the Reviewing Party (loan processor, underwriter, or other party) will be notified that there are items in the binder available for review. In certain embodiments, the consumer can make updates to a particular flagged item, and as soon as the consumer has closed that flagged item the lender can see that update to enable near real-time collaboration.

The workflow can be configured so that, for example, once the application of the business rules, analysis engine, and/or other algorithms is/are applied, the binder with the flagged items can be shown to the consumer for the resolution process to begin; the binder can first be shown to the lender for the lender to review and decide if modification to the flagging done by the business rules, analysis engine, and/or other algorithms is desirable before making available such entries to the consumer; the lender can decide that it does not want to ask the consumer to use the online resolution and collaboration process and that it will work with the consumer where the lender actually completes the resolution process with the consumer providing data external to the system; etc.

In certain embodiments, the platform used by a Reviewing Party may be tightly integrated with the system. In these cases, the Reviewing Party may be taken directly to the binder they need to work on without ever needing to authenticate the platform, at least in certain example embodiments. As part of this tight integration between the lender's platform and the system, certain example embodiments may pass the binder the Reviewing Party is supposed to work on, the username of the Reviewing Party, and other information to securely authenticate the Reviewing Party to the system.

Figure 38:
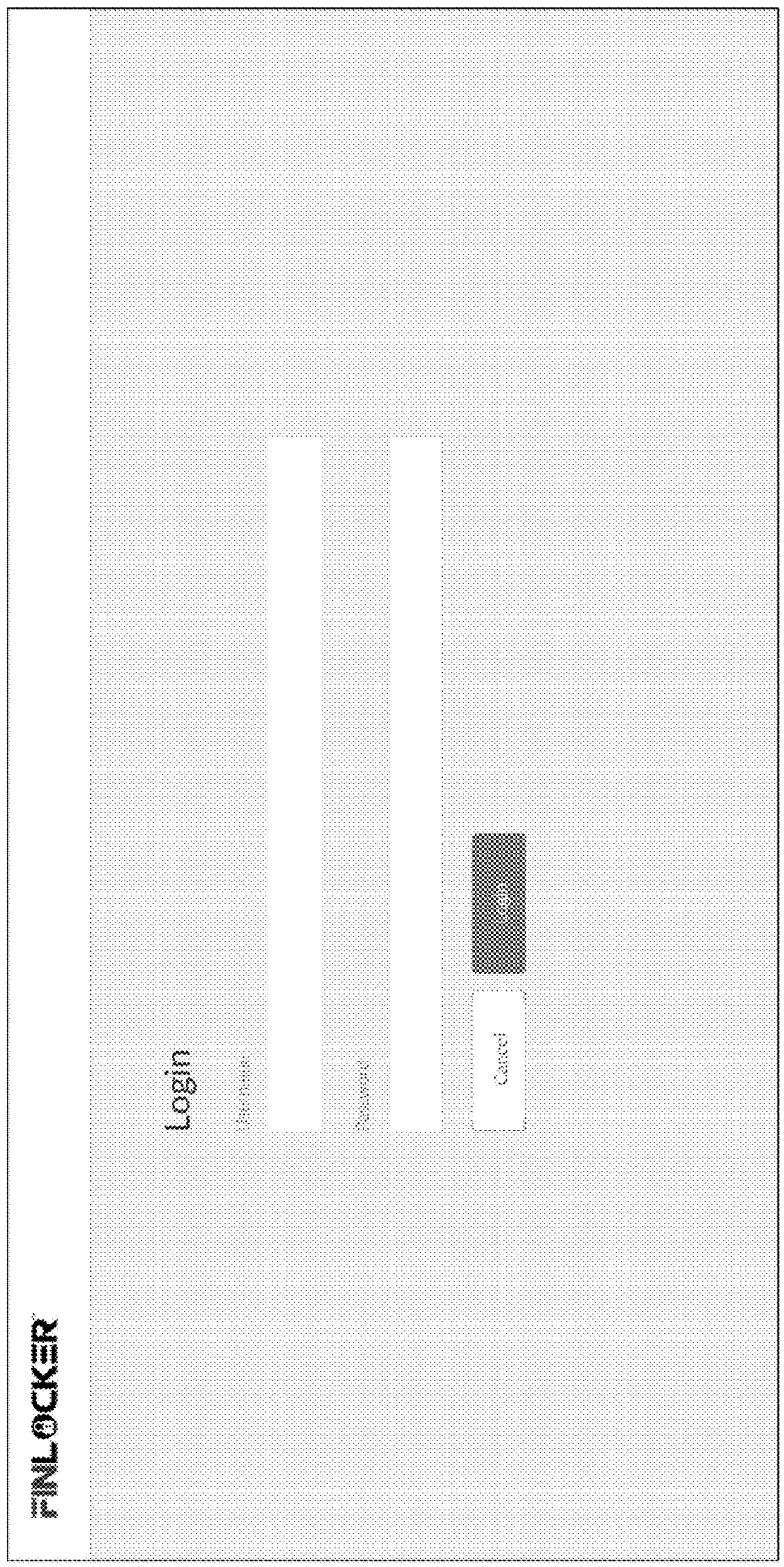
Figure 39:
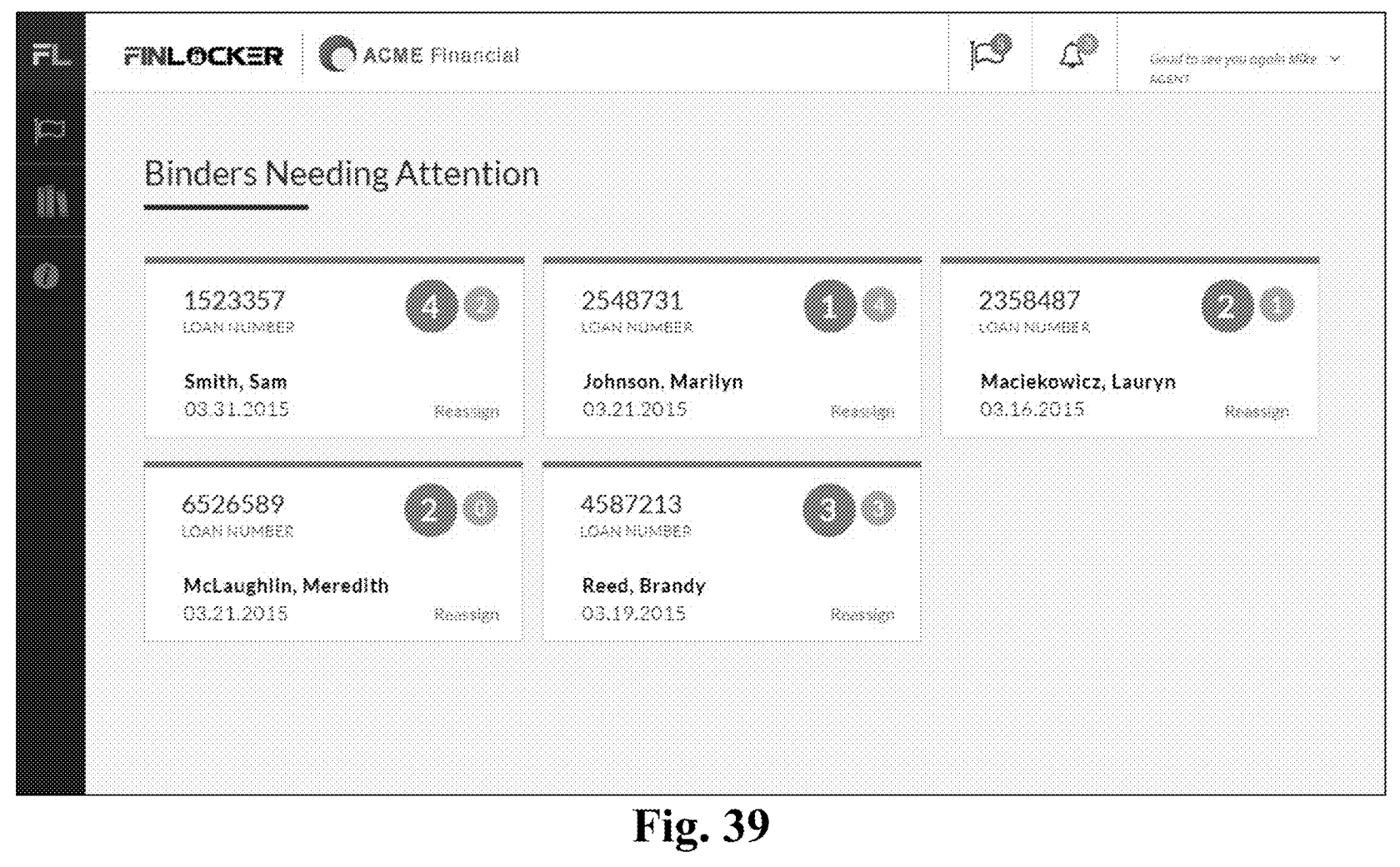
Figure 40:
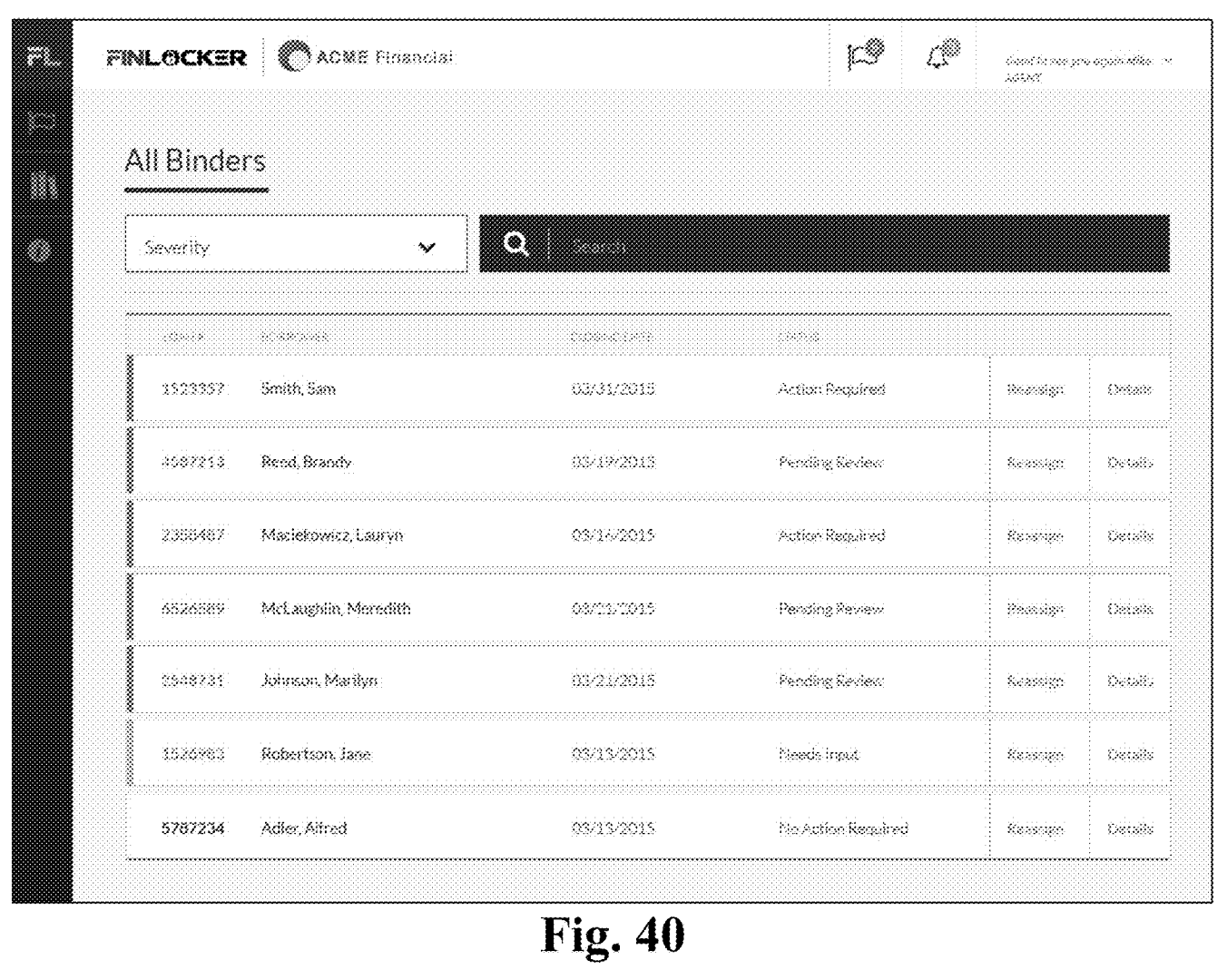

In other cases, the integration may be much more loosely coupled and will be necessary for the Reviewing Party to log into the system directly to gain access to the binder. FIG. 38 is an example of a login screen the Reviewing Party might see when a loosely coupled integration is in place. FIG. 39 is an example showing how the Reviewing Party may view which binders have the highest severity issues where they may select one of the binders for further attention. FIG. 40 provides a view of all binders assigned to the Reviewing Party where they may review, reassign, or take other actions on the binder. They are provided a high level overview of the binders in their work queue, with ones that need (possibly immediate) attention highlighted. The Reviewing Party can from here sort the work queue based on the due date, the loan number, the severity of flagged items in a binder, the loan (product) value, the type of loan (product), etc. Depending on the privileges of a given Reviewing Party, the Reviewing Party may be able to re-assign a work item to another user. As can be envisioned, the authentication process, level of integration, whether a work queue is presented, how a binder is navigated to, and other integration and security mechanisms may vary from embodiment of the system and based on the particular system to system integration requirements of each implementation.

Figure 41:
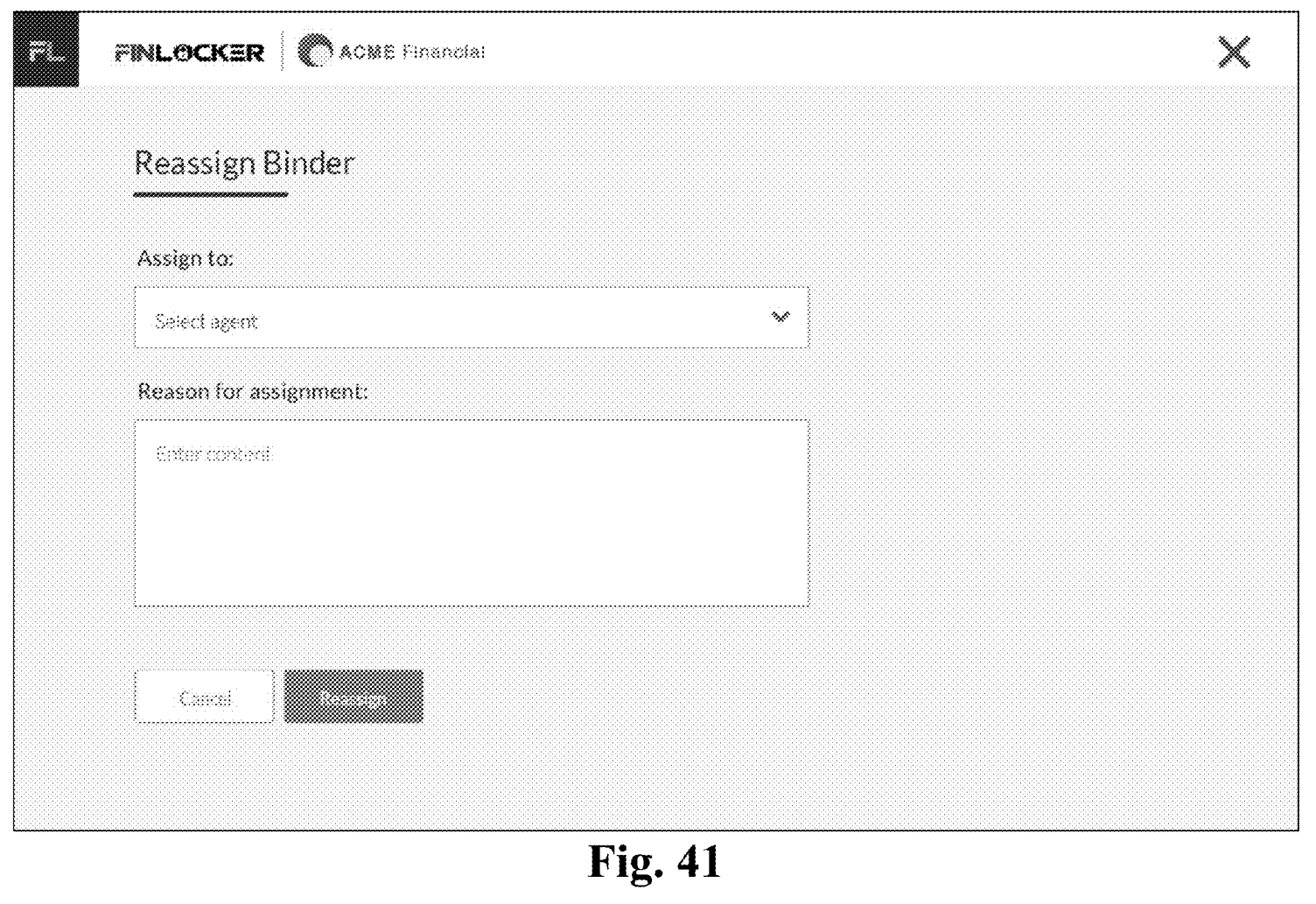

A comparable screen may be provided to let a manager see users who have too much in their work queue, overdue binders, etc., as well as take actions like reassigning work based on a user being out of the office, etc. For example, FIG. 41 is a screenshot showing where they may select the user to reassign of work to another user. This example screen allows additional information to be provided to the person to whom the work is being reassigned.

Figure 42A:
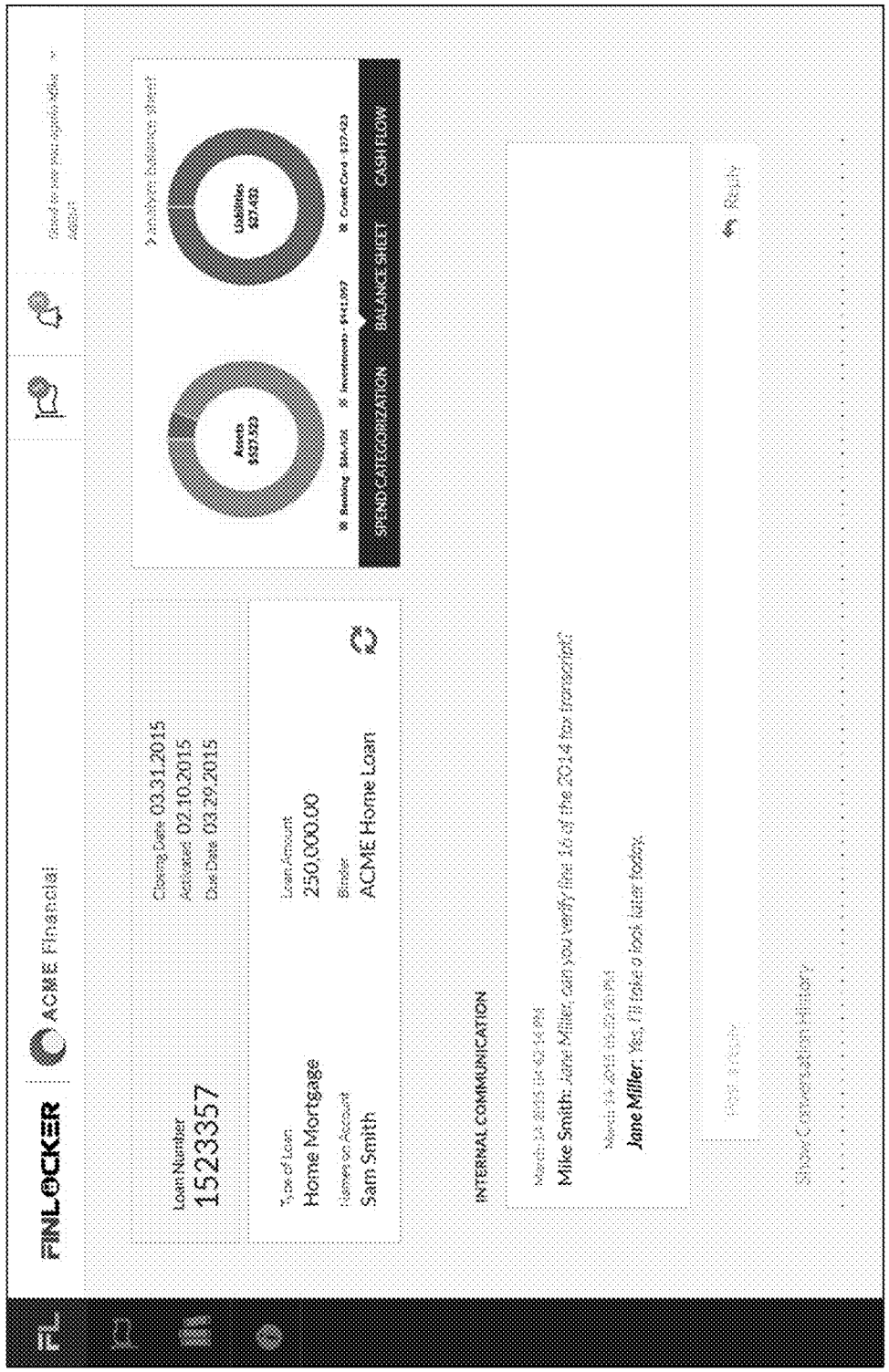
Figure 42B:
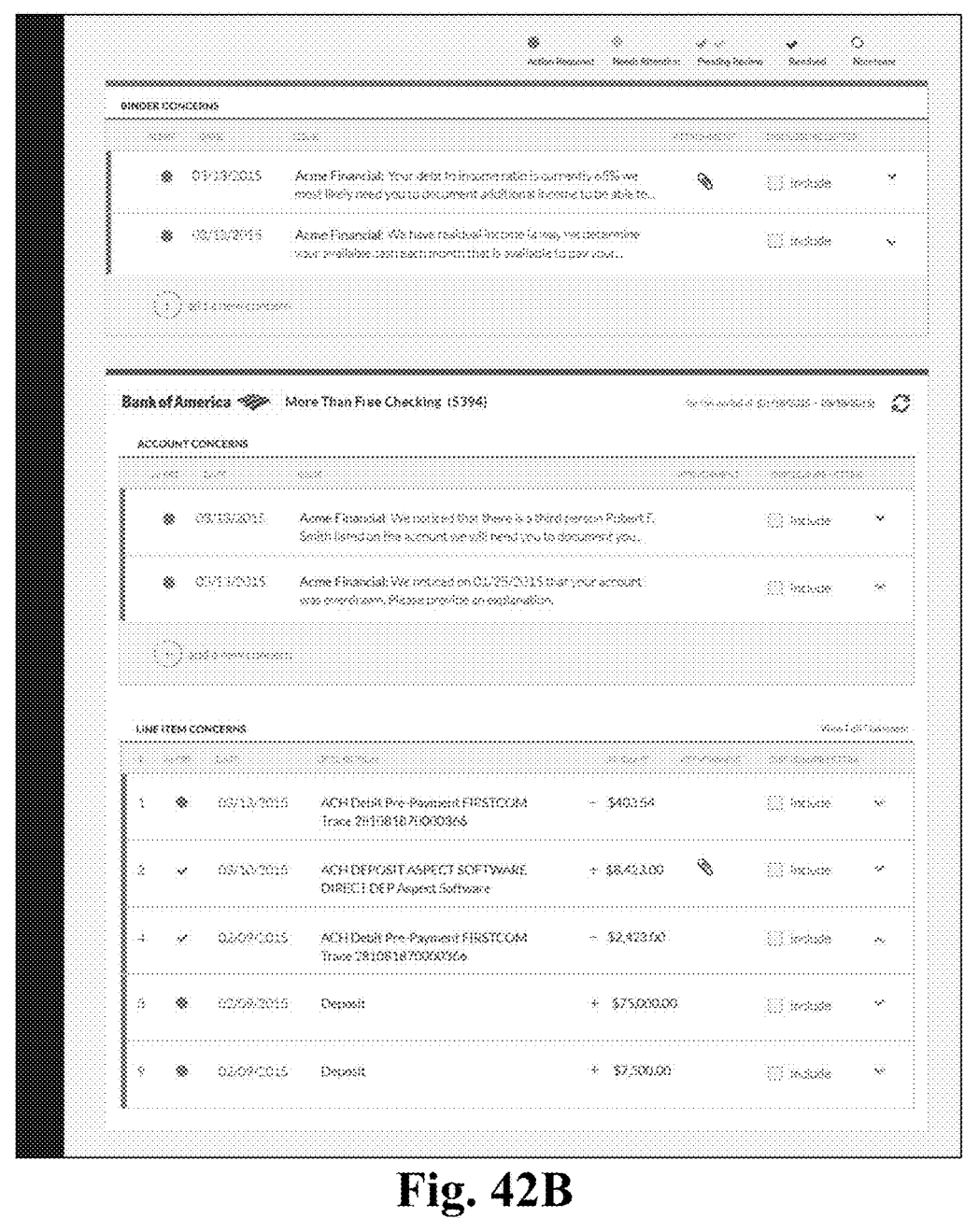
Figure 42C:
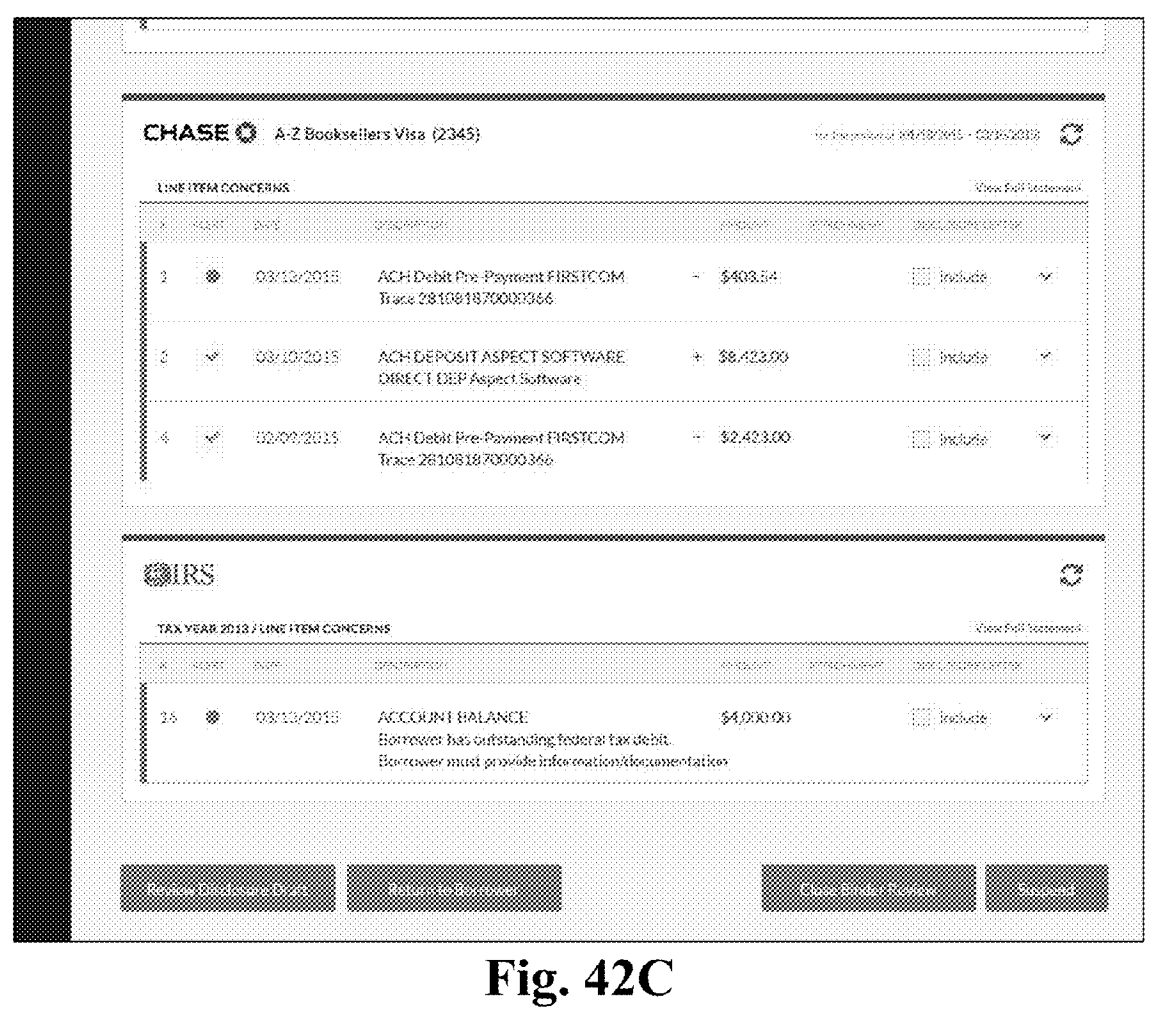

FIGS. 42A-42C are the view of a binder presented to the Reviewing Party either directly by them selecting to see the binder from their platform, or by selecting it from selection screen shown in FIG. 39 or FIG. 40. FIG. 42A is view of a portion of the binder where Reviewing Party can see various binder summary views such as Spend Categorization, Balance Sheet, Cash Flow, and internal communication that is only accessible to the entities processing the binder. Data in the binder contains data retrieved from data banks, brokerages, credit cards via an aggregator, pay data from payroll providers or aggregators, tax transcripts, data extracted from uploaded documents, and/or the like. The reviewing party may also place notes into the binder, and these notes may only be accessible to other members of the reviewing party's organization or optionally with entities they have shared the binder with or transferred the binder to, but not the consumer. They will also see all of the items which the rules engine has flagged and can expand each of the line items to view the reason (if any) selected by the consumer, plus notes and documents (if any) provided by the consumer. The Reviewing Party may change the flagging level (level of concern) or unflag an item (applied by the rules engine and/or another processor, underwriter or other party). From this expanded view of each line item, the Reviewing Party may select or change a reason, add notes, upload additional documentation, and/or mark the item as resolved. This view of the binder shown to the Reviewing Party may also show items flagged by the rules engine that are not shown to the consumer for resolution due to the consumer's lack of familiarity with them (IRS Tax Transcripts shown in FIG. 42C are one such example). The consumer will have visibility to all items flagged (excluding items which may include fraud or wrongdoing), in this instance they simply will not have the ability to collaborate on these items which they are most likely unfamiliar with.

Figure 43:
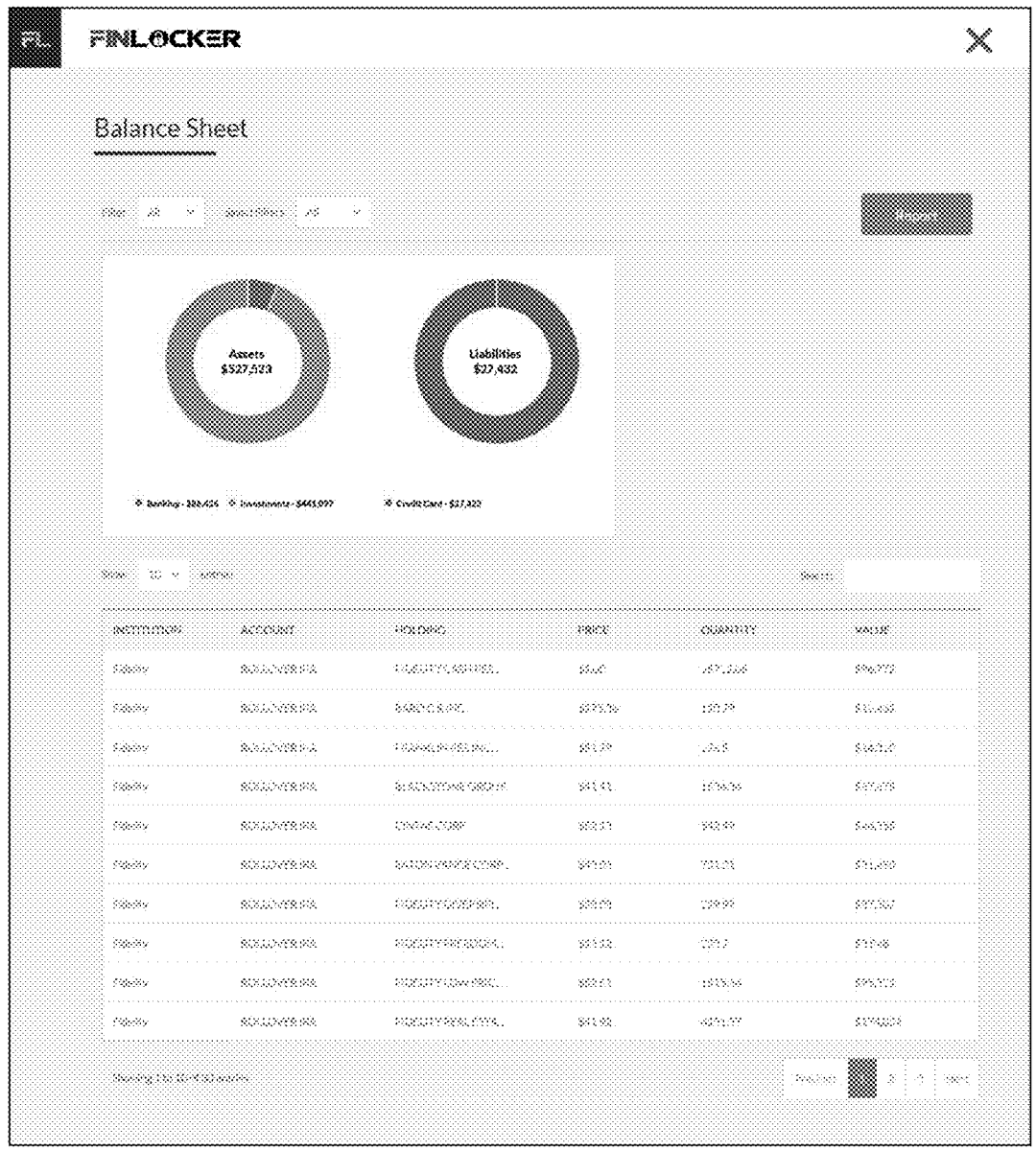

If the Reviewing Party clicks on the graphic for Spend Categorization, Balance Sheet, Cash Flow or other provided financial summary of the binder, they will be taken to a more detailed view. FIG. 43 shows that more detailed view for the Balance Sheet.

Figure 44:
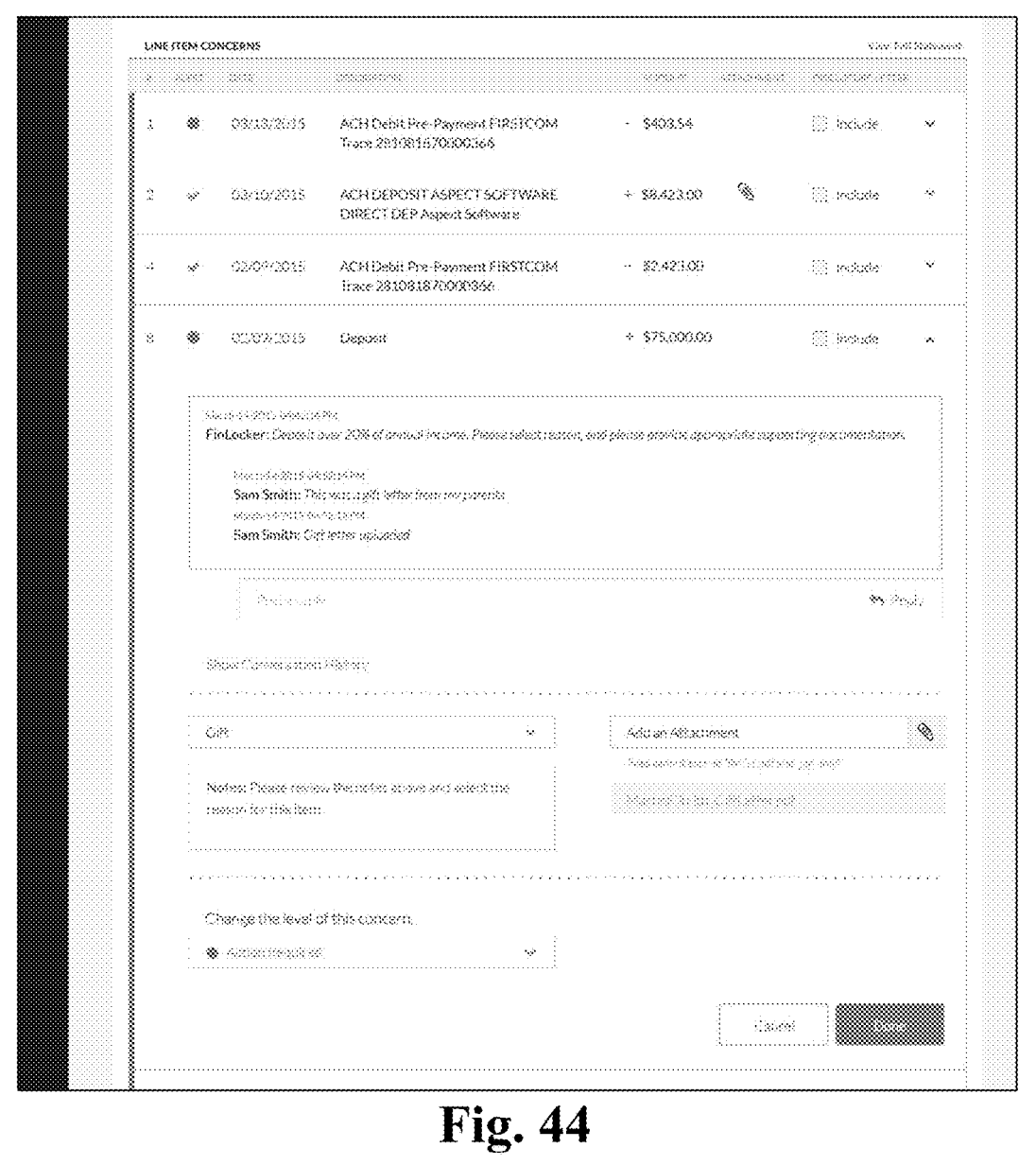
Figure 45:
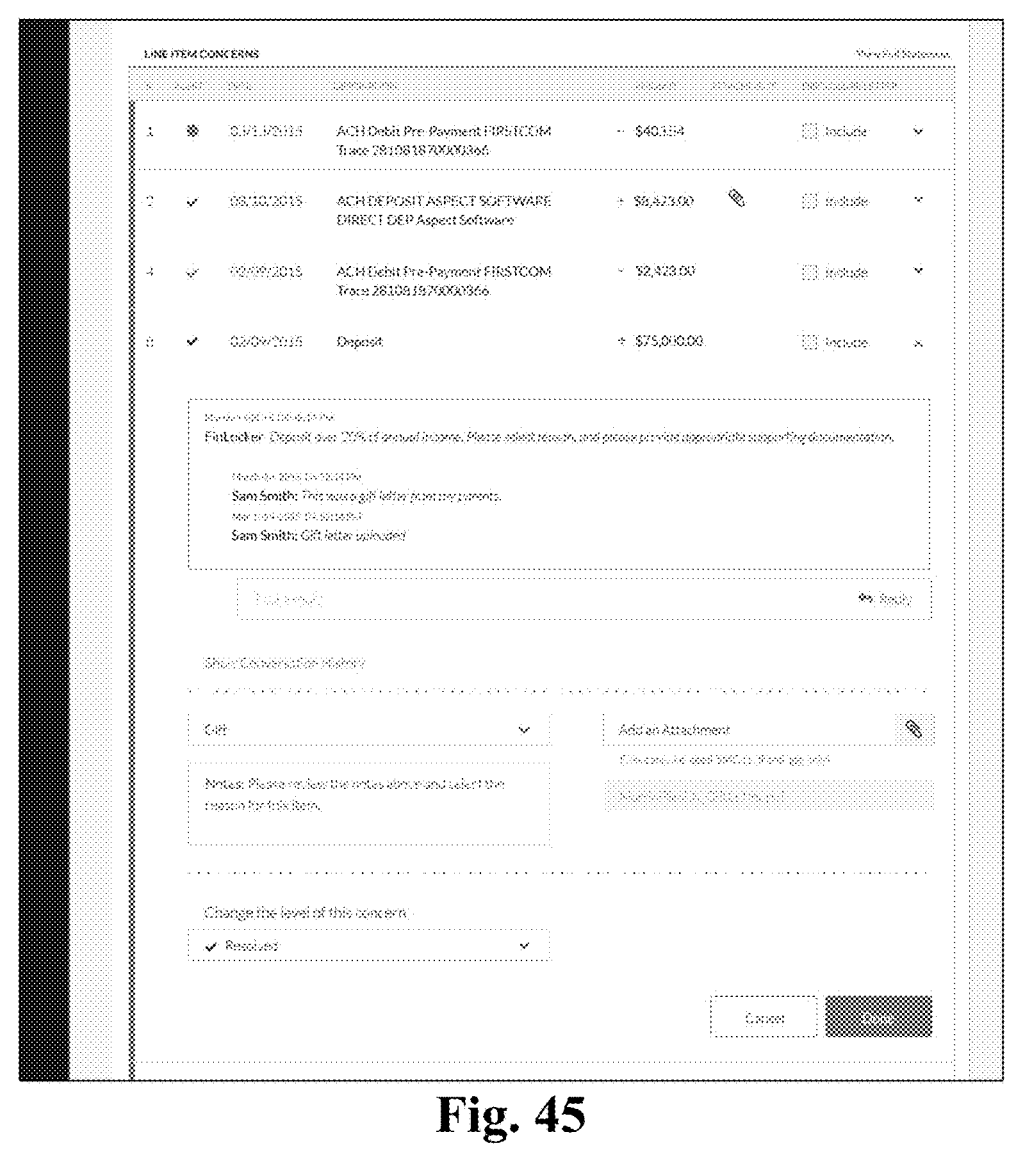

When the processor, underwriter or other party expands a line item they can see any consumer provided reasons, documents, and comments as shown in FIG. 44. The processor, underwriter or other party may, after reviewing the information, leave the item as unresolved and provide the consumer additional feedback in the notes. Alternatively, as shown in FIG. 45, the Reviewing Party (after reviewing both the reason the item was flagged and the information provided by the consumer) chooses to mark the item as resolved, changing the color coding on the item to green.

Figure 46:
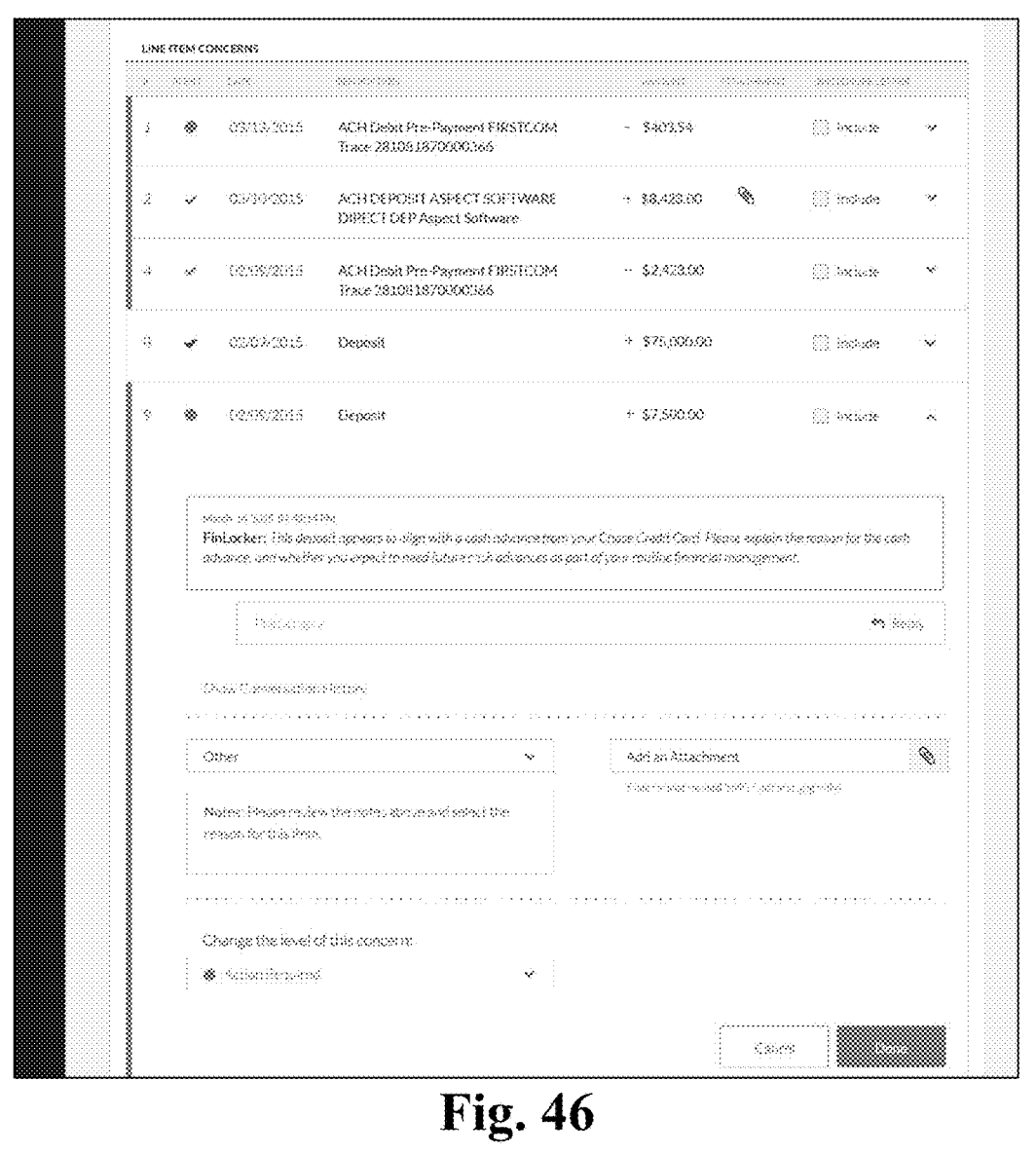
Figure 47:
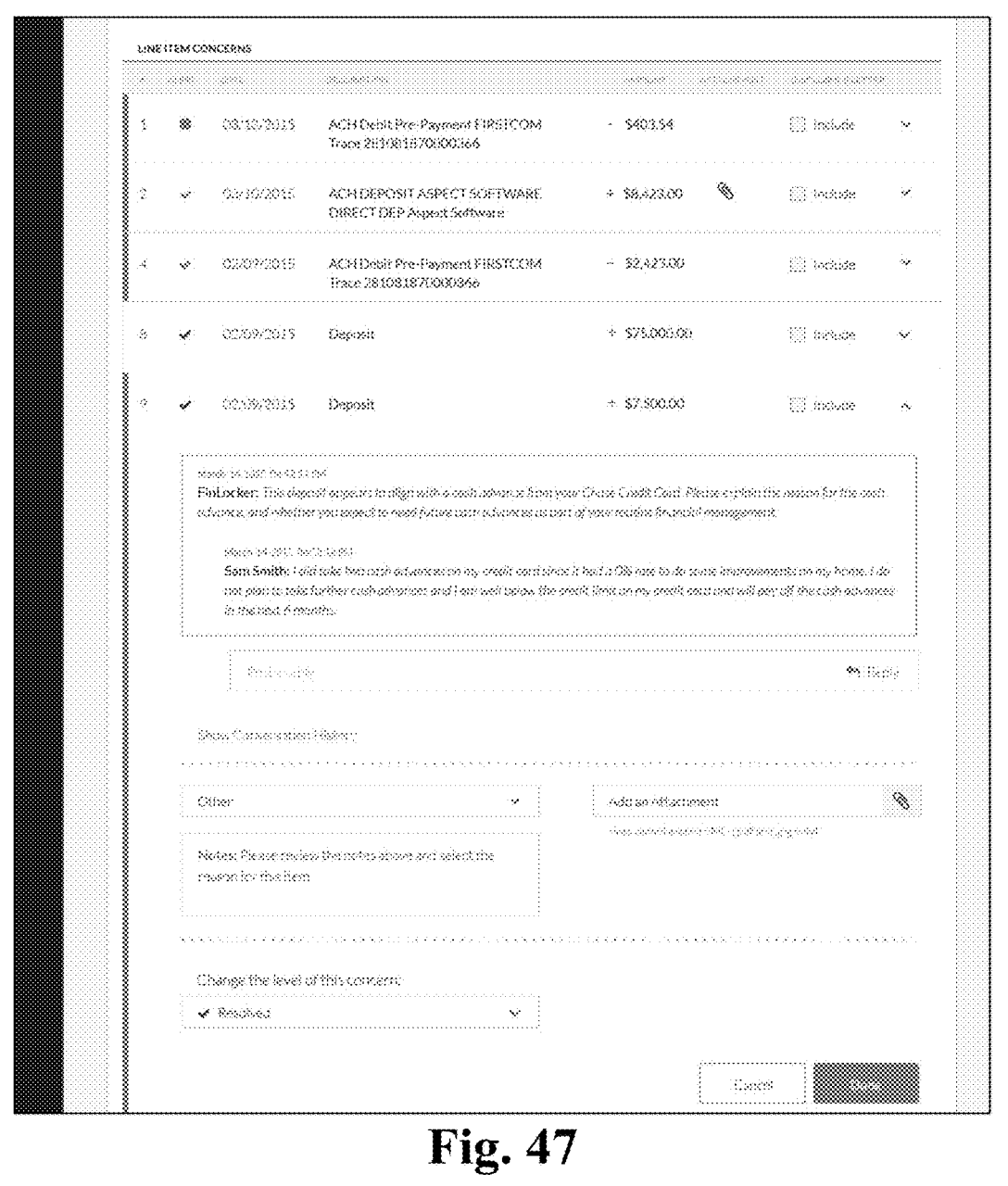
Figure 48:
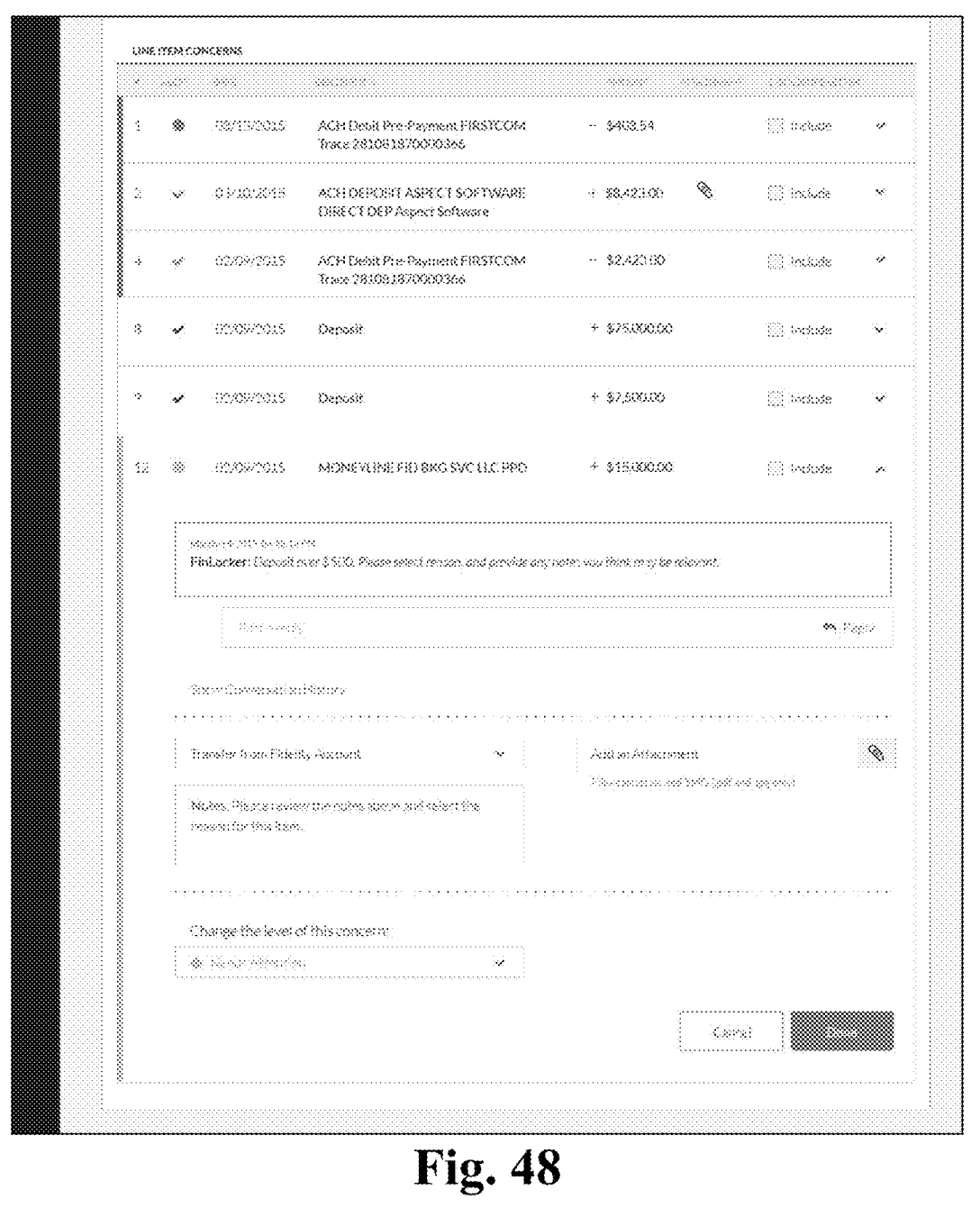
Figure 49:

There may be cases where a mortgage lender chooses to work directly with a consumer to address items flagged by the rules engine, the consumer is unwilling to respond to the requests for additional information about items in their binder, or the consumer does not know how to respond to the issues identified. As shown in FIG. 46, the Reviewing Party will see no information has been provided by the consumer. The Reviewing Party might then collaborate with the consumer outside the system, but document the results of that collaboration within the system which makes all of the information available to the consumer is the system should they ever desire to see the information gathered and enter by the Reviewing Party. If those collaborations provide adequate information, the Reviewing Party (Mike Smith) may then mark the item as resolved as shown in FIG. 47. When either the consumer or reviewing party is selecting the reason to explain a particular item, they may choose from a list reasons that not only include stock reasons, but also include reasons that are customized based on information the consumer has enrolled in their financial locker or which they have provided to their lender or other party they have shared their binder with (e.g., financial accounts, employers, etc.). In FIG. 48, the list of reasons shown includes their Fidelity Brokerage Account and their spouse's employer, Mod Shop Interior design. The Reviewing Party (Mike Smith), after consultation with the consumer, has selected 'Transfer from Fidelity account' as the reason, recorded the consumer's explanation and marked the item as resolved in FIG. 49.

Figure 50:
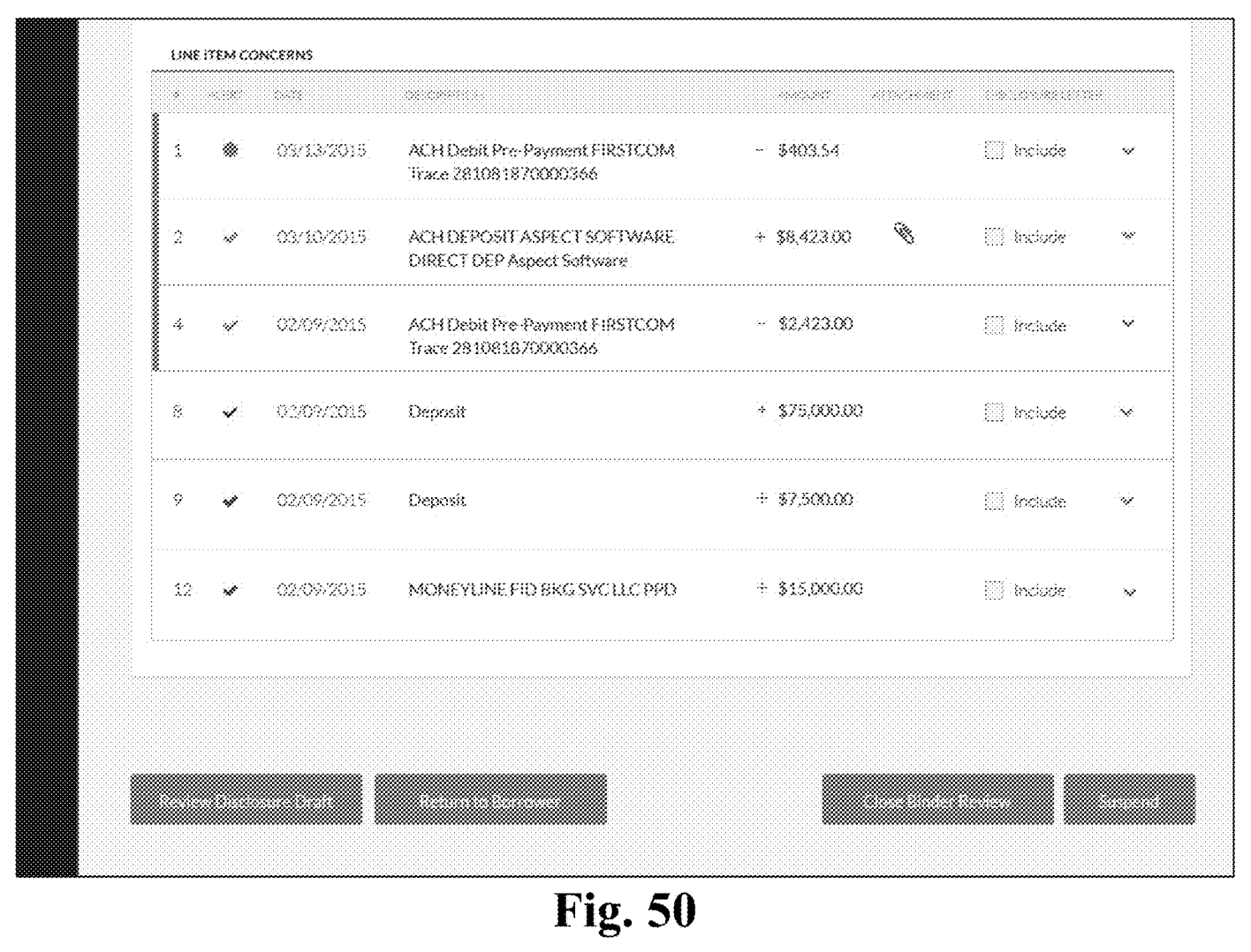
Figure 51:
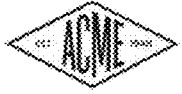
Figure 52:
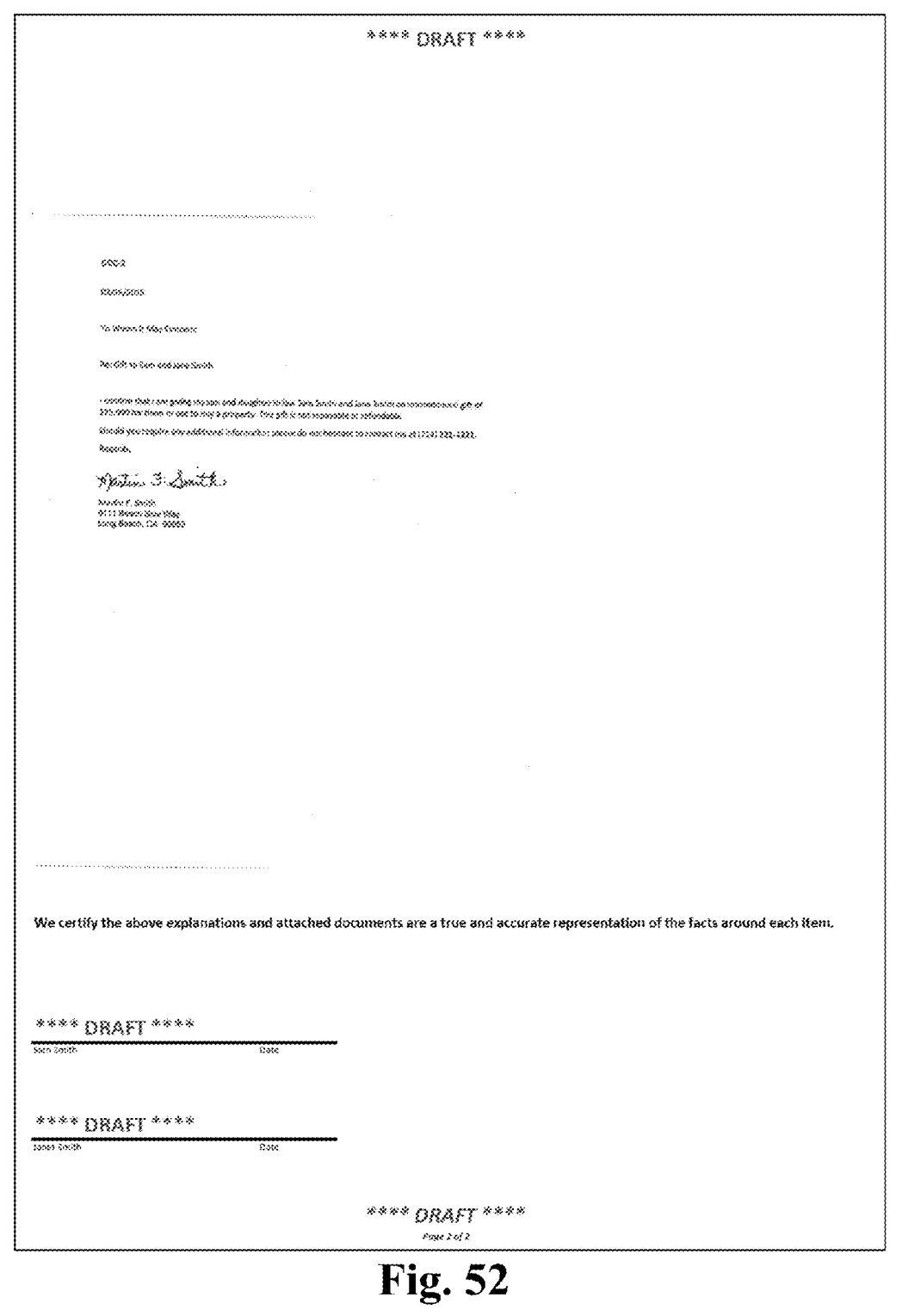

The bottom of FIG. 50 shows a number of actions which are available to the Reviewing Party has once they complete their review. The specific options shown are determined by the actions available to the Reviewing Party. They can notify the consumer they need additional information and return the binder to the consumer for further action, gather additional information from the consumer, mark remaining items as resolved, or (if sufficient information has been gathered to complete the review of the binder) and the reviewer has the needed permissions) close the review. At any point during the review process, the reviewing party can see a draft of the letter of explanation being generated for the consumer as shown in FIG. 51 and FIG. 52. While the rules engine and analysis engine make recommendations on which items to include in a consumer disclosure letter, the Reviewing Party during the process of reviewing items flagged by the rules engine and analysis engine may also determines which flagged items rise to the level of being included in the disclosure letter.

Figure 53:
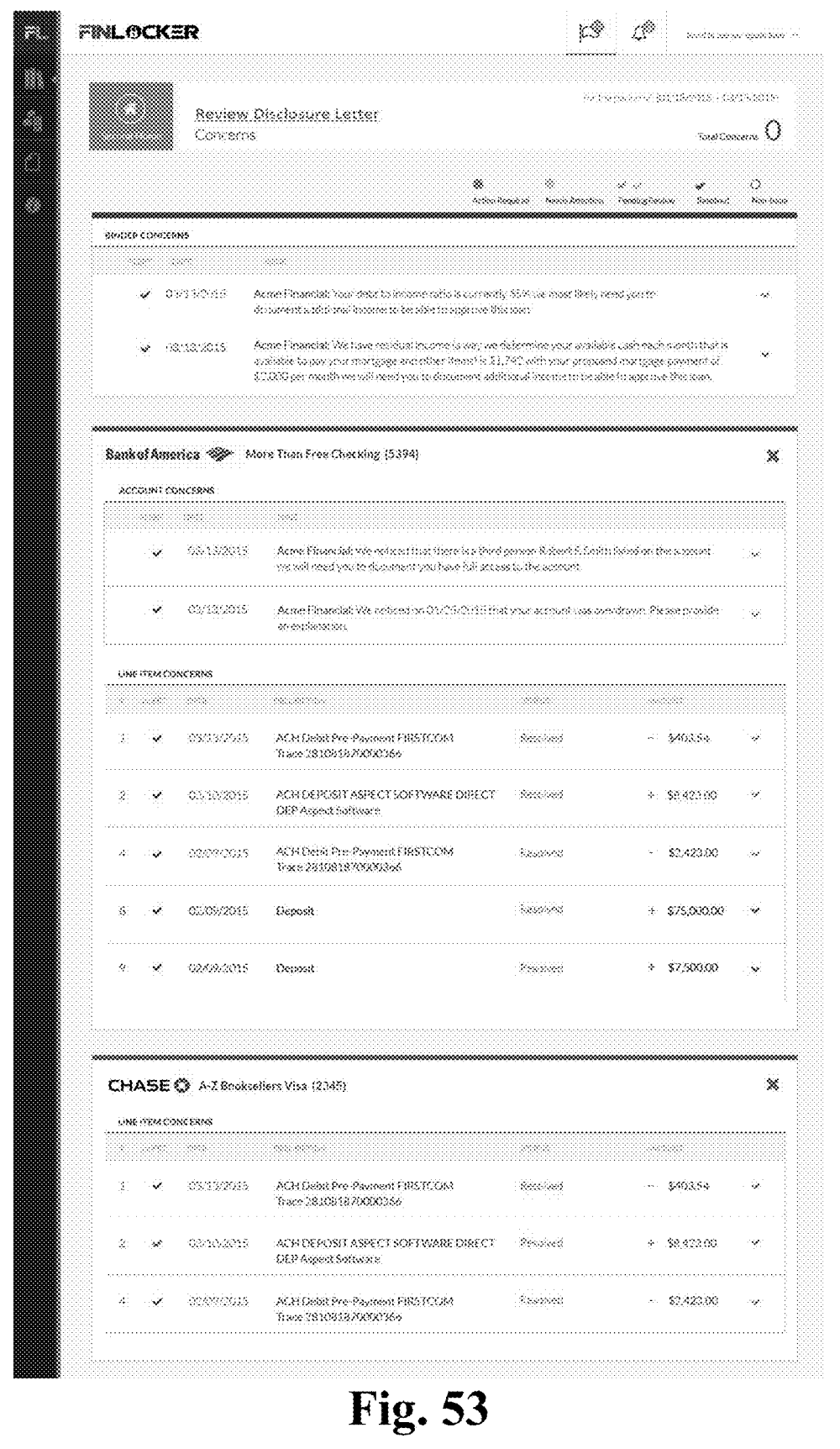

FIG. 50 reflects actions that might take place upon the completion of binder review in accordance with certain example embodiments. In many cases, only users with a specific privilege to close out review of a binder can perform that action (e.g., in some cases this may only be an underwriter or a manager). FIG. 53 shows one scenario consumer may be presented with the after the lender has closed the review of the flagged items in the binder that the consumer has shared for this loan. In this particular case all items have been marked as resolved, but just because review is closed, however, does not mean all flagged items have been resolved, and it is quite possible that certain items may remain as unresolved in the binder either because the contemplated transaction could not be approved or sufficient items were resolved that the remaining concerns no longer needed to be resolved to complete the transaction. The consumer can still click on line items to open the details in order to see the reasons selected by either the consumer or the Reviewing Party for a line item, the notes by both the consumer and the Reviewing Party about the binder, financial account, or line item, but the consumer can no longer change anything about any of these items. In certain embodiments, the consumer is then presented with an option to review a letter of explanation that shows the items that were flagged, the reason for the item as given by the consumer or the lender on behalf of the consumer, any supporting documentation, etc. If a disclosure letter is available, a link may be provided once the binder review is closed by the lender, e.g., as shown at the top of FIG. 53.

Figure 54A:
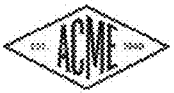

FIGS. 54A-54B provide an example letter of explanation prior to signing by the consumer. As alluded to above, the consumer can see all of the flagged items where the reviewing party has determined a letter of explanation is necessary, the reason provided to explain the flagged item, any discussion between the Reviewing Party and the consumer, etc. The ability to see the supporting documentation attached by the consumer or the Reviewing Party on behalf of the consumer is also provided. At this point, the consumer can either indicate that there is agreement with the letter of explanation, or that he/she has concerns. In the latter case, the system may capture the concerns and return the binder back to the lender for further action.

On the other hand, if the former is the case, one or more of the following and/or other actions may occur. If the lender is going to have the consumer wet-ink sign the letter of explanation, the system can prepare a PDF of the letter of explanation and all supporting documents for the lender to print and place in the consumer's signing package. If the lender is going to have the consumer e-sign with the lender's e-signature technology of choice, there are many options. In certain embodiments, the system may be configured to allow the consumer to e-sign after giving the consumer the opportunity to review the disclosure letter and the accept it. As shown in FIGS. 54A-54B, the system can prepare a PDF of the letter of explanation and all supporting documents and publish it to the lender e-signature platform. The system may also integrate with the lender's e-signature platform and capture the e-signature on this screen or use widgets provided by the e-signature platform to capture the e-signature from the consumer, etc. The system may alternatively capture the consumer's e-signature by asking the consumer to re-enter their password and/or use the system's multi-factor authentication capability to capture a one-time password sent to the consumer's phone via either text or a phone call.

Figure 55A:
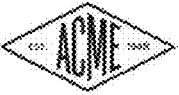

FIGS. 55A-55B show an example letter of explanation after e-signing has been completed.

As previously mentioned, parties may also transfer a primary access to a binder, if they still have access (e.g., they have not previously transferred it, the consumer has not removed access, and/or their access to the binder has not expired), to other parties such as mortgage investors. As part of this transfer, the party who originally held primary access to the binder or who had access to the binder shared with them may continue to retrieve, for audit or other purposes consistent with the permissions given by the consumer, any data which they retrieved during time they had access to the binder. As of the date of transfer, however, they may no longer request new or refreshed data, or analysis by the rules engine.

It will be appreciated that the techniques described herein can provide a number of advantages to the various parties involved in loans and other financial data sharing and collaboration scenarios. For instance, all parties may benefit from cost reductions related to the reductions in manual processing and attendant inefficiencies, as well as the lower likelihood of fraud. Loan closing times can be reduced in some instances. These and/or other advantages may in turn lead to increased profits. For instance, the ability to perhaps better understand a borrower's overall financial picture may enable a lender to perform a better price-to-risk analysis. More accurate and/or complete calculations can be made in terms of the borrower's ongoing ability to repay. These and/or other advantages may also lead to improved borrower satisfaction, quicker funding, less friction between the parties, a sense of more control over perceived "key" financial information and/or processes, etc.

Although certain example embodiments have been described in connection with mortgages, it will be appreciated that the techniques described herein may be used in connection with other financial products, companies, etc. For instance, the techniques described herein may be used in connection with auto loans, student loans, personal loans, peer-to-peer lending, credit cards, consolidated loans, small business loans, etc. —as well some or all of the parties involved in the same.

Example Architecture for Providing Visibility Into and Partial Control Over Another Entity's Workflow Certain example embodiments relate to a workflow management system. The system comprises processing resources including at least one processor and a memory coupled thereto, and a non-transitory computer readable storage medium. The processing resources are configured to control the workflow management system to at least: provide a user interface to a user of the workflow management system, the user interface being configured to present to the user information concerning a status of a multi-step workflow being managed by and under control of another entity, the multi-step workflow including processing, on a computing platform remote from and inaccessible to the user (e.g., other than via the user interface), user data, the user data including user provided data and/or documents shared from the non-transitory computer readable storage medium and data and/or documents authorized by a user to be provided; and responsive to a termination message received from the user and/or a predefined time period elapsing, transmit a signal to the computing platform of the another entity that the workflow is to be terminated, the signal causing the computing platform to terminate the workflow regardless of what step in the workflow is being processed, including regardless of whether responsibility for processing the current step in the workflow resides with the user, the another entity, or a further entity that has partnered with the another entity by request of the another entity.

According to certain example embodiments, the user data may be organized into one or more logical containers (or binders). The user interface may be further configured to enable the user to select which user data element(s) is/are to be associated with each said logical container. Further user data (e.g., later-entered data and/or data provided by other sources) may be linkable to the logical container(s). Entries may be linkable to multiple containers, etc.

According to certain example embodiments, the status may indicate the step in the workflow currently being processed. For example, the status may indicate what user data is being analyzed in the step currently being processed and/or a name of a person or organization responsible for completing the step currently being processed. Similarly, according to certain example embodiments, the status may indicate what steps in the workflow have been completed, if any. For example, the status may indicate what user data has been accessed in the completion of all completed steps. The indication of the user data that has been accessed is provided on a step-by-step basis in some cases.

According to certain example embodiments, the status may represent the step in the workflow currently being processed and/or what steps in the workflow have been completed, if any, at a level of granularity specified by the another entity.

According to certain example embodiments, at least some of the user data is provided prior to initiation of the multi-step workflow (e.g., before completing a mortgage or other application, etc.). Alternatively, or in addition, at least some of the user data is user-entered and/or automatically retrieved from one or more external sources (e.g., once an application process has been started). In this regard, at least some of the user data may user-entered (e.g., name, address, social security number, etc.) and/or at least some of the data may correspond to documents uploaded to the workflow management system (e.g., information retrieved from an external source including, for example, account statements, tax transcripts, pay statements, tax returns or tax return data, gift letters, etc.). Such information may be provided in response to a request for further information, e.g., from another party.

According to certain example embodiments, the further entity may be an agent of the other entity. According to certain example embodiments, the further entity may operate an additional computing platform configured to electronically analyze at least some information received from the user, indirectly and via the another entity, on behalf of the another entity.

According to certain example embodiments, the processing resources may be further configured to control the workflow management system to at least receive an electronic request for further information from the workflow and, responsive thereto, prompt the user, via the user interface, for additional user data, including additional data and/or documents, in satisfaction of the electronic request. The electronic request for further information from the workflow may originate with another entity. That entity may in some instances be a party external to the workflow management system processing user data upon request by another entity. The electronic request may be issued responsive to a rule associated with the workflow.

According to certain example embodiments, the processing resources may be further configured to control the workflow management system to at least receive an electronic request for further information from the workflow and, responsive thereto: automatically retrieve further user data, including further data and/or documents, from one or more data sources external to but accessible by the workflow management system through one or more corresponding computer-implemented interfaces, conditioned on the user having provided corresponding credentialing information for the one or more data sources; and electronically transmit the automatically retrieved further user data to the another entity, in satisfaction of the electronic request. For example, the user may be requested to provide additional data and/or documents in support of the workflow, and this may be provided automatically, semi-automatically (e.g., requiring one or more manual tasks), and/or manually. The automatic retrieval and/or electronic transmission may be conditioned on the electronic request being received within a period of time allotted by the system and/or the user. For instance, the user data may be organized into one or more logical containers, each said logical container being shareable with the another entity based on one or more user-defined approval policies defined when the respective logical container is created. In these and/or other cases, the automatic retrieval and/or electronic transmission may be conditioned on the one or more user-defined approval policies associated with the container(s) being shared with the another entity. In some instances, data relevant to satisfaction of the electronic request may be not directly accessible by the other entity from the one or more data sources. In some instances, the processing resources may be further configured to control the workflow management system to at least request approval from the user prior to electronic transmission of the automatically retrieved further user data to the another entity, e.g., with the request for approval being issued following the automatic retrieval, and/or after the user is presented with an opportunity to review the automatically retrieved further user data.

Non-transitory computer readable storage mediums tangibly storing instructions for performing the above-summarized and/or other approaches also are provided by certain example embodiments, as well as corresponding computer programs. Corresponding methods of operating, making, and/or configuring such systems also are contemplated herein.

Example Architecture for a Vault with Containers of Sensitive Information

Certain example embodiments relate to a reusable locker where the consumer has multiple accounts, documents, or other data sources stored in the locker that can then be placed into a container for sharing each time the consumer needs to share this data.

In certain example embodiments, a data management system comprises processing resources including at least one processor and a memory coupled thereto, and a non-transitory computer readable storage medium. The processing resources are configured to control the data management system to at least: enable a user to define a plurality of different logical containers over time, each logical container being backed by the non-transitory computer readable storage medium; receive sensitive information from the user; retrieve sensitive information from external data sources where authorized by the user; store an electronic representation of received sensitive information to the non-transitory computer readable storage medium; associate received sensitive information with one or more logical containers; store, for each logical container, a set of rules identifying one or more other parties that have access to the sensitive information associated with the respective logical container, and conditions under which those one or more parties are granted access to the sensitive information associated with the respective logical container; grant electronic access to a given logical container, and the sensitive information associated therewith, to a given party, conditioned on the set of rules associated with the given logical container; record data representative of direct and indirect accessions of logical containers and/or the sensitive information associated therewith; and responsive to a user request for a given logical container, present to the user an indication of the party or parties that has or have accessed the given logical container associated with the user request (e.g., via a user interface or the like). Each said logical container may be reusable over time by different parties based at least in part on corresponding updates to the at least one set of rules or a new logical container for different parties. Each of (a) the collection of sensitive information and (b) the content of each said logical container, is updatable over time.

According to certain example embodiments, data representative of an indirect accession may be indicative of first party having transferred and/or shared a given logical container and/or the sensitive information associated therewith, with one or more other parties.

According to certain example embodiments, recorded data representative of direct and indirect accessions may provide a party or parties who performed the accession potentially to the level of the specific person performing the accession, times, IP addresses, and other information to clearly identify the party performing the accession for the respective accessions.

According to certain example embodiments, sensitive data associable with logical containers may be retrievable from a data source external to and not managed by the data management system. For example, sensitive data from the data source may be electronically accessible from the data source, conditioned on the user providing appropriate credentialing information to the data source via the data management system. The processing resources may be configured to control the data management system to at least retrieve sensitive information from a given external data source, provided that the user provides or has provided credentialing information for the given external data source, e.g., in response to a request for at least some sensitive information from the given external data source.

According to certain example embodiments, sensitive data retrievable from a data source may be stored to the non-transitory computer readable storage medium in some cases. For example, sensitive data retrievable from a data source may be stored to the non-transitory computer readable storage medium, and correspondingly updated, e.g., each time a party successfully accesses a container associated with it, each time a party requests the container associated with it be refreshed, each time a party requests the data source in an associated container it be refreshed, and/or the like.

According to certain example embodiments, sensitive data associable with logical containers may be dynamically retrievable from a data source external to and not managed by the data management system, e.g., each time a party successfully accesses a container associated with such sensitive data, with the processing resources being configured to share such sensitive data with each such party without such parties having direct access to the data source.

According to certain example embodiments, the processing resources may be further configured to control the data management system to at least store, as a rule associated with a corresponding logical container, an indication received from the user as to whether one or more elements in a logical container of sensitive data is shareable from a first party external to the data management system to another party external to the data management system. The one or more conditions under which sensitive data is shareable may include, for example, an identification of approved parties, uses, and/or timeframes. Similarly, according to certain example embodiments, the processing resources may be further configured to control the data management system to at least store, as a rule associated with a corresponding logical container, an indication received from the user as to whether one or more elements in a logical container of sensitive data is transferable and/or shareable from a first party external to the data management system to another party external to the data management system.

According to certain example embodiments, the processing resources may be further configured to control the data management system to at least store, as a rule associated with a given logical container, an indication received from the user as to how long the given logical container and/or the data associated therewith may be used by an authorized party, an indication received from the user as to what purpose(s) the given logical container and/or the data associated therewith may be used by an authorized party, an indication received from the user as to what level of detail about the information in the given logical container and/or the data associated therewith is retrievable by an authorized party, an indication received from the user as to one or more conditions under which access to the container of sensitive data is shareable from a first party external to the data management system to another party external to the data management system, an indication received from the user as to one or more conditions under which access to the container of sensitive data is transferable from a first party external to the data management system to another party external to the data management system, and/or the like. In some cases, the one or more conditions under which sensitive data is transferable includes an identification of approved parties, uses, and/or timeframes.

Non-transitory computer readable storage mediums tangibly storing instructions for performing the above-summarized and/or other approaches also are provided by certain example embodiments, as well as corresponding computer programs. Corresponding methods of operating, making, and/or configuring such systems also are contemplated herein.

Example Architecture for Analytics

In certain example embodiments, there is provided a data analysis system comprising processing resources, including at least one first processor and a first memory operatively coupled thereto. A first data store comprises sensitive data about a user, as well as a set of data sharing rules, with the set of data sharing rules indicating what sensitive data is sharable and one or more conditions identifying when such sensitive data is shareable, and the sensitive data comprising information elements. A second data store (which may be the same as or different from the first data store) comprises at least one set of analysis rules, with the at least one set of analysis rules being system defined and/or defined by an external party separate from the user. The processing resources are configured to control the data analysis system to at least store, to the first data store, sensitive information received from the user and/or electronically retrieved from a data source external to the data analysis system in response to the user providing appropriate credentialing information for the external data source; receive, from the external party, a request to process a first predefined set of sensitive information; and responsive to a request to process a first predefined set of sensitive information: determine one or more sets of analysis rules to be applied to sensitive information in the first predefined set of sensitive information, based at least in part on the received request; automatically and programmatically attempt to apply each rule from each determined set of analysis rules to sensitive information in the first predefined set of sensitive information; store, to the second data store, information about an outcome of the rules that are successfully applied (e.g., where successful application is indicative of the rule being applied and not the outcome of the applied rule), the information being associated with the sensitive information on which the rules are run; and for each rule or set of rules that indicates that further action is required, re-assess an outcome of a respective rule or an outcome of a set of rules, responsive to at least one of: (a) automatic retrieval of further information from the user performed in connection with applicable data sharing rules, (b) application of a heuristic to sensitive information already in and/or added to the first predefined set of sensitive information, (c) electronic receipt of further information from the user or the external party in response to a system-initiated electronic prompt for responsive information, and (d) a determination as to whether the indication that further action is required for the respective rule or set of rules can be ignored based on input from the external party; and store, to the second data store, information about an outcome of the respective re-assessed rule or set of rules, the information being associated with the sensitive information on which the respective rule or set of rules is run. It will be appreciated that there may be multiple iterations of this assessing/re-assessing process in different scenarios.

According to certain example embodiments, a plurality of different sets of analysis rules to be applied to sensitive information in the first predefined set of sensitive information may be identifiable based on the received request. In some cases, at least one of the plurality of different sets of analysis rules to be applied to sensitive information in the first predefined set of sensitive information may be system defined and potentially one or more of the other different sets of analysis rules to be applied to sensitive information in the first predefined set of sensitive information may be defined by an external party separate from the user. In some cases, each of the plurality of different sets of analysis rules to be applied to sensitive information in the first predefined set of sensitive information may be defined by an external party separate from the user. In some cases, the sets of analysis rules to be applied to sensitive information in the first predefined set of sensitive information may be system defined. In certain example embodiments, one or more of the rules in the at least one set of analysis rules may relate to a heuristic.

According to certain example embodiments, re-assessment may be practiced by executing (a), (b), (c), and (d) in order. Similarly, according to certain example embodiments, re-assessment may be practiced by executing (a), (b), (c), and (d), in a predefined order, until re-assessment is deemed complete. The sequencing, as opposed to the number of steps, is implied here.

According to certain example embodiments, the heuristic may include natural language processing of sensitive information already in and/or added to the first predefined set of sensitive information; performing optical character recognition of sensitive information already in and/or added to the first predefined set of sensitive information; digitally processing sensitive information already in and/or added to the first predefined set of sensitive information, and checking the digitally processed sensitive information for one or more pre-identified values applicable to the respective rule being re-assessed; one or more machine-learned rules; etc. It will be appreciated that rules may be formed as a collection of one or more computer-represented and logical statements that may be evaluated, one or more heuristics, mathematical formulae, and/or the like. Supervised and/or unsupervised machine learning techniques as described herein may be used in this regard. For example, machine learning techniques may be used to generate and/or evaluate rules and/or heuristics.

Regardless of what the heuristics actually are, it will be appreciated that heuristics may be applied in initial and/or follow-on assessments, at least in certain example embodiments. In general, it will be appreciated that certain example embodiments cover the concept of rules (including, for example, heuristics) being applied at the level of the online account and the individual binder. For example, at the account level, one might not be concerned about the transaction that caused an overdraft, but one might be concerned about the fact the account was overdrawn, had a balance that fell below some threshold, etc. At the binder level, one might be concerned about things like cash flow, debt-to-income ratios, etc. Rules (including heuristics) therefore may be applied at the most detailed level (e.g., on transactions), the collection of details (e.g., on an account), and/or the collection of collections of details (e.g., on a binder). Rules (including heuristics) may be applied on some or all of these different levels.

According to certain example embodiments, a score may be assignable to, and/or a model may be applicable to sensitive information already in and/or added to the first predefined set of sensitive information, and consequently output of the score and/or model may be added to the first predefined set of sensitive information for consideration by the rules.

According to certain example embodiments, the processing resources may be further configured to control the data analysis system to at least repeat the automatic and programmatic attempt at application of each rule from each determined set of analysis rules based on further input from the user and/or the external party, in response to an update to the first predefined set of sensitive information, and/or the like. Applicable rules may be hierarchical in certain example embodiments.

According to certain example embodiments, the information about an outcome may be representative of a state for an information element processed by a corresponding rule, the state being selected from a plurality of different predefined states. A first predefined state may be indicative of follow-up being needed, and a second predefined state may be indicative of no follow-up being needed. There may be multiple different states indicating different respective needs for follow-up in certain example embodiments.

Details about an issue requiring further action identified with respect to a given information element may be stored as an attribute of that information element in some cases. In certain example embodiments, potential information needed to resolve the issue and/or potential resolutions associated with the issue identified additionally or alternatively may be stored as an attribute of that information element.

According to certain example embodiments, information about outcomes of rules may be stored on a rule-by-rule basis and/or on an information element by information element basis. In certain example embodiments, information about outcomes of rules may relate to one or more levels of rules and/or one or more levels of information elements.

According to certain example embodiments, an electronic message may be sent to the user and/or external party(s) and convey information about the outcome of each applied rule, if any, and each re-assessed rule or set of rules, if any. In addition, or in the alternative, according to certain example embodiments, an electronic message may be sent to the user and/or external party(s) and convey information indicating that (a) one or more rules have been applied, (b) prompts the user and/or external party(s) to whom the electronic message is sent to access the system via a portal and/or an application programming interface (API) to obtain the results of the rules that have been applied, and/or (c) one or more information elements have issues that the user and/or external party(s) to whom the electronic message is sent needs to review and potentially address through the system using a portal and/or API. Electronic messages include email messages, text messages, system-to-system messaging, etc.

According to certain example embodiments, a portal and/or API configured to enable the external party to update a given outcome may be provided. In certain example embodiments, the portal and/or API may be configured to enable the external party to update a given outcome by selectively changing the corresponding state from a state indicating follow-up is needed to a state indicating follow-up is not needed and/or issue is resolved, and vice versa; to enable the external party to override a given outcome for a corresponding item of sensitive information by changing the outcome provided by one or more rules to an outcome selected from a predefined set of available outcomes that the external party determines is more appropriate; to enable the external party to remove a given outcome and any associated state for a corresponding item of sensitive information; to enable the external party to add a new outcome for a corresponding item of sensitive information by selecting the new outcome from a predefined set of available outcomes and setting the state to a state selected from a set of predefined states for that outcome or from a predefined states available system-wide; to enable the external party to override a given outcome for a corresponding item of sensitive information by changing the outcome provided by one or more rules to an outcome that is provided by the external party that the external party determines is more appropriate and which is not selected from a predefined set of available outcomes but instead is selected by the external party from a set of system-wide predefined states to set the state of that outcome; to enable the external party to update a given outcome for a corresponding rule by annotating the given outcome with a note; to enable the external party to update a given outcome for a corresponding information element by annotating the given outcome with a note (e.g., with the note potentially correlating the given rule and/or sensitive information associated with the rule with other information about the user known to the external party); to enable the user to provide information responsive to a given outcome for a corresponding information element by annotating the given outcome with a note and/or supplemental documents and/or information; and/or the like.

According to certain example embodiments, a portal and/or API may be configured such the user may provide additional information such as a note or notes, document or documents, access to new source or sources of sensitive information usable by the rules, heuristics, and/or the external party which address or help address the issue or issues identified with an information element by the rules, heuristics, and/or review by the external party to identify there is an issue or issues with the information element.

According to certain example embodiments, information elements may be organized as hierarchical collections of entries in the first predefined set of sensitive information. For instance, in certain example embodiments, the hierarchical collections of entries in the first predefined set of sensitive information may include single information elements, groupings of related single information elements, one or more collections of single information elements or groupings related single information elements entries that are proper subsets of the information elements in the first predefined set of sensitive information, and the first predefined set of sensitive information itself. Similarly, in certain example embodiments, the information elements that comprise the sensitive information about the user may be definable as: (a) singular information elements, (b) groupings of related and/or non-related information elements, (c) hierarchies of information elements, (d) hierarchies of hierarchies of information elements, (e) attributes of other information elements, and/or (f) attributes of hierarchies of information elements. Thus, it will be appreciated that in certain example embodiments, the hierarchical collections of entries in the first predefined set of sensitive information may include collections of collections in the first predefined set of sensitive information, and the first predefined set of sensitive information itself.

In certain example embodiments, an outcome of a first rule may override an outcome of a second rule, e.g., provided that the first rule relates to a higher-order information element compared to the second rule, provided that the first rule is a higher-order rule compared to the second rule, etc. In certain example embodiments, an outcome of a subsequent rule may be structured to override an outcome of a prior rule based on the information element or information elements available to it. In certain example embodiments, an outcome of a first rule may be structured to override an outcome of a second rule, e.g., provided that the first rule relates to a subsequent information element compared to the second rule, provided that the first rule considers a broader set of information elements compared to the second rule, etc. Applicable rules may be hierarchical in certain example embodiments.

In certain example embodiments, an outcome of a first rule may override an outcome of a second rule, provided that the first rule relates to a higher-order information element compared to the second rule, regardless of whether the second rule relates to an information element having a state indicating that it is flagged for follow-up. In certain example embodiments, an outcome of a first rule may override an outcome of a second rule, provided that the first rule relates to a higher-order information element compared to the second rule and even though the second rule relates to an information element having a state indicating that it is flagged for follow-up. In certain example embodiments, an outcome of a first rule may override an outcome of a second rule, provided that the first rule is a higher-order rule compared to the second rule. In certain example embodiments, an outcome of a subsequent rule may be structured to override an outcome of a prior rule. In certain example embodiments, an outcome of a first rule may be structured to override an outcome of a second rule, provided that the first rule relates to a subsequent information element compared to the second rule. In certain example embodiments, an outcome of a first rule may be structured to override an outcome of a second rule, provided that the first rule considers a broader set of information elements compared to the second rule.

In certain example embodiments, an outcome of a first rule may override an outcome of a second rule, provided that a heuristic applied to the first predefined set of sensitive information as a whole indicates that the second rule should be overridden and regardless of whether the second rule relates to an information element having a state indicating that it is flagged for follow-up. In certain example embodiments, an outcome of a first rule may override an outcome of a second rule, provided that a heuristic applied to a broader set of information elements from the first predefined set of sensitive information indicates that the second rule should be overridden and even though the second rule relates to an information element having a state indicating that it is flagged for follow-up. In certain example embodiments, an outcome of a first rule may override an outcome of a second rule, provided that a heuristic applied to a broader set of information elements from the first predefined set of sensitive information indicates that the second rule should be overridden and even though the second rule relates to an information element having a state indicating that it is not flagged for follow-up. In certain example embodiments, different rules may have different levels of sophistication or complexity. Moreover, in certain example embodiments, a more sophisticated or complex rule may overrule less sophisticated or complex rule. For example a simple rule implemented in the rules engine may be overruled by a heuristic, machine learned rule, etc.

In certain example embodiments, based on the data type, the customer, the type of loan, the particular usage of the data, the data elements shared by the consumer, etc., one or more rules may be applied to the data. The rules engine may determine whether no rules identify issues and, if so, then the rules engine, analysis engine, etc., essentially output nothing about that data item. If only a single rule is applicable and/or only a single rule identifies an issue, then the rules engine may output an indication of the severity of the issue, and the issue associated to this data element (e.g., a transaction, line item, etc.) or collection of data elements (e.g., an account, collection of accounts, etc.). If multiple rules fail inside the rules engine, analysis engine, etc., the rules engine, analysis engine, etc., may make the decision as to the most relevant rule and then output the severity based on that rule, and the issue associated with that rule. Certain example embodiments may involve the outputting of multiple issues per information element and/or the application of multiple rules and the determination of a consolidated answer for that data item, or collection of data items.

It will be appreciated that certain example embodiments involve the selective flagging of items of data processed by one or more rules, as opposed to the rules. In other words, in certain example embodiments, it is the sensitive data item, account, or binder that is flagged. An item may have only one issue identified with it in certain example embodiments, whereas an account or binder can have multiple issues identified. For example, a checking account could have multiple issues such as, for example, having one or more over drafts, having a declining average daily balance/negative cash flow, loss of a recurring deposit (pay check, etc.). Other example embodiments may allow items to have one or more associated issues, e.g., as noted above.

The following scenario is an example of a subsequent rule overriding a prior rule. A $75,000 deposit in a bank account is flagged, but further in the analysis workflow, it is determined that this is a transfer of $75,000 from a brokerage account the consumer has made available to the system. The bank deposit no longer needs follow-up.

The following scenario is an example of a higher-order rule overriding a lower-order rule. A $7,500 deposit in a bank account is not flagged, but further in the analysis workflow, a $7,500 cash advance is identified in a consumer's credit card account they have made available to the system. Not only is the cash advance in the credit card account flagged for follow-up, but also the deposit in the bank account is flagged for follow-up.

The following scenario is an example of a overall compendium analysis overriding one or more other rules. The consumer has a deposit of $75,000 in their bank account, which is over 20% of their annual income, but upon analysis it is determined the consumer has assets of over $10 million, and their debt-to-income ratio is less than 20%. It is not necessary to determine the reason for this deposit.

In certain example embodiments, where analysis of a subsequent data item, a higher order rule, or a heuristic removes the need for follow-up, this action may be recorded in an audit log. From the lender's perspective, in certain example embodiments, short of looking at the audit log or processing history, the lender would never know this item was ever flagged.

According to certain example embodiments, further sensitive information may be electronically receivable responsive to the user providing access to additional sensitive information pre-stored to the first data store, responsive to the user providing access to additional sensitive information electronically available from one or more other external data sources, responsive to the user authorizing access to, and providing credentialing information for, one or more other external data sources, responsive to the user providing contact information for another party from whom information is desired, and/or the like.

According to certain example embodiments, the processing resources may be further configured to control the data analysis system to at least apply a further set of rules to attempt to automatically and programmatically resolve problematic outcomes.

According to certain example embodiments, the processing resources may be further configured to control the data analysis system to at least continue attempting to apply and/or re-assess rules without regard to outcomes of earlier-processed rules.

According to certain example embodiments, the processing resources may be further configured to control the data analysis system to at least apply a further set of heuristics to attempt to automatically and programmatically resolve problematic outcomes. The heuristic may include one or more machine-learned rules in some instances.

According to certain example embodiments, the processing resources may be further configured to control the data analysis system to reapply and/or re-assess rules without regard to outcomes of earlier-processed rules when new information becomes available regardless of how that information becomes available.

According to certain example embodiments, the processing resources may be further configured to control the data analysis system to at least apply a further set of heuristics to attempt to automatically and programmatically resolve problematic outcomes when new information becomes available regardless of how that information becomes available.

According to certain example embodiments, a data store configured to store an audit trail may be provided. In certain example embodiments, the audit trail tracks rule applications, accessions by users and/or external parties, actions taken by users and/or external parties, data retrieval from external data sources and/or internal data sources, and/or the like.

According to certain example embodiments, the processing resources may be further configured to control the data analysis system to at least send an electronic message to the user and/or external party upon completion of the automatic and programmatic attempt at application of each rule from each determined set of analysis rules.

According to certain example embodiments, the processing resources may be further configured to control the data analysis system to at least send an electronic message to the user and/or external party upon completion of the processing of the first predefined set of sensitive information in accordance with the request.

According to certain example embodiments, the processing resources may be further configured to control the data analysis system to at least send an electronic message to the user and/or external party upon completion of the automatic and programmatic attempt at when all rules, heuristics, and/or machine learned-rules have completed processing.

According to certain example embodiments, the information about an outcome may be one or more of a result of a calculation, output from a model, a score, and/or output from a machine-learned model for one or more information elements processed by one or more calculations, rules, models, score, machine-learned models. The outputs created by calculations, models, scores, machine-learned models may become input for and drives the application of rules, heuristics, machine-learned rules, in certain example embodiments. Certain example embodiments may consider the classification of all of the transactions across all accounts and come up with what is a person spending on certain predefined categories including, for example utilities, transportation, nanny, food, etc. In this case, analysis/rules may be used to determine this, and this derived data also may be used to output potential issues such as, for example, non-discretionary spending being too high, needing to reduce discretionary spending, etc. It will be appreciated that there may be multiple results from multiple calculations, models, scores, etc. It also will be appreciated that results may be stored to a storage location, and/or may be provided to the external party and/or others via the portal and/or one or more APIs.

According to certain example embodiments, rules that are successfully applied are those rules for which results are provided. According to certain example embodiments, rules that are successfully applied are those rules for which results are provided, regardless of whether those results indicate that further action is required.

According to certain example embodiments, the processing resources may be further configured to control the data analysis system to at least determine whether the request to process the first predefined set of sensitive information is authorized by the user and/or the data sharing rules; and condition the response to the request on this determination.

As a perhaps more tangible scenario, certain example embodiments may pull the bank, brokerage, credit card, and/or other sensitive user data from the system. All applicable rules may be applied to all of the pulled data. As part of the application of the rules if, for example, a large deposit in a checking account is found and a large withdrawal from a brokerage account that matches the amount of money and the timeframe and amount also can be found, then the issue can be automatically resolved, or the large deposit can be flagged and the consumer can be asked to confirm that this suspicion is correct. Heuristics and other forms of sophisticated analysis may be applied to automatically resolve flagged items. If the system cannot resolve the issue with the item, it may be left flagged, with all flagged items being presented to the consumer and processor. In certain example embodiments, the processing of rules will not be stopped waiting on an issue to be resolved.

In essence, in some cases, the consumer may add another account or provide additional information to their locker and ultimately their binder, which may resolve the issue, e.g., in accordance with the locker and binder concepts described herein. A consumer may upload documents, provide comments, enroll other data sources, or correlate with existing data sources (e.g., they can say a given check deposited into their checking account aligns with a given check drawn on the brokerage account, etc.). In the event that the consumer enrolls another account, the rules may be able to automatically resolve the issue identified. Of course, there is the chance the additional enrollment or attempted resolution could also introduce its own set of issues. Thus, the process may be ongoing and/or iterative in some instances.

A processor/underwriter (user from the external party) may upload documents, provide comments based on their discussions with the consumer, correlate with existing data sources (e.g., they can say a given check deposited into the consumer's checking account aligns with a given check drawn on the consumer's brokerage account, etc.). The processor/underwriter can close (e.g., resolve) items that were left as flagged (e.g., as being unresolved by the rules engine), and they can also flag items that were not flagged by the rules engine and then ultimately close (resolve) the open issue.

The lender may have access to information that allows them to provide information that could resolve the issue. The system may communicate with the processor/underwriter directly, e.g., in addition to or instead of the consumer.

Over time, as rules, analytics, and heuristics capabilities learn, more and more issues may be resolved automatically and/or the fewer items on which the consumer, lender, and/or processor/underwriter will have to collaborate on. Heuristics or other rules may learn over time through supervised and/or unsupervised computer learning approaches. For example, a rule that may be learned may involve having x number of items that have been flagged at the transaction level and unflagging those issues, e.g., as a result or stepping back and looking at all of the data presented and making a relevant determination (e.g., the total net worth and ability repay is sufficiently high). Determining what is acceptable/unacceptable in terms of risk, etc., may be learned as well. For example, although an item might be flagged due to a deposit being more than 20% of the person's annual income, the system may have learned over time that if the person has no outstanding credit card debt, this is not an issue and the flagged issue can be automatically resolved.

Non-transitory computer readable storage mediums tangibly storing instructions for performing the above-summarized and/or other approaches also are provided by certain example embodiments, as well as corresponding computer programs. Corresponding methods of operating, making, and/or configuring such systems also are contemplated herein.

It will be appreciated that the data may be stored and/or transmitted using any suitable encrypted or unencrypted format and/or protocol, e.g., depending on the type of data involved, whether the data is being shared between internal system components and/or with external parties, etc.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium. It will be appreciated that some or all of the architectures described herein may be implemented in the cloud. For example, the portals may be web-based portals, the data stores may be cloud storage locations, the rules engine may be provided as a service on a cloud, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A data analysis system, comprising:
   processing resources, including at least one first hardware processor and a first memory operatively coupled thereto;
   a first non-transitory data store comprising sensitive data about a user, as well as a set of data sharing rules, the set of data sharing rules indicating what sensitive data is sharable and one or more conditions identifying when such sensitive data is shareable, and the sensitive data comprising information elements; and
   a second non-transitory data store comprising at least one set of analysis rules, the at least one set of analysis rules being system defined and/or defined by an external party separate from the user;
   wherein the processing resources are configured to control the data analysis system to at least:
      store, to the first data store, sensitive information received from the user and/or electronically retrieved from a data source external to the data analysis system in response to the user providing appropriate credentialing information and/or consent for the external data source;
      receive, from the external party, a request to process a first predefined set of sensitive information; and
      responsive to a request to process a first predefined set of sensitive information,
         determine one or more sets of analysis rules to be applied to sensitive information in the first predefined set of sensitive information, based at least in part on the received request;
         automatically and programmatically attempt to apply each rule from each determined set of analysis rules to sensitive information in the first predefined set of sensitive information;
         store, to the second data store, information about an outcome of the rules that are successfully applied, the information being associated with the sensitive information on which the rules are run; and
         for each rule or set of rules that indicates that further action is required:
            re-assess an outcome of a respective rule or an outcome of a set of rules, responsive to at least one of: (a) automatic retrieval of further information from the user performed in connection with applicable data sharing rules, (b) application of a heuristic to sensitive information already in and/or added to the first predefined set of sensitive information, (c) electronic receipt of further information from the user or the external party in response to a system-initiated electronic prompt for responsive information, and (d) a determination as to whether the indication that further action is required for the respective rule or set of rules can be ignored based on input from the external party; and
            store, to the second data store, information about an outcome of the respective re-assessed rule or set of rules, the information being associated with the sensitive information on which the respective rule or set of rules is run; and
      wherein the system further comprises a portal and/or application programming interface configured to enable the external party to update a given outcome provided by one or more analysis rules for a corresponding item of sensitive information by updating the given outcome to an updated outcome selected from a set of outcomes.

2. The system of claim 1, wherein the set of outcomes to which the given outcome can be provided includes a list of different predefined selectable follow-up statuses.

3. The system of claim 1, wherein the set of outcomes to which the given outcome can be updated includes an outcome requiring annotation by the external party.

4. The system of claim 1, wherein the processing resources are further configured to control the data analysis system to at least determine whether the request to process the first predefined set of sensitive information is authorized by the user and/or the data sharing rules; and condition the response to the request on this determination.

5. The system of claim 1, wherein one or more of the rules in the at least one set of analysis rules relates to a heuristic.

6. The system of claim 1, wherein rules that are successfully applied are those rules for which results are provided, regardless of whether those results indicate that further action is required.

7. The system of claim 1, wherein rules that are successfully applied are those rules for which results are provided.

8. The system of claim 1, wherein the information about an outcome is one or more of a result of a calculation, output from a model, a score, and/or output from a machine-learned model, for one or more information elements processed by one or more calculations, rules, models, score, and/or machine-learned models.

9. The system of claim 8, wherein the outputs created by calculations, models, scores, and/or machine-learned models become input for and drive the application of rules, heuristics, and/or machine-learned rules.

10. The system of claim 1, wherein the processing resources are further configured to control the data analysis system to at least send an electronic message to the user and/or external party upon completion of the processing of the first predefined set of sensitive information in accordance with the request.

11. The system of claim 10, wherein the processing resources are further configured to control the data analysis system to at least send an electronic message to the user and/or external party upon completion of the automatic and programmatic attempt when all rules, heuristics, and/or machine learned-rules have completed processing.

12. The system of claim 1, wherein the processing resources are further configured to control the data analysis system to at least send an electronic message to the user and/or external party upon completion of the automatic and programmatic attempt at application of each rule from each determined set of analysis rules.

13. The system of claim 1, further comprising a data store configured to store an audit trail.

14. The system of claim 13, wherein the audit trail tracks rule applications.

15. The system of claim 13, wherein the audit trail tracks data accessions by users and/or external parties.

16. The system of claim 13, wherein the audit trail tracks actions taken by users and/or external parties.

17. The system of claim 13, wherein the audit trail tracks data retrieval from external data sources and/or internal data sources.

18. The system of claim 1, wherein the processing resources are further configured to control the data analysis system to at least apply a further set of heuristics to attempt to automatically and programmatically resolve problematic outcomes when new information becomes available regardless of how that information becomes available.

19. The system of claim 1, wherein the processing resources are further configured to control the data analysis system to reapply and/or re-assess rules without regard to outcomes of earlier-processed rules when new information becomes available regardless of how that information becomes available.

20. The system of claim 1, wherein the processing resources are further configured to control the data analysis system to at least apply a further set of heuristics to attempt to automatically and programmatically resolve problematic outcomes.

21. The system of claim 20, wherein the heuristic includes one or more machine-learned rules.

22. The system of claim 1, wherein the processing resources are further configured to control the data analysis system to at least continue attempting to apply and/or re-assess rules without regard to outcomes of earlier-processed rules.

23. The system of claim 1, wherein the processing resources are further configured to control the data analysis system to at least apply a further set of rules to attempt to automatically and programmatically resolve problematic outcomes.

24. The system of claim 1, wherein, as a part of (c), further sensitive information is electronically receivable responsive to the user providing contact information for another party from whom information is desired.

25. The system of claim 1, wherein, as a part of (c), further sensitive information is electronically receivable responsive to the user authorizing access to, and providing credentialing information for, one or more other external data sources.

26. The system of claim 1, wherein, as a part of (c), further sensitive information is electronically receivable responsive to the user providing access to additional sensitive information electronically available from one or more other external data sources.

27. The system of claim 1, wherein, as a part of (c), further sensitive information is electronically receivable responsive to the user providing access to additional sensitive information pre-stored to the first data store.

28. The system of claim 1, wherein the portal and/or application programming interface is configured to enable the external party to update the given outcome by annotating the given outcome with a note.

29. The system of claim 28, wherein the note correlates the given rule and/or sensitive information associated with the rule with other information about the user known to the external party.

30. The system of claim 28, wherein the portal and/or application programming interface is configured to enable the user to provide information responsive to the given outcome by annotating the given outcome with a note and/or supplemental documents and/or information.

31. The system of claim 1, wherein the portal and/or application programming interface is configured to enable the external party to update the given outcome for a corresponding rule by annotating the given outcome with a note.

32. The system of claim 1, wherein the set of outcomes is a predefined set of available outcomes, and wherein the portal and/or application programming interface is configured to enable the external party to update the given outcome by changing the outcome provided by one or more rules to an outcome that is provided by the external party that the external party determines is more appropriate and which is not selected from a predefined set of available outcomes but instead is selected by the external party from a set of system-wide predefined states to set the state of that outcome, in order to override the given outcome.

33. The system of claim 1, wherein the portal and/or application programming interface is configured to enable the external party to add a new outcome for the corresponding item of sensitive information by selecting the new outcome from a predefined set of available outcomes and setting an associated state to a state selected from a set of predefined states for that outcome or from a predefined states available system-wide.

34. The system of claim 1, wherein the portal and/or application programming interface is configured to enable the external party to remove the given outcome and any associated state for the corresponding item of sensitive information via the updating.

35. The system of claim 1, wherein the set of outcomes is a predefined set of available outcomes, and wherein the portal and/or application programming interface is configured to enable the external party to update the given outcome by changing that outcome to an outcome selected from among the predefined set of available outcomes and that the external party determines is more appropriate, in order to override the given outcome.

36. The system of claim 1, wherein an electronic message is sent to the user and/or external party(s) and conveys information indicating that (a) one or more rules have been applied, and (b) prompts the user and/or external party(s) to whom the electronic message is sent to access the system via a portal and/or an application programming interface to obtain the results of the rules that have been applied.

37. The system of claim 1, wherein an outcome of a first rule overrides an outcome of a second rule, provided that a heuristic applied to a broader set of information elements from the first predefined set of sensitive information indicates that the second rule should be overridden and even though the second rule relates to an information element having a state indicating that it is flagged for follow-up.

38. The system of claim 1, wherein information elements are organizable as hierarchical collections of entries in the first predefined set of sensitive information.

39. The system of claim 38, wherein the hierarchical collections of entries in the first predefined set of sensitive information include single information elements, groupings of related single information elements, one or more collections of single information elements or groupings related single information elements entries that are proper subsets of the information elements in the first predefined set of sensitive information, and the first predefined set of sensitive information itself.

40. The system of claim 38, wherein the hierarchical collections of entries in the first predefined set of sensitive information includes collections of collections in the first predefined set of sensitive information, and the first predefined set of sensitive information itself.

41. The system of claim 38, wherein an outcome of a first rule overrides an outcome of a second rule, provided that the first rule relates to a higher-order information element compared to the second rule.

42. The system of claim 38, wherein an outcome of a first rule overrides an outcome of a second rule, provided that the first rule is a higher-order rule compared to the second rule.

43. The system of claim 38, wherein an outcome of a subsequent rule is structured to override an outcome of a prior rule based on the information element or information elements available to it.

44. The system of claim 38, wherein an outcome of a first rule is structured to override an outcome of a second rule, provided that the first rule relates to a subsequent information element compared to the second rule.

45. The system of claim 38, wherein an outcome of a first rule is structured to override an outcome of a second rule, provided that the first rule considers a broader set of information elements compared to the second rule.

46. The system of claim 38, wherein an outcome of a first rule overrides an outcome of a second rule, provided that a heuristic applied to the first predefined set of sensitive information as a whole indicates that the second rule should be overridden and regardless of whether the second rule relates to an information element having a state indicating that it is flagged for follow-up.

47. The system of claim 38, wherein an outcome of a first rule overrides an outcome of a second rule, provided that a heuristic applied to a broader set of information elements from the first predefined set of sensitive information indicates that the second rule should be overridden and even though the second rule relates to an information element having a state indicating that it is not flagged for follow-up.

48. The system of claim 38, wherein the information elements that comprise the sensitive information about the user are definable as: (a) singular information elements, (b) groupings of related and/or non-related information elements, (c) hierarchies of information elements, (d) hierarchies of hierarchies of information elements, (e) attributes of other information elements, and/or (f) attributes of hierarchies of information elements.

49. The system of claim 1, wherein the information about an outcome is representative of a state for an information element processed by a corresponding rule, the state being selected from a plurality of different predefined states.

50. The system of claim 49, wherein information about outcomes of rules is stored on a rule-by-rule basis.

51. The system of claim 49, wherein information about outcomes of rules is stored on an information element by information element basis.

52. The system of claim 49, wherein information about outcomes of rules relates to one or more levels of rules.

53. The system of claim 49, wherein information about outcomes of rules relates to one or more levels of information elements.

54. The system of claim 49, wherein a first predefined state is indicative of follow-up being needed, and a second predefined state is indicative of no follow-up being needed.

55. The system of claim 49, wherein applicable rules are hierarchical.

56. The system of claim 49, wherein an electronic message is sent to the user and/or external party(s) and conveys information about the outcome of each applied rule, if any, and each re-assessed rule or set of rules, if any.

57. The system of claim 49, wherein an electronic message is sent to the user and/or external party(s) and conveys information indicating that (a) one or more rules have been applied, and (b) one or more information elements have issues that the user and/or external party(s) to whom the electronic message is sent needs to review and potentially address through the system using a portal and/or application programming interface.

58. The system of claim 49, wherein a first predefined state is indicative of follow-up being needed, and a second predefined state is indicative of no follow-up being needed, and wherein the portal and/or application programming interface is configured to enable the external party to update a given outcome by selectively changing the corresponding state from a state indicating follow-up is needed to a state indicating no follow-up is needed, and vice versa.

59. The system of claim 49, wherein the portal and/or application programming interface is further configured to permit the user to provide additional information such as a note or notes, document or documents, access to a new source or sources of sensitive information usable by the rules, heuristics, and/or the external party, which address or help address the issue or issues identified with an information element by the rules, heuristics, and/or review by the external party to identify whether there is an issue or issues with that information element.

60. The system of claim 49, wherein details about an issue requiring further action identified with respect to a given information element are stored as an attribute of that information element.

61. The system of claim 60, wherein potential information needed to resolve the issue and/or potential resolutions associated with the issue identified are stored as an attribute of that information element.

62. The system of claim 1, wherein the processing resources are further configured to control the data analysis system to at least repeat the automatic and programmatic attempt at application of each rule from each determined set of analysis rules in response to an update to the first predefined set of sensitive information.

63. The system of claim 1, wherein the processing resources are further configured to control the data analysis system to at least repeat the automatic and programmatic attempt at application of each rule from each determined set of analysis rules based on further input from the user and/or the external party.

64. The system of claim 1, wherein the heuristic includes one or more machine-learned rules.

65. The system of claim 1, wherein the heuristic includes digitally processing sensitive information already in and/or added to the first predefined set of sensitive information, and checking the digitally processed sensitive information for one or more pre-identified values applicable to the respective rule being re-assessed.

66. The system of claim 1, wherein the heuristic includes performing optical character recognition of sensitive information already in and/or added to the first predefined set of sensitive information.

67. The system of claim 1, wherein a score is assignable to, and/or a model is applicable to sensitive information already in and/or added to the first predefined set of sensitive information, and consequently output of the score and/or model is added to the first predefined set of sensitive information for consideration by the rules.

68. The system of claim 1, wherein the heuristic includes natural language processing of sensitive information already in and/or added to the first predefined set of sensitive information.

69. The system of claim 1, wherein re-assessment is practiced by executing (a), (b), (c), and (d), in a predefined order, until re-assessment is deemed complete.

70. The system of claim 1, wherein re-assessment is practiced by executing (a), (b), (c), and (d) in order.

71. The system of claim 1, wherein a plurality of different sets of analysis rules to be applied to sensitive information in the first predefined set of sensitive information are identifiable based on the received request.

72. The system of claim 71, wherein at least one of the plurality of different sets of analysis rules to be applied to sensitive information in the first predefined set of sensitive information is system defined and at least one other of the plurality of different sets of analysis rules to be applied to sensitive information in the first predefined set of sensitive information is defined by an external party separate from the user.

73. The system of claim 71, wherein each of the plurality of different sets of analysis rules to be applied to sensitive information in the first predefined set of sensitive information is defined by an external party separate from the user.

74. The system of claim 71, wherein the sets of analysis rules to be applied to sensitive information in the first predefined set of sensitive information are system defined.

75. The system of claim 54, wherein applicable rules are hierarchical.

76. The system of claim 55, wherein an outcome of a first rule overrides an outcome of a second rule, provided that the first rule relates to a higher-order information element compared to the second rule, regardless of whether the second rule relates to an information element having a state indicating that it is flagged for follow-up.

77. The system of claim 75, wherein an outcome of a first rule overrides an outcome of a second rule, provided that the first rule relates to a higher-order information element compared to the second rule and even though the second rule relates to an information element having a state indicating that it is flagged for follow-up.

78. The system of claim 55, wherein an outcome of a first rule overrides an outcome of a second rule, provided that the first rule is a higher-order rule compared to the second rule.

79. The system of claim 55, wherein an outcome of a subsequent rule is structured to override an outcome of a prior rule.

80. The system of claim 55, wherein an outcome of a first rule is structured to override an outcome of a second rule, provided that the first rule relates to a subsequent information element compared to the second rule.

81. The system of claim 55, wherein an outcome of a first rule is structured to override an outcome of a second rule, provided that the first rule considers a broader set of information elements compared to the second rule.

82. A data analysis method for use with a data analysis system comprising processing resources, including at least one first hardware processor and a first memory operatively coupled thereto, a first non-transitory data store comprising sensitive data about a user, as well as a set of data sharing rules, the set of data sharing rules indicating what sensitive data is sharable and one or more conditions identifying when such sensitive data is shareable, and the sensitive data comprising information elements, and a second non-transitory data store comprising at least one set of analysis rules, the at least one set of analysis rules being system defined and/or defined by an external party separate from the user, the method comprising:

storing, to the first data store, sensitive information received from the user and/or electronically retrieved from a data source external to the data analysis system in response to the user providing appropriate credentialing information and/or consent for the external data source;

receiving, from the external party, a request to process a first predefined set of sensitive information;

responsive to a request to process a first predefined set of sensitive information,
    determining one or more sets of analysis rules to be applied to sensitive information in the first predefined set of sensitive information, based at least in part on the received request;
    automatically and programmatically attempting to apply each rule from each determined set of analysis rules to sensitive information in the first predefined set of sensitive information;
    storing, to the second data store, information about an outcome of the rules that are successfully applied, the information being associated with the sensitive information on which the rules are run; and
    for each rule or set of rules that indicates that further action is required:
        re-assessing an outcome of a respective rule or an outcome of a set of rules, responsive to at least one of: (a) automatic retrieval of further information from the user performed in connection with applicable data sharing rules, (b) application of a heuristic to sensitive information already in and/or added to the first predefined set of sensitive information, (c) electronic receipt of further information from the user or the external party in response to a system-initiated electronic prompt for responsive information, and (d) a determination as to whether the indication that further action is required for the respective rule or set of rules can be ignored based on input from the external party; and
    storing, to the second data store, information about an outcome of the respective re-assessed rule or set of rules, the information being associated with the sensitive information on which the respective rule or set of rules is run; and enabling the external party to update a given outcome provided by one or more analysis rules for a corresponding item of sensitive information by updating the given outcome to an updated outcome selected from a set of outcomes, via a portal and/or application programming interface.

83. A non-transitory computer readable storage medium tangibly storing instructions that, when executed by a hardware processor of a data analysis system that includes a first data store comprising sensitive data about a user, as well as a set of data sharing rules, the set of data sharing rules indicating what sensitive data is sharable and one or more conditions identifying when such sensitive data is shareable, and the sensitive data comprising information elements, and a second data store comprising at least one set of analysis rules, the at least one set of analysis rules being system defined and/or defined by an external party separate from the user, perform functionality comprising:

storing, to the first data store, sensitive information received from the user and/or electronically retrieved from a data source external to the data analysis system in response to the user providing appropriate credentialing information and/or consent for the external data source;

receiving, from the external party, a request to process a first predefined set of sensitive information;

responsive to a request to process a first predefined set of sensitive information,
- determining one or more sets of analysis rules to be applied to sensitive information in the first predefined set of sensitive information, based at least in part on the received request;
- automatically and programmatically attempting to apply each rule from each determined set of analysis rules to sensitive information in the first predefined set of sensitive information;
- storing, to the second data store, information about an outcome of the rules that are successfully applied, the information being associated with the sensitive information on which the rules are run; and
- for each rule or set of rules that indicates that further action is required:
  - re-assessing an outcome of a respective rule or an outcome of a set of rules, responsive to at least one of: (a) automatic retrieval of further information from the user performed in connection with applicable data sharing rules, (b) application of a heuristic to sensitive information already in and/or added to the first predefined set of sensitive information, (c) electronic receipt of further information from the user or the external party in response to a system-initiated electronic prompt for responsive information, and (d) a determination as to whether the indication that further action is required for the respective rule or set of rules can be ignored based on input from the external party; and
  - storing, to the second data store, information about an outcome of the respective re-assessed rule or set of rules, the information being associated with the sensitive information on which the respective rule or set of rules is run; and enabling the external party to update a given outcome provided by one or more analysis rules for a corresponding item of sensitive information by updating the given outcome to an updated outcome selected from a set of outcomes, via a portal and/or application programming interface.

* * * * *